United States Patent
Gish

(10) Patent No.: US 6,424,991 B1
(45) Date of Patent: *Jul. 23, 2002

(54) OBJECT-ORIENTED SYSTEM, METHOD AND ARTICLE OF MANUFACTURE FOR A CLIENT-SERVER COMMUNICATION FRAMEWORK

(75) Inventor: Sheri L. Gish, Mountain View, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/673,006

(22) Filed: Jul. 1, 1996

(51) Int. Cl.[7] .............................................. G06F 15/16
(52) U.S. Cl. ........................ 709/203; 709/310; 709/227
(58) Field of Search ................................ 395/680–685; 709/300, 305, 310, 203, 218, 227

(56) References Cited

U.S. PATENT DOCUMENTS

| | | |
|---|---|---|
| 3,946,503 A | 3/1976 | Buchan et al. |
| 4,200,867 A | 4/1980 | Hill |
| 4,588,074 A | 5/1986 | Strong et al. |
| 4,682,957 A | 7/1987 | Young |
| 4,739,477 A | 4/1988 | Barker et al. |
| 4,779,187 A | 10/1988 | Letwin |
| 4,798,543 A | 1/1989 | Spiece |
| 4,800,488 A | 1/1989 | Agrawal et al. |
| 4,803,643 A | 2/1989 | Hickey |
| 4,825,358 A | 4/1989 | Letwin |
| 4,829,468 A | 5/1989 | Nonaka et al. |

(List continued on next page.)

OTHER PUBLICATIONS

Justo et al, "Framework For developing extensible & reusable parallel & distributed applications", IEEE electronic library, pp. 29–36, 1996.*

(List continued on next page.)

Primary Examiner—Zarni Maung
(74) Attorney, Agent, or Firm—Beyer Weaver & Thomas, LLP

(57) ABSTRACT

An interprise computing manager in which an application is composed of a client (front end) program which communicates utilizing a network with a server (back end) program. The client and server programs are loosely coupled and exchange information using the network. The client program is composed of a User Interface (UI) and an object-oriented framework (Presentation Engine (PE) framework). The UI exchanges data messages with the framework. The framework is designed to handle two types of messages: (1) from the UI, and (2) from the server (back end) program via the network. The framework includes a component, the mediator which manages messages coming into and going out of the framework. The system includes software for a client computer, a server computer and a network for connecting the client computer to the server computer which utilize an execution framework code segment configured to couple the server computer and the client computer via the network, by a plurality of client computer code segments resident on the server, each for transmission over the network to a client computer to initiate coupling; and a plurality of server computer code segments resident on the server which execute on the server in response to initiation of coupling via the network with a particular client utilizing the transmitted client computer code segment for communicating via a particular communication protocol. A session manager is utilized to manage the initiation of a plurality of network sessions.

19 Claims, 17 Drawing Sheets

U.S. PATENT DOCUMENTS

| | | |
|---|---|---|
| 4,837,487 A | 6/1989 | Kurakake et al. |
| 4,866,602 A | 9/1989 | Hall |
| 4,897,781 A | 1/1990 | Chang et al. |
| 4,933,880 A | 6/1990 | Borgendale et al. |
| 4,954,818 A | 9/1990 | Nakane et al. |
| 4,955,066 A | 9/1990 | Notenboom |
| 4,967,378 A | 10/1990 | Rupel et al. |
| 4,974,159 A | 11/1990 | Hargrove et al. |
| 4,990,907 A | 2/1991 | Jikihara et al. |
| 5,021,974 A | 6/1991 | Pisculli et al. |
| 5,027,273 A | 6/1991 | Letwin |
| 5,109,433 A | 4/1992 | Notenboom |
| 5,113,341 A | 5/1992 | Peterson et al. |
| 5,124,989 A | 6/1992 | Padawer et al. |
| 5,125,077 A | 6/1992 | Hall et al. |
| 5,125,087 A | 6/1992 | Randell |
| 5,138,303 A | 8/1992 | Rupel |
| 5,146,580 A | 9/1992 | Naidu et al. |
| 5,155,842 A | 10/1992 | Rubin |
| 5,187,468 A | 2/1993 | Garthwaite et al. |
| 5,191,615 A | 3/1993 | Aldava et al. |
| 5,195,135 A | 3/1993 | Palmer |
| 5,204,960 A | 4/1993 | Smith et al. |
| 5,214,755 A | 5/1993 | Mason |
| 5,218,697 A | 6/1993 | Chung |
| 5,220,675 A | 6/1993 | Padawer et al. |
| 5,224,038 A | 6/1993 | Bespalko |
| 5,231,577 A | 7/1993 | Koss |
| 5,247,658 A | 9/1993 | Barrett et al. |
| 5,255,356 A | 10/1993 | Michelman et al. |
| 5,257,369 A | 10/1993 | Skeen et al. |
| 5,257,370 A | 10/1993 | Letwin |
| 5,261,051 A | 11/1993 | Masden et al. |
| 5,261,101 A | 11/1993 | Fenwick |
| 5,265,261 A | 11/1993 | Rubin et al. |
| 5,268,675 A | 12/1993 | Garthwaite et al. |
| 5,272,628 A | 12/1993 | Koss |
| 5,274,751 A | 12/1993 | Rosenberg |
| 5,276,793 A | 1/1994 | Borgendale et al. |
| 5,281,958 A | 1/1994 | Ashum et al. |
| 5,283,892 A | 2/1994 | Nakane et al. |
| 5,287,417 A | 2/1994 | Eller et al. |
| 5,287,504 A | 2/1994 | Carpenter et al. |
| 5,287,507 A | 2/1994 | Hamilton et al. |
| 5,287,514 A | 2/1994 | Gram |
| 5,293,473 A | 3/1994 | Hesse et al. |
| 5,297,284 A | 3/1994 | Jones et al. |
| 5,300,946 A | 4/1994 | Patrick |
| 5,301,326 A | 4/1994 | Linnett et al. |
| 5,303,151 A | 4/1994 | Neumann |
| 5,305,440 A | 4/1994 | Morgan et al. |
| 5,313,635 A | 5/1994 | Ishizuka et al. |
| 5,317,746 A | 5/1994 | Watanabe |
| 5,325,533 A | 6/1994 | McInerney et al. |
| 5,327,562 A | 7/1994 | Adcock |
| 5,337,258 A | 8/1994 | Dennis |
| 5,339,432 A | 8/1994 | Crick |
| 5,341,464 A | 8/1994 | Friedman et al. |
| 5,349,648 A | 9/1994 | Handley |
| 5,357,603 A | 10/1994 | Parker |
| 5,357,605 A | 10/1994 | Rupel et al. |
| 5,359,430 A | 10/1994 | Zhang |
| 5,363,479 A | 11/1994 | Olynyk |
| 5,363,487 A | 11/1994 | Willman et al. |
| 5,367,617 A | 11/1994 | Goossen et al. |
| 5,369,729 A | 11/1994 | Norris |
| 5,369,766 A | 11/1994 | Nakano et al. |
| 5,369,770 A | 11/1994 | Thomason et al. |
| 5,371,884 A | 12/1994 | Ross |
| 5,371,885 A | 12/1994 | Hargrove |
| 5,371,891 A | 12/1994 | Gray et al. |
| 5,375,241 A | 12/1994 | Walsh |
| 5,379,430 A | 1/1995 | Nguyen |
| 5,379,431 A | 1/1995 | Lemon et al. |
| 5,379,432 A | 1/1995 | Orton et al. |
| 5,381,347 A | 1/1995 | Gery |
| 5,381,521 A | 1/1995 | Ballard |
| 5,390,325 A | 2/1995 | Miller |
| 5,392,427 A | 2/1995 | Barrett et al. |
| 5,394,518 A | 2/1995 | Friedman et al. |
| 5,394,523 A | 2/1995 | Harris |
| 5,398,120 A | 3/1995 | Friedman et al. |
| 5,404,529 A | 4/1995 | Chernikoff et al. |
| 5,410,705 A | 4/1995 | Jones et al. |
| 5,412,807 A | 5/1995 | Moreland |
| 5,414,445 A | 5/1995 | Kaniko et al. |
| 5,414,526 A | 5/1995 | Friedman |
| 5,414,854 A | 5/1995 | Heninger et al. |
| 5,416,726 A | 5/1995 | Garcia-Duarte et al. |
| 5,418,956 A | 5/1995 | Willman |
| 5,423,042 A | 6/1995 | Jalili et al. |
| 5,426,760 A | 6/1995 | Moreland |
| 5,428,718 A | 6/1995 | Peterson et al. |
| 5,428,722 A | 6/1995 | Marsh et al. |
| 5,428,725 A | 6/1995 | Sugai et al. |
| 5,428,744 A | 6/1995 | Webb et al. |
| 5,430,876 A | 7/1995 | Schreiber et al. |
| 5,430,878 A | 7/1995 | Straub et al. |
| 5,432,924 A | 7/1995 | D'Souza et al. |
| 5,432,928 A | 7/1995 | Sherman |
| 5,432,932 A | 7/1995 | Chen et al. |
| 5,432,936 A | 7/1995 | Gray et al. |
| 5,432,941 A | 7/1995 | Crick et al. |
| 5,432,948 A | 7/1995 | Davis et la. |
| 5,434,776 A | 7/1995 | Jain |
| 5,434,965 A | 7/1995 | Matheny et al. |
| 5,437,006 A | 7/1995 | Turski |
| 5,437,013 A | 7/1995 | Rubin et al. |
| 5,437,036 A | 7/1995 | Stamps et al. |
| 5,438,433 A | 8/1995 | Reifman et al. |
| 5,442,389 A | 8/1995 | Blahut et al. |
| 5,442,751 A | 8/1995 | Patrick et al. |
| 5,442,793 A | 8/1995 | Christian et al. |
| 5,446,842 A | 8/1995 | Schaeffer et al. |
| 5,446,887 A | 8/1995 | Berkowitz |
| 5,450,536 A | 9/1995 | Rosenberg et al. |
| 5,452,406 A | 9/1995 | Butler et al. |
| 5,452,447 A | 9/1995 | Nelson et al. |
| 5,454,109 A | 9/1995 | Bruynoghe et al. |
| 5,455,577 A | 10/1995 | Slivka et al. |
| 5,455,600 A | 10/1995 | Friedman et al. |
| 5,455,854 A | 10/1995 | Dilts et al. |
| 5,455,951 A | 10/1995 | Bolton et al. |
| 5,459,865 A | 10/1995 | Heninger et al. |
| 5,461,701 A | 10/1995 | Voth |
| 5,463,471 A | 10/1995 | Chou |
| 5,465,363 A | 11/1995 | Orton et al. |
| 5,467,134 A | 11/1995 | Laney et al. |
| 5,467,264 A | 11/1995 | Rauch et al. |
| 5,467,435 A | 11/1995 | Douglas et al. |
| 5,467,472 A | 11/1995 | Williams et al. |
| 5,469,532 A | 11/1995 | Gerlach et al. |
| 5,469,533 A | 11/1995 | Dennis |
| 5,471,563 A | 11/1995 | Dennis et al. |
| 5,471,564 A | 11/1995 | Dennis et al. |
| 5,471,568 A | 11/1995 | Webb et al. |
| 5,471,576 A | 11/1995 | Yee |
| 5,471,675 A | 11/1995 | Zias |
| 5,473,343 A | 12/1995 | Kimmich et al. |
| 5,473,344 A | 12/1995 | Bacon et al. |
| 5,473,362 A | 12/1995 | Fitzgerald et al. |

| | | | | | |
|---|---|---|---|---|---|
| 5,473,691 A | 12/1995 | Menezes et al. | 5,544,286 A | 8/1996 | Laney |
| 5,473,777 A | 12/1995 | Moeller et al. | 5,544,301 A | 8/1996 | Orton et al. |
| 5,475,743 A | 12/1995 | Nixon et al. | 5,544,315 A | 8/1996 | Lehfeldt et al. |
| 5,475,805 A | 12/1995 | Murata | 5,544,320 A | 8/1996 | Konrad |
| 5,475,819 A | 12/1995 | Miller et al. | 5,546,518 A | 8/1996 | Blossom et al. |
| 5,475,835 A | 12/1995 | Hickey | 5,546,581 A | 8/1996 | McKinnis et al. |
| 5,475,845 A | 12/1995 | Orton et al. | 5,546,583 A | 8/1996 | Shriver |
| 5,481,667 A | 1/1996 | Bieniek et al. | 5,546,584 A | 8/1996 | Lundin et al. |
| 5,485,373 A | 1/1996 | Davis et al. | 5,548,305 A | 8/1996 | Rupel |
| 5,485,460 A | 1/1996 | Schrier et al. | 5,548,508 A | 8/1996 | Nagami |
| 5,485,558 A | 1/1996 | Weise et al. | 5,548,718 A | 8/1996 | Siegal et al. |
| 5,485,574 A | 1/1996 | Bolosky et al. | 5,548,723 A | 8/1996 | Pettus |
| 5,487,145 A | 1/1996 | Marsh et al. | 5,548,726 A | 8/1996 | Pettus |
| 5,490,249 A | 2/1996 | Miller | 5,548,759 A | 8/1996 | Lipe |
| 5,490,274 A | 2/1996 | Zbikowski et al. | 5,548,779 A | 8/1996 | Andert et al. |
| 5,491,800 A | 2/1996 | Goldsmith et al. | 5,550,930 A | 8/1996 | Berman et al. |
| 5,493,649 A | 2/1996 | Slivka et al. | 5,550,972 A | 8/1996 | Patrick et al. |
| 5,495,561 A | 2/1996 | Holt | 5,551,024 A | 8/1996 | Waters |
| 5,495,566 A | 2/1996 | Kwatinetz | 5,551,055 A | 8/1996 | Matheny et al. |
| 5,495,571 A | 2/1996 | Corrie, Jr. et al. | 5,552,982 A | 9/1996 | Jackson et al. |
| 5,495,577 A | 2/1996 | Davis et al. | 5,553,205 A | 9/1996 | Murray |
| 5,497,463 A | 3/1996 | Stein et al. | 5,553,215 A | 9/1996 | Kaethler |
| 5,497,492 A | 3/1996 | Zbikowski et al. | 5,553,242 A | 9/1996 | Russell et al. |
| 5,499,109 A | 3/1996 | Mathur et al. | 5,553,282 A | 9/1996 | Parrish et al. |
| 5,499,334 A | 3/1996 | Staab | 5,555,228 A | 9/1996 | Izuka |
| 5,499,335 A | 3/1996 | Silver et al. | 5,555,368 A | 9/1996 | Orton et al. |
| 5,499,343 A | 3/1996 | Pettus | 5,557,440 A | 9/1996 | Hanson et al. |
| 5,500,929 A | 3/1996 | Dickinson | 5,557,714 A | 9/1996 | Lines et al. |
| 5,500,931 A | 3/1996 | Sonnenschein | 5,557,722 A | 9/1996 | DeRose te al. |
| 5,504,500 A | 4/1996 | Garthwaite et al. | 5,557,723 A | 9/1996 | Holt et al. |
| 5,504,591 A | 4/1996 | Dujari et al. | 5,559,884 A | 9/1996 | Davidson et al. |
| 5,504,889 A | 4/1996 | Burgess | 5,559,943 A | 9/1996 | Cyr et al. |
| 5,506,983 A | 4/1996 | Atkinson et al. | 5,560,005 A | 9/1996 | Hoover et al. |
| 5,510,811 A | 4/1996 | Tobey et al. | 5,561,751 A | 10/1996 | Wong |
| 5,510,980 A | 4/1996 | Peters | 5,561,786 A | 10/1996 | Morse |
| 5,511,197 A | 4/1996 | Hill et al. | 5,561,788 A | 10/1996 | Letwin |
| 5,512,921 A | 4/1996 | Mital et al. | 5,565,886 A | 10/1996 | Gibson |
| 5,513,315 A | 4/1996 | Tierney et al. | 5,565,887 A | 10/1996 | McCambridge et al. |
| 5,515,508 A | 5/1996 | Pettus et al. | 5,566,068 A | 10/1996 | Comer et al. |
| 5,517,257 A | 5/1996 | Dunn et al. | 5,566,278 A | 10/1996 | Patel et al. |
| 5,517,324 A | 5/1996 | Fite, Jr. et al. | 5,566,346 A | 10/1996 | Andert et al. |
| 5,519,818 A | 5/1996 | Peterson | 5,572,206 A | 11/1996 | Miller et al. |
| 5,519,855 A | 5/1996 | Neeman et al. | 5,572,589 A | 11/1996 | Waters et al. |
| 5,519,862 A | 5/1996 | Schaeffer et al. | 5,572,643 A | 11/1996 | Judson |
| 5,519,866 A | 5/1996 | Lawrence et al. | 5,574,840 A | 11/1996 | Kwatinetz et al. |
| 5,519,867 A | 5/1996 | Moeller et al. | 5,574,854 A | 11/1996 | Blake et al. |
| 5,522,068 A | 5/1996 | Berkowitz | 5,574,907 A | 11/1996 | Jernigan, IV et al. |
| 5,524,190 A | 6/1996 | Schaeffer et al. | 5,574,920 A | 11/1996 | Parry |
| 5,524,200 A | 6/1996 | Orton et al. | 5,577,173 A | 11/1996 | Dennis et al. |
| 5,526,485 A | 6/1996 | Brodsky | 5,577,187 A | 11/1996 | Mariani |
| 5,526,515 A | 6/1996 | Ross et al. | 5,577,224 A | 11/1996 | DeWitt et al. |
| 5,526,523 A | 6/1996 | Straub et al. | 5,579,223 A | 11/1996 | Raman |
| 5,528,742 A | 6/1996 | Moore et al. | 5,579,517 A | 11/1996 | Reynolds et al. |
| 5,530,794 A | 6/1996 | Luebbert | 5,581,669 A | 12/1996 | Voth |
| 5,530,799 A | 6/1996 | Marsh et al. | 5,581,686 A | 12/1996 | Koppolu et al. |
| 5,530,852 A | 6/1996 | Meske, Jr. et al. | 5,581,736 A | 12/1996 | Smith |
| 5,530,856 A | 6/1996 | Owens et al. | 5,581,760 A | 12/1996 | Atkinson et al. |
| 5,530,864 A * | 6/1996 | Matheny et al. ............ 395/680 | 5,583,560 A | 12/1996 | Florin et al. |
| 5,530,865 A * | 6/1996 | Owens et al. ............... 395/680 | 5,583,868 A | 12/1996 | Rashid et al. |
| 5,530,895 A | 6/1996 | Enstrom | 5,583,982 A | 12/1996 | Matheny et al. |
| 5,535,324 A | 7/1996 | Alvarez et al. | 5,585,838 A | 12/1996 | Lawier et al. |
| 5,537,415 A | 7/1996 | Miller et al. | 5,586,186 A | 12/1996 | Yuval et al. |
| 5,537,526 A | 7/1996 | Anderson et al. | 5,586,318 A | 12/1996 | Toutonghi |
| 5,537,589 A | 7/1996 | Dalal | 5,586,328 A | 12/1996 | Caron et al. |
| 5,537,623 A | 7/1996 | Luebbert | 5,587,902 A | 12/1996 | Kugiymiya |
| 5,539,471 A | 7/1996 | Myhrvold et al. | 5,588,095 A | 12/1996 | Dennis et al. |
| 5,539,530 A | 7/1996 | Reifman et al. | 5,588,099 A | 12/1996 | Mogilexsky et al. |
| 5,541,942 A | 7/1996 | Strouss | 5,588,147 A | 12/1996 | Neeman et al. |
| 5,542,068 A | 7/1996 | Peters | 5,590,267 A | 12/1996 | Butler et al. |
| 5,542,078 A | 7/1996 | Martel et al. | 5,590,318 A | 12/1996 | Zbikowski et al. |
| 5,544,082 A | 8/1996 | Garcia-Duarte et al. | 5,590,336 A | 12/1996 | Parry |

| | | | |
|---|---|---|---|
| 5,590,347 A | | 12/1996 | D'Souza et al. |
| 5,592,670 A | | 1/1997 | Pletcher |
| 5,594,462 A | | 1/1997 | Fishman et al. |
| 5,594,509 A | | 1/1997 | Florin et al. |
| 5,594,642 A | | 1/1997 | Collins et al. |
| 5,594,847 A | | 1/1997 | Deo |
| 5,594,898 A | | 1/1997 | Dalal et al. |
| 5,594,905 A | | 1/1997 | Mital |
| 5,594,921 A | | 1/1997 | Pettus |
| 5,596,318 A | | 1/1997 | Mitchell |
| 5,596,347 A | | 1/1997 | Robertson et al. |
| 5,596,696 A | | 1/1997 | Tindell et al. |
| 5,596,723 A | | 1/1997 | Romohr |
| 5,596,726 A | | 1/1997 | Thielsen |
| 5,596,755 A | | 1/1997 | Pletcher et al. |
| 5,598,183 A | | 1/1997 | Robertson et al. |
| 5,598,519 A | | 1/1997 | Narayanan |
| 5,598,520 A | | 1/1997 | Harel et al. |
| 5,598,563 A | | 1/1997 | Spies |
| 5,600,368 A | | 2/1997 | Mathews, III |
| 5,602,974 A | | 2/1997 | Shaw et al. |
| 5,602,981 A | | 2/1997 | Hargrove |
| 5,603,003 A | | 2/1997 | Gray et al. |
| 5,604,839 A | | 2/1997 | Acero et al. |
| 5,604,843 A | | 2/1997 | Shaw et al. |
| 5,604,847 A | | 2/1997 | Dennis et al. |
| 5,604,849 A | | 2/1997 | Artwick et al. |
| 5,604,850 A | | 2/1997 | Whitmer |
| 5,604,856 A | | 2/1997 | Guenter |
| 5,604,887 A | | 2/1997 | Maidu et al. |
| 5,608,853 A | | 3/1997 | Dujari et al. |
| 5,608,909 A | | 3/1997 | Atkinson et al. |
| 5,611,040 A | | 3/1997 | Brewer et al. |
| 5,611,060 A | | 3/1997 | Belfiore et al. |
| 5,613,079 A | | 3/1997 | Debique et al. |
| 5,613,122 A | | 3/1997 | Burnard et al. |
| 5,613,123 A | | 3/1997 | Tsang et al. |
| 5,617,570 A | * | 4/1997 | Russell et al. ............... 709/304 |
| 5,634,122 A | | 5/1997 | Loucks et al. |
| 5,636,376 A | | 6/1997 | Chang |
| 5,682,534 A | | 10/1997 | Kapoor et al. |
| 5,689,708 A | * | 11/1997 | Regnier et al. ............. 709/229 |
| 5,696,966 A | | 12/1997 | Velarde |
| 5,701,484 A | * | 12/1997 | Artsy ......................... 709/303 |
| 5,752,159 A | * | 5/1998 | Faust et al. .................. 455/5.1 |
| 5,768,510 A | * | 6/1998 | Gish .......................... 709/203 |
| 5,781,189 A | | 7/1998 | Holleran et al. |
| 5,809,235 A | * | 9/1998 | Sharma et al. ........... 395/200.6 |
| 5,819,034 A | * | 10/1998 | Joseph et al. ............... 709/201 |
| 5,838,906 A | * | 11/1998 | Doyle et al. ........... 395/200.32 |
| 5,848,246 A | * | 12/1998 | Gish .......................... 709/228 |
| 5,987,245 A | * | 11/1999 | Gish .......................... 395/680 |
| 5,999,972 A | * | 12/1999 | Gish .......................... 709/219 |
| 6,038,590 A | * | 3/2000 | Gish .......................... 709/203 |
| 6,052,711 A | * | 4/2000 | Gish .......................... 709/203 |

OTHER PUBLICATIONS

Schmidt et al Experiences with an object oriented architecture for developing dynamically extensible system management software, IEEE electronic library pp. 500–506, 1994.*

Reynolds et al, "A New WWW distributed programming framework", IEEE electronic library pp. 101–105, 1996.*

Sridhas et al An object oriented framework for embedded wwwapplications, IEEE electronic library, pp. 97–101, 1996.*

Liu et al, "A distributed web server and its performance analysis on multiple platforms", IEEE electronic library pp. 665–672 1996.*

Michael Goulde, "Wirkd Wide Servers", Open Information Systems, vol. 10 No. 9 p. 3(32), Sep. 1995.*

Gosling et al, "The Java Lanaguage Environment : A White Pater", Chapter 9, 1995.*

Sun Microsystems, "ICET Users Guide", Chapter 3, 1996.*

Berners–Lee et al., "Hypertext Markup Language 2.0" *RFC 1866*, pp. 1–77 (1995).

Goulde, Michael A. "World Wide Web Servers" *Open Information Systems* vol.10, No. 9 p. 3 (32) (1995).

Madany, Peter "The Source for Java™ Technology" http://java.sun.com/marketing/collateral/os.html, pp. 1–13 (May 1996).

Shimmin, Bradley Java to Leap Past Web: Sun's Language Creats Client/Server Aps; *LAN Times*, vol.12, No. 22, pp. 1–2 (Oct. 1995).

Rodriguez, Karen "Sun Fine Tunes Java's Future" *Communications Week* n. 597, p. 35 (Feb. 19, 1996).

Betz, Mark "Inter–Operable Objects" *Dr. Dobb's Journal*, pp. 18–30 (Oct. 1994).

Sun Microsystems "The Java Language Specification" *Release 1.0 Alpha3* pp. 1–35 (May 1995).

U.S. Application No. 08/675,232 entitled Object–Oriented System, Method And Article Of Manufacture For A Client–Server With A Client Program Cache (Atty. Dkt. No. SUN1P302), Inventor Sheri L. Gish, Filed Jul. 1, 1996.

U.S. Application No. 08/673,946 entitled Object–Oriented System, Method And Article Of Manufacture For A Client–Server–Centric Interprise Computing Framework System (Atty. Dkt. No. SUN1P303), Inventor Sheri L. Gish, Filed Jul. 1, 1996.

U.S. Application No. 08/675,231 entitled Object–Oriented System, Method And Article Of Manufacture For A Client–Server State Machine In An Interprise Computing Framework System (Atty. Dkt. No. SUN1P304), Inventor Sheri L. Gish, Filed Jul. 1, 1996.

U.S. Application No. 08/673,948 entitled Object–Oriented System, Method and Article of Manufacture For Migrating A Client–Server Application, (Atty. Dkt. No. SUN1P305) Inventor Sheri L. Gish, Filed Jul. 1, 1996.

U.S. Application No. 08/675,233 entitled Object–Oriented System, Method And Article Of Manufacture For A Client–Server Session Manager In An Interprise Computing Framework System (Atty. Dkt. No. SUN1P306) Inventor Sheri L. Gish, Filed Jul. 1, 1996.

U.S. Application No. 08/675,262 entitled Object–Oriented System, Method And Article Of Manufacture For A Distributed System Framework, (Atty. Dkt. No. SUN1P301) Inventor Sheri L. Gish, Filed Jul. 1, 1996.

U.S. Application No. 08/675,250 entitled Object–Oriented System, Method And Article Of Manufacture For A Client–Server Centric Framework (Atty. Dkt. No. SUN1P308), Inventor Sheri L. Gish, Filed Jul. 1, 1996.

U.S. Application No. 08/675,266 entitled Object–Oriented System, Method And Article Of Manufacture For A Client–Server Graphical Use Interface Framework In An Interprise Computing Framework System, (Atty. Dkt. No. SUN1P309), Inventor Sheri L. Gish, Filed Jul. 1, 1996.

U.S. Application No. 08/675,253 entitled Object–Oriented System, Method And Article Of Manufacture For A Client–Server Event–Driven Message (Atty. Dkt. No. SUN1P311), Inventor Sheri L. Gish, Filed Jul. 1, 1996.

U.S. Application No. 08/675,267 entitled Object–Oriented System, Method And Article Of Manufacture (#12), For A Client–Server State Machine Framework, (Atty. Dkt. No. SUN1P312), Inventor Sheri L. Gish, Filed Jul. 1, 1996.

U.S. Application No. 08/675,342 entitled Object–Oriented System, Method And Article Of Manufacture For A Presentation Engine (Atty. Dkt. No. SUN1P313) Inventor Sheri L. Gish, Filed Jul. 1, 1996.

U.S. Application No. 08/675,252 entitled Object–Oriented System, Method And Article Of Manufacture For A Client–Server Session Web Access In an Interprise Computing Framework System (Atty. Dkt. No. SUN1P314) Inventor Sheri L. GIsh, Filed Jul. 1, 1996.

Wollrath et al., "A Distributed Object Model for the Java™ System,"Jun. 17–21, 1996, Conference on Object–Oriented Technologies and Systems.

Gosling et al., "The Java Language Environment, "Oct. 1995, Sun Microsystems, Inc. White Paper.

Marc Shapiro, "Structure and Encapsulation in Distributed Systems: The Proxy Principle, " 1986, IEEE.

Nick N. Duan, "Distributed Database Access in a Corporate Environment Using Java, " 1996, Computer Networks and ISDN Systems.

* cited by examiner

BASIC BUILDING BLOCKS

PE DEVELOPMENT: EXTENDING THE FRAMEWORK

| NAME | DESCRIPTION | DEVELOPMENT | RUNTIME |
|---|---|---|---|
| PRESENTATIONENGINE CLASS | IS THE SUPERCLASS FOR PRESENTATION ENGINES. | IS DERIVES FROM. IS NOT MODIFIED. | IS USED BY YOUR INSTANCE OF THE PRESENTATION ENGINE. |
| PE-TEMPLATE | IS AN INSTANCE OF THE PRESENTATIONENGINE CLASS. | IS MODIFIED. DEVELOPERS COPY THIS FILE, GIVE IT A NAME, AND WRITE METHOD BODIES FOR A FEW METHODS. | |
| MY PRESENTATIONENGINE (A DEVELOPED AND COMPILED PRESENTATION ENGINE, GIVEN AN EXAMPLE NAME HERE) | IS AN INSTANCE OF THE PRESENTATIONENGINE CLASS, CREATED USING PE-TEMPLATE, AND FILLED IN WITH APPLICATION-SPECIFIC CODE. | IS DEVELOPED FROM THE PE-TEMPLATE. | A COMPILED PRESENTATION ENGINE (HERE NAMED MY PRESENTATION ENGINE) THAT INCLUDES A GUI AND AN INSTANCE OF THE CLIENT COMMUNICATION LIBRARY. |

*FIG.-27*

| FUNCTION | DESCRIPTION | REQUIREMENTS |
| --- | --- | --- |
| SETSRVCOMMPROPERTIES () | SETS SERVER COMMUNICATION LIBRARY PROPERTIES SUCH AS SERVER TIMEOUTS, AND DEBUG FILE AND TRACE LEVEL. | SHOULD NOT WRITE ANYTHING TO STDOUT BECAUSE THE ICE-T ACCESS LAYER EXPECTS THE FIRST THING WRITTEN TO STDOUT TO BE THE PORT NUMBER THAT THE SERVER USES TO LISTEN FOR THE CLIENT CONNECTION |
| CREATEMESSAGEHANDLERS () | REGISTERS THE MESSAGE HANDLERS, IS THE SERVER ANALOG TO THE CREATEMESSAGEHANDLERS () METHOD IN THE PRESENTATION ENGINE. | CALLED IMMEDIATELY AFTER THE SETSRVCOMNPROPERTIES () CALL |
| INITIALIZEAPPLICATION() | STARTS UP THE APPLICATION-SPECIFIC CODE. IS CALLED AFTER THE SERVER PROGRAM ACCEPTS THE CONNECTION FROM THE CLIENT AND BEFORE THE CALLS FOR READING AND HANDLING MESSAGES. | INITIALIZES THE DATA STRUCTURES REQUIRED FOR HANDLING MESSAGES FROM THE CLIENT. MUST RETURN. IF THE SERVER PROGRAM HAS ITS OWN NOTIFIER LOOP, SUCH AS A LOOP THAT RECEIVES NOTIFICATIONS FROM THE DATABASE, THEN THAT NOTIFIER MUST BE CALLED IN A NEW THREAD. |

*FIG.-28*

| PROPERTY | DEFAULT ACCPTED VALUES | |
| --- | --- | --- |
| SETSERVRTIMEOUT() | 3600 SECONDS (1 HOUR) | >0 SPECIFYING 0 OR <0 MEANS NO TIMEOUT |
| SETDBGFILE | STDERR | USER-SPECIFIED FILENAME |
| SETACCEPTTIMEOUT | 3600 SECONDS | >0 SPECIFYING 0 OR <0 MEANS NO TIMEOUT |
| SETTRACELEVEL | 0 (ZERO) | 0 MEANS NO TRACE MESSAGES ARE PRINTED. 2 MEANS TRACE MESSAGES ARE PRINTED. |
| SETTHREADMODEL | SRVCOMM-THREAD-MODEL-SINGLE-HANDLER | SRVCOb-1-THREAD-MODEL-SINGLE-HANDLER SRVOI-THREAD-MODEL-MULTIPLE-HANDLERS |

*FIG.-29*

TABLE D-1 DESCRIBES CLIENT AND SERVER-SIDE EXCEPTIONS
TABLE D-1 ICE-T EXCEPTIONS

| EXCEPTION | DESCRIPTION |
| --- | --- |
| EXCEPTIONS THROWN BY THE CLIENT PROI RAM (JAVA CODE): | |
| PEEXCEPTION | A GENERAL EXCEPTION THAT SIGNIFIES AN UNIDENTIFIED PROBLEM. THE MESSAGE MAY INCLUDE MORE DETAILS ABOUT WHERE IT WAS RAISED. PE~XCEP~ION IS USED VERY RARELY. |
| MAPNOTFOUNDEXCEPTION | RAISED WHEN A MODULE IN THE PRESENTATION ENGINE RECEIVES A MESSAGE FOR WHICH NO MAP FUNCTION HAS BEEN REGISTERED. THE MESSAGE EXPLAINS WHERE AND WHY THE EXCEPTION WAS RAISED. |
| DUPLICATEMAPEXCEPTION | RAISED WHEN THE CLIENT PROGRAM ATTEMPTS TO REGISTER THE SAME MESSAGE IN BOTH THE UI AND MODEL. |
| COMMEXCEPTION | A GENERAL COMMUNICATION EXCEPTION. IT IS INDICATES THAT THERE HAS BEEN SOME COMMUNICATION PROBLEM AND PRINTS A MESSAGE WITH MORE DETAILS. |
| CONNECTIONEXCEPTION | INDICATES THAT THERE WERE SOME PROBLEMS IN CONNECTING TO THE SERVER. |
| ICE-T PROTOCOL THAT | PEPROTOCOL EXCEPTION INDICATES THAT THERE WAS A PROBLEM WITH THE IS BEING SENT BETWEEN THE CLIENT AND SERVER. |
| EXCEPTIONS THROWN BY THE SERVER COMMUNICATION LIBRARY: | |
| SERVEREXCEPTION | THE BASE CLASS OF THE OTHER EXCEPTIONS. NEVER THROWN. |
| SRVCOMMEXCEPTION | A GENERAL COMMUNICATION EXCEPTION. INDICATES THAT THERE HAS BEEN SOME COMMUNICATION PROBLEM AND PRINTS A MESSAGE WITH MORE DETAILS |
| SRVCONNECTIONEXCEPTION | INDICATES THAT THERE IS A PROBLEM WITH THE CONNECTION TO THE CLIENT. IT USUALLY INDICATES THAT EITHER THE CLIENT HAS SUT DOWN UNEXPECTEDLY OR THE CONNECTION HAS TERMINATED, AND THE SERVER IS SOMEHOW CONTINUING ON. |
| SRVPROTOCOLEXCEPTION | INDICATES THAT THERE HAS BEEN A PROBLEM WITH THE MESSAGE SENT TO, OR RECEIVED FROM, THE CLIENT. EITHER THE MESSAGE TYPE IS UNKNOWN, OR THERE HAS BEEN A PROBLEM MARSHALLING OR UNMARSHALLING THE DATA. IT MEANS THAT SOMEHOW THE BYTES THAT WERE SENT ON THE SOCKET WERE GARBLED. |

*FIG.-30*

OBJECT-ORIENTED SYSTEM, METHOD AND ARTICLE OF MANUFACTURE FOR A CLIENT-SERVER COMMUNICATION FRAMEWORK

CROSS-REFERENCE TO RELATED APPLICATIONS

This application is related to U.S. patent application Ser. Nos. 08/673,946, Jul. 1, 1996, now U.S. Pat. No. 6,272,555 Ser. No. 08/673,948, filed Jul. 1, 1996, now U.S. Pat. No. 6,272,555; Ser. No. 08/675,250, filed Jul. 1, 1996, now U.S. Pat. No. 6,266,709 Ser. No. 08/675,266, filed Jul. 1, 1996 all naming Sheri L. Gish as inventor, and assigned to the assignee of the present application.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

This invention generally relates to improvements in computer systems and, more particularly, to operating system software for managing Interprise computing in a network user interface.

BACKGROUND OF THE INVENTION

One of the most important aspects of a modern computing system is the interface between the human user and the machine. The earliest and most popular type of interface was text based; a user communicated with the machine by typing text characters on a keyboard and the machine communicated with the user by displaying text characters on a display screen. More recently, graphic user interfaces have become popular where the machine communicates with a user by displaying graphics, including text and pictures, on a display screen and the user communicates with the machine both by typing in textual commands and by manipulating the displayed pictures with a pointing device, such as a mouse.

Many modern computer systems operate with a graphic user interface called a window environment. In a typical window environment, the graphical display portrayed on the display screen is arranged to resemble the surface of an electronic "desktop" and each application program running on the computer is represented as one or more electronic "paper sheets" displayed in rectangular regions of the screen called "windows".

Each window region generally displays information which is generated by the associated application program and there may be several window regions simultaneously present on the desktop, each representing information generated by a different application program. An application program presents information to the user through each window by drawing or "painting" images, graphics or text within the window region. The user, in turn, communicates with the application by "pointing at" objects in the window region with a cursor which is controlled by a pointing device and manipulating or moving the objects and also by typing information into the keyboard. The window regions may also be moved around on the display screen and changed in size and appearance so that the user can arrange the desktop in a convenient manner.

Each of the window regions also typically includes a number of standard graphical objects such as sizing boxes, buttons and scroll bars. These features represent user interface devices that the user can point at with the cursor to select and manipulate. When the devices are selected or manipulated, the underlying application program is informed, via the window system, that the control has been manipulated by the user.

In general, the window environment described above is part of the computer operating system. The operating system also typically includes a collection of utility programs that enable the computer system to perform basic operations, such as storing and retrieving information on a disc memory, communicating with a network and performing file operations including the creation, naming and renaming of files and, in some cases, performing diagnostic operations in order to discover or recover from malfunctions.

The last part of the computing system is the "application program" which interacts with the operating system to provide much higher level functionality, perform a specific task and provide a direct interface with the user. The application program typically makes use of operating system functions by sending out series of task commands to the operating system which then performs a requested task. For example, the application program may request that the operating system store particular information on the computer disc memory or display information on the video display.

FIG. 1 is a schematic illustration of a typical prior art computer system utilizing both an application program and an operating system. The computer system is schematically represented by box 100, the application is represented by box 102 and the operating system by box 106. The previously-described interaction between the application program 102 and the operating system 106 is illustrated schematically by arrow 104. This dual program system is used on many types of computer systems ranging from main frames to personal computers.

The method for handling screen displays varies from computer to computer and, in this regard, FIG. 1 represents a prior art personal computer system. In order to provide screen displays, application program 102 generally stores information to be displayed (the storing operation is shown schematically by arrow 108) into a screen buffer 110. Under control of various hardware and software in the system the contents of the screen buffer 110 are read out of the buffer and provided, as indicated schematically by arrow 114, to a display adapter 112. The display adapter 112 contains hardware and software (sometimes in the form of firmware) which converts the information in screen buffer 110 to a form which can be used to drive the display monitor 118 which is connected to display adapter 112 by cable 116.

The prior art configuration shown in FIG. 1 generally works well in a system where a single application program 102 is running at any given time. This simple system works properly because the single application program 102 can write information into any area of the entire screen buffer area 110 without causing a display problem. However, if the configuration shown in FIG. 1 is used in a computer system where more than one application program 102 can be operational at the same time (for example, a "multi-tasking" computer system) display problems can arise. More particularly, if each application program has access to the entire screen buffer 110, in the absence of some direct communication between applications, one application may overwrite a portion of the screen buffer which is being used by another application, thereby causing the display generated by one application to be overwritten by the display generated by the other application.

Accordingly, mechanisms were developed to coordinate the operation of the application programs to ensure that each application program was confined to only a portion of the screen buffer thereby separating the other displays. This coordination became complicated in systems where windows were allowed to "overlap" on the screen display. When the screen display is arranged so that windows appear to "overlap", a window which appears on the screen in "front" of another window covers and obscures part of the underlying window. Thus, except for the foremost window, only part of the underlying windows may be drawn on the screen and be "visible" at any given time. Further, because the windows can be moved or resized by the user, the portion of each window which is visible changes as other windows are moved or resized. Thus, the portion of the screen buffer which is assigned to each application window also changes as windows from other applications are moved or resized.

In order to efficiently manage the changes to the screen buffer necessary to accommodate rapid screen changes caused by moving or resizing windows, the prior art computer arrangement shown in FIG. 1 was modified as shown in FIG. 2. In this new arrangement computer system 200 is controlled by one or more application programs, of which programs 202 and 216 are shown, which programs may be running simultaneously in the computer system. Each of the programs interfaces with the operating system 204 as illustrated schematically by arrows 206 and 220. However, in order to display information on the display screen, application programs 202 and 216 send display information to a central window manager program 218 located in the operating system 204. The window manager program 218, in turn, interfaces directly with the screen buffer 210 as illustrated schematically by arrow 208. The contents of screen buffer 210 are provided, as indicated by arrow 212, to a display adapter 214 which is connected by a cable 222 to a display monitor 224.

In such a system, the window manager 218 is generally responsible for maintaining all of the window displays that the user views during operation of the application programs. Since the window manager 218 is in communication with all application programs, it can coordinate between applications to insure that window displays do not overlap. Consequently, it is generally the task of the window manager to keep track of the location and size of the window and the window areas which must be drawn and redrawn as windows are moved.

The window manager 218 receives display requests from each of the applications 202 and 216. However, since only the window manager 218 interfaces with the screen buffer 210, it can allocate respective areas of the screen buffer 210 for each application and insure that no application erroneously overwrites the display generated by another application. There are a number of different window environments commercially available which utilize the arrangement illustrated in FIG. 2. These include the X/Window Operating environment, the WINDOWS, graphical user interface developed by the Microsoft Corporation and the OS/2 Presentation Manager, developed by the International Business Machines Corporation, and the Macintosh OS, developed by Apple Computer Corporation.

Each of these window environments has its own internal software architecture, but the architectures can all be classified by using a multi-layer model similar to the multi-layer models used to describe computer network software. A typical multi-layer model includes the following layers:

User Interface
Window Manager
Resource Control and Communication
Component Driver Software
Computer Hardware where the term "window environment" refers to all of the above layers taken together.

The lowest or computer hardware level includes the basic computer and associated input and output devices including display monitors, keyboards, pointing devices, such as mice or trackballs, and other standard components, including printers and disc drives. The next or "component driver software" level consists of device-dependent software that generates the commands and signals necessary to operate the various hardware components. The resource control and communication layer interfaces with the component drivers and includes software routines which allocate resources, communicate between applications and multiplex communications generated by the higher layers to the underlying layers. The window manager handles the user interface to basic window operations, such as moving and resizing windows, activating or inactivating windows and redrawing and repainting windows. The final user interface layer provides high level facilities that implement the various controls (buttons, sliders, boxes and other controls) that application programs use to develop a complete user interface.

Although the arrangement shown in FIG. 2 solves the display screen interference problem, it suffers from the drawback that the window manager 218 must process the screen display requests generated by all of the application programs. Since the requests can only be processed serially, the requests are queued for presentation to the window manager before each request is processed to generate a display on terminal 224. In a display where many windows are present simultaneously on the screen, the window manager 218 can easily become a "bottleneck" for display information and prevent rapid changes by of the display by the application programs 202 and 216. A delay in the redrawing of the screen when windows are moved or repositioned by the user often manifests itself by the appearance that the windows are being constructed in a piecemeal fashion which becomes annoying and detracts from the operation of the system.

This problem becomes even more accentuated in a client-server environment where many applications are all in contention for very limited resources. The Internet has permeated the workplace as a communication medium of choice. Since the internet is accessible from almost any point in a typical business enterprise a new buzzword has evolved from the form enterprise computer into an "interprise" computer. Interprise is a concatenation of internet and enterprise.

In today's client server enterprises, applications that exist in current client server enterprises are not really built to be managed since they are architected for distributed system environments. New systems are also required to be evolutionary, not revolutionary. Redesign of current systems that require significant expense need to be avoided.

A system is required that allows a user to create manageable applications, that can be readily deployed, installed on a variety of platforms, and configured to facilitate partitioning them on clients versus servers and administer the applications once they're running. Systems don't always break because of failure, errors, or bugs, they sometimes break because the enterprise itself is complicated and somebody does something unexpected somewhere which will bring the whole system down. When the system does come down, then a system administrator must be able to readily identify the problems, and deal with them in an effective manner so that a business doesn't stop functioning when one of these unforeseen events happens.

The application should be designed based on domain requirements, so it is independent of any platform underneath, and fits more with how commercial developers work. In the commercial world, the development process isn't that important. The regular employees are not applications developers or programmers. Companies usually hire such work out; they get consultants to do that kind of work. Depending on the company and what they want done, it usually hires a consulting firm, individual consultants, or smaller groups of consultants to come in, help it develop an application. Their goal is the end application, which must be maintained. The company configures it, evolves it, and grows it. To allow for modification, the development task must be modular to allow different groups of people working on different parts of an application, without requiring any one group to understand every detail of the whole application of the enterprise.

The second criterion requires minimal extra knowledge, burden or sophistication on the part of the people developing the system. Most companies do not desire to have their business hinge on a single individual. Rather, they desire to have people who are primarily domain experts who can work with well-understood tools to produce a application matching company requirements quickly without making special demands on the company.

SUMMARY OF THE INVENTION

The foregoing problems are overcome in an illustrative embodiment of the invention in which an application is composed of a client (front end) program which communicates utilizing a network with a server (back end) program. The client and server programs are loosely coupled and exchange information using the network. The client program is composed of a User Interface (UI) and an object-oriented framework (Presentation Engine (PE) framework). The UI exchanges data messages with the framework. The framework is designed to handle two types of messages: (1) from the UI, and (2) from the server (back end) program via the network. The framework includes a component, the mediator which manages messages coming into and going out of the framework.

A distributed computer system is disclosed with software for a client computer, a server computer and a network for connecting the client computer to the server computer which utilize an execution framework code segment configured to couple the server computer and the client computer via the network, by a plurality of client computer code segments resident on the server, each for transmission over the network to a client computer to initiate coupling; and a plurality of server computer code segments resident on the server which execute on the server in response to initiation of coupling via the network with a particular client utilizing the transmitted client computer code segment for communicating via a particular communication protocol. A session manager is utilized to manage the initiation of a plurality of network sessions.

BRIEF DESCRIPTION OF THE DRAWINGS

The above and further advantages of the invention may be better understood by referring to the following description in conjunction with the accompanying drawings, in which:

FIG. 27 describes the forms of a Presentation Engine, as an abstract Java class, a template for development, and an executable component in an application in accordance with a preferred embodiment;

FIG. 28 describes the functions developers must fill in using the server program template in accordance with a preferred embodiment;

FIG. 29 illustrates Server Properties in accordance with a preferred embodiment; and FIG. 30 is a table of client and server side exceptions in accordance with a preferred embodiment.

DETAILED DESCRIPTION

Figure 1:
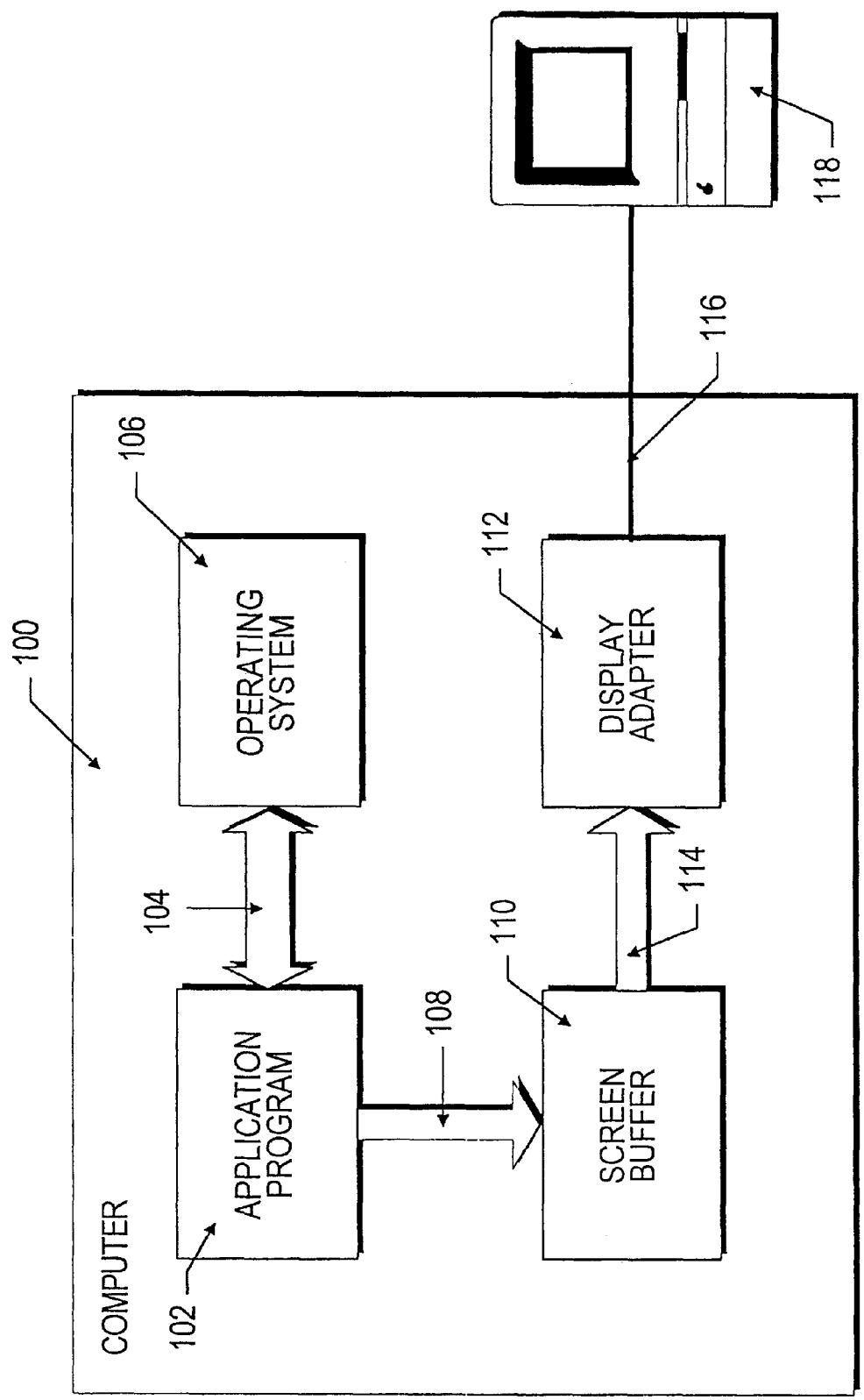
FIG. 1 is a schematic block diagram of a prior art computer system showing the relationship of the application program, the operating system, the screen buffer and, the display monitor.
Figure 2:
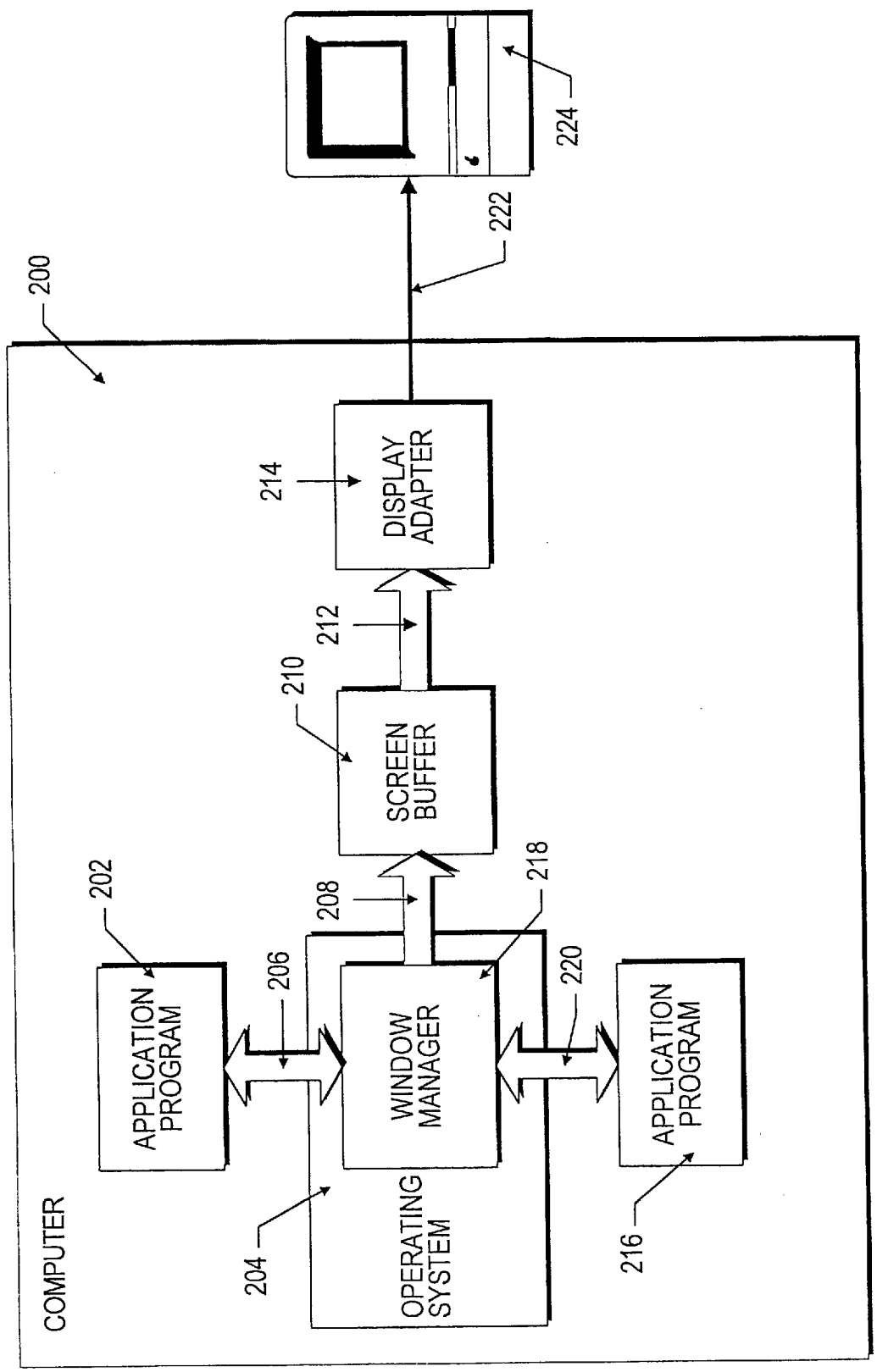
FIG. 2 is a schematic block diagram of a modification of the prior art system shown in FIG. 1 which allows several application programs running simultaneously to generate screen displays.
Figure 3:
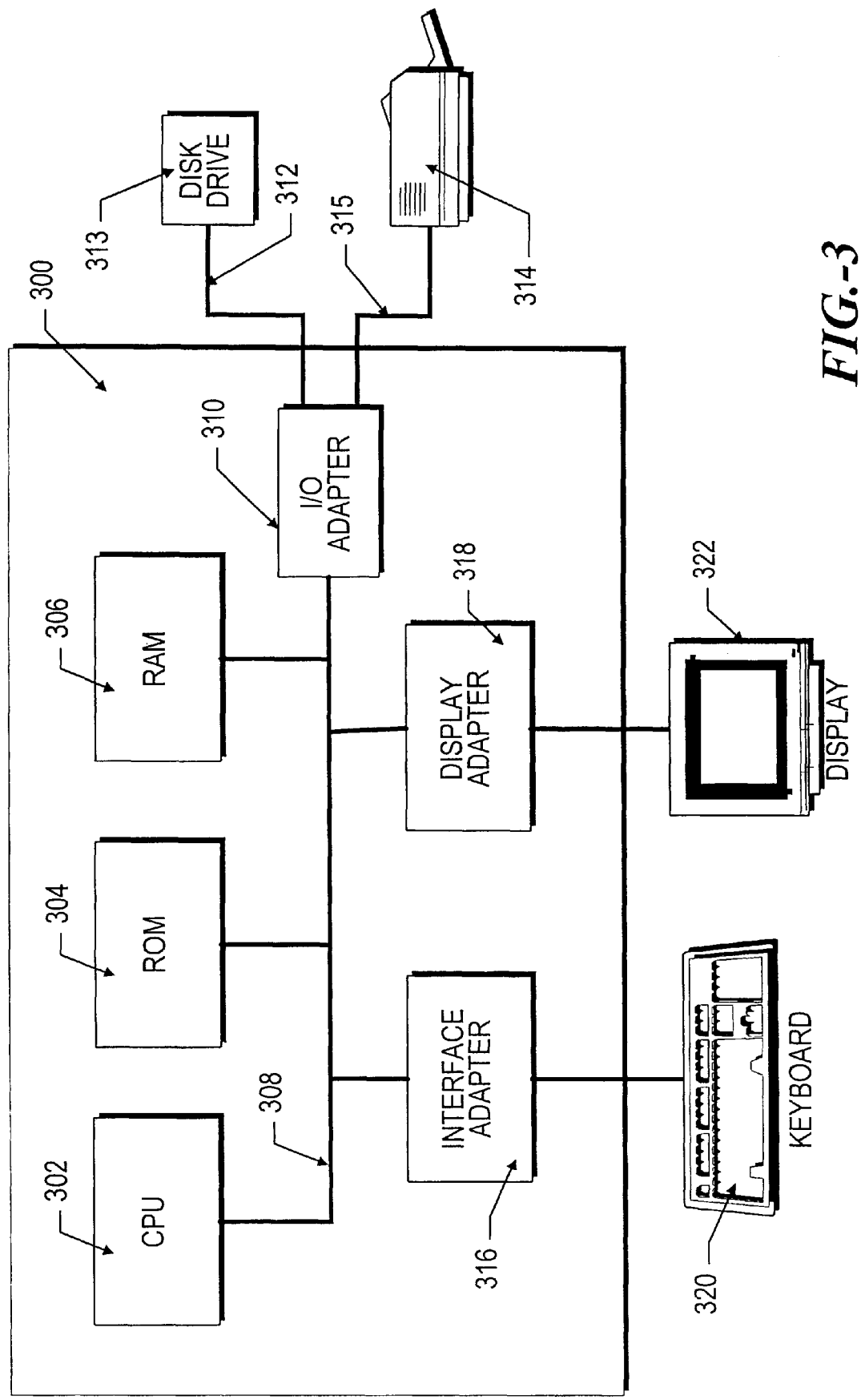
FIG. 3 is a block schematic diagram of a computer system for example, a personal computer system on which the inventive object oriented window manager operates.

The invention is preferably practiced in the context of an operating system resident on a computer such as a SUN, IBM, PS/2, or Apple, Macintosh, computer. A representative hardware environment is depicted in FIG. 3, which illustrates a typical hardware configuration of a computer 300 in accordance with the subject invention. The computer 300 is controlled by a central processing unit 302 (which may be a conventional microprocessor) and a number of other units, all interconnected via a system bus 308, are provided to accomplish specific tasks. Although a particular computer may only have some of the units illustrated in FIG. 3, or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322, such as a video monitor. The computer has resident thereon and is controlled and coordinated by operating system software such as the SUN Solaris or JavaOS operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "frameworks" and essentially provide a pre-fabricated structure for a working application.

For example, a framework for a user interface might provide a set of pre-defined graphic interface objects which create windows, scroll bars, menus, etc. and provide the support and "default" behavior for these graphic interface objects. Since frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), and Smalltalk-80 MVC (ParcPlace).

While the framework approach utilizes all the principles of encapsulation, polymorphism, and inheritance in the object layer, and is a substantial improvement over other programming techniques, there are difficulties which arise. Application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a display framework which could provide the foundation for creating, deleting and manipulating windows to display information generated by an application program. An application software developer who needed these capabilities would ordinarily have to write specific routines to provide them. To do this with a framework, the developer only needs to supply the characteristics and behavior of the finished display, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others' capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the merchant. HTTP or other protocols could be readily substituted for HTML without undue experimentation. Information on these products is available in T. Berners-Lee, D. Connoly, "RFC 1866: Hypertext Markup Language—2.0" (Nov. 1995); and R. Fielding, H, Frystyk, T. Berners-Lee, J. Gettys and J. C. Mogul, "Hypertext Transfer Protocol—HTTP/1.1:HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

Java is compiled into bytecodes in an intermediate form instead of machine code (like C, C++, Fortran, etc.). The bytecodes execute on any machine with a bytecode interpreter. Thus, Java applets can run on a variety of client machines, and the bytecodes are compact and designed to transmit efficiently over a network which enhances a preferred embodiment with universal clients and server-centric policies.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

A preferred embodiment provides a system for building manageable applications. The applications can be readily deployed, on to a variety of platforms, and configured so that it's easy to partition them on to clients versus servers and administer the applications. A preferred embodiment is enabled as a client server application that's distributed nodes in a multi-node platform. A single application is divided up into pieces and distributed across nodes in the network. Thus, an application is defined as a distributed system.

Enterprise computing systems often a heterogeneous collection of nodes interconnected by a network. In a typical environment, a server node in the network holds data and programs that interact with the database, and a client node contains a program or programs for accessing the information on the server. The complexity of these environments makes it difficult to create, configure, deploy and administer software applications. However, the advent of Web technologies (browsers, the Java language and HTTP) has enabled enterprises to create and use internal Webs to assist in solving some of these problems. Java enables the Web as a client-server application platform and distribution channel to interact with a preferred embodiment in addressing many of the aforementioned challenges.

A preferred embodiment includes a toolkit for creating client programs that can be downloaded from the Web; interfaces for enabling a server program to function with a client as a single application; tools for connecting both client programs and server programs with a framework for executing the tools; and tools for installing, deploying and administering applications.

An application created in accordance with a preferred embodiment consists of a set of components that cooperate with each other. A server component can be implemented in any source language that can call a C program. A client component is implemented in the Java programming language. The client component consists of a GUI and a Presentation Engine (PE). To complete the application system, a preferred embodiment provides a communication layer that enables the exchange of messages between the client and the server components, an Exception layer for reporting errors, and an Access layer for managing application deployment. The task of an application developer utilizing a preferred embodiment is to assemble the components into an application system.

A preferred embodiment provides Java client access to server applications and can be utilized to create new applications or extend existing applications. Among existing applications, those that are partitioned so that server programs and databases are on the server, and user interfaces are on the client are especially suited for migration to the preferred embodiment. Other applications especially suited to a preferred embodiment require access to departmental or corporate data without changes to databases or the programs that access them. For enterprises already using the web technologies in an Internet, Intranet or other network environment, applications in accordance with a preferred embodiment provide quick access to existing data from anywhere in the organization or the world. Applications in accordance with a preferred embodiment can execute on any processor with the Java interpreter/runtime (Java JDK) or JavaOS installed. Application client programs are developed in Java using a null application template that contains the necessary Java classes and methods for integration with a Graphical User Interface (GUI). The template includes Java classes which will allow the client program to communicate with the server program. Scripts and tools for installing and deploying applications, include a generalized startup applet for application launch from a Web browser or applet viewer.

The primary development task in accordance with a preferred embodiment is to create an application front end referred to as a Presentation Engine, hereinafter (PE), from a provided template. The PE template includes methods (logic in an object) to send messages and their data through a client communication library. Developers modify the template to specify the messages and data required for their application. The communication library handles the passing of messages and data across the network. The PE toolkit supports these tasks. The toolkit is a full set of Java components which can be modified and extended for a particular application's requirements. The server program must also be enabled to communicate with the client by specifying which handler functions are called in response to inbound messages and inserting "send" calls to a server-local communication library when data are sent to a client. The two PE development tasks are to: (1) connect a Java UI to the PE framework, and (2) define/describe the messages to be exchanged between the PE and the server.

All of the components in accordance with a preferred embodiment reside on the server so that the server controls all access to its resources. The server thus controls deployment and administration of its set of applications. The clients use the web to access the server's resources. A template is also provided for creating an applet that enables users at client nodes to start applications from a browser which will be discussed in added detail below.

Figure 4:
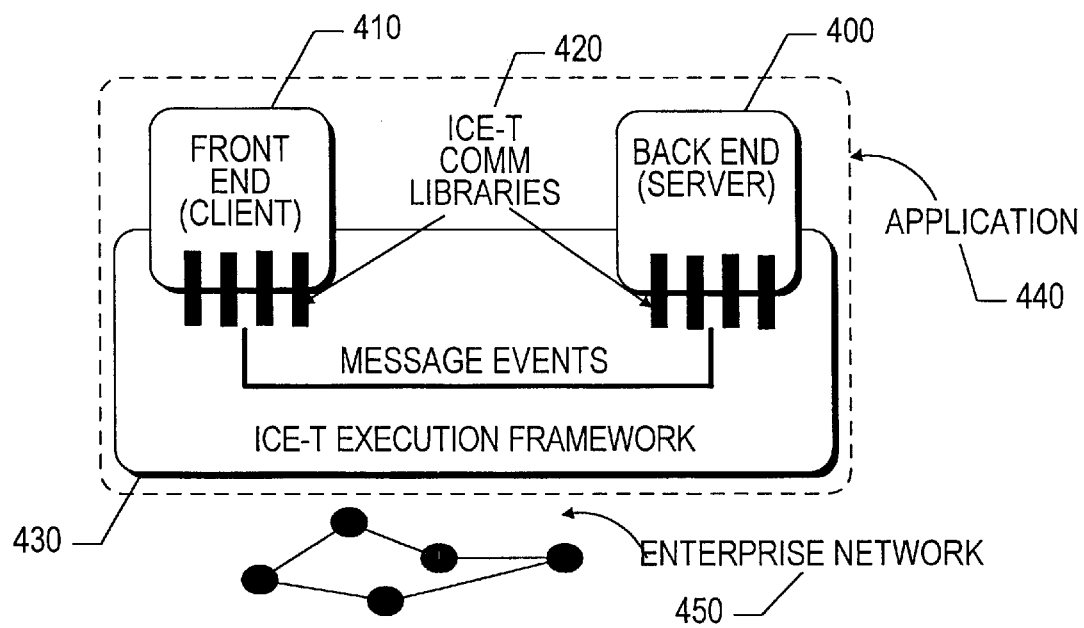
FIG. 4 is a block diagram in accordance with a preferred embodiment.

FIG. 4 is a block diagram in accordance with a preferred embodiment. The client 410 and back end server 400 create and receive data messages communicated via messages at their local communication libraries 420. Messages are events which are encoded in a protocol, "ictp" layered on top of TCP/IP. The execution framework 430 layer could be implemented on any network protocol as asynchronous, event-driven message passing on top of a communication protocol, such as TCP/IP, avoiding the dependencies of any particular server protocol. An application has a specific set of message events, and each component (front 410 and back 400 ends) includes local handlers for the set of message events. Thus, any two components can be plugged into the execution framework 430 to form an application 440 if they include local handlers for messages in the set of message events defined for the application 440. The components each include a local instance of a communication library 420. A component only interacts with the Application Programming Interface (API) of its local communication library 420 in order to send or receive message events.

Application components in accordance with a preferred embodiment are "loosely coupled" because there is no direct dependence (or communication) between the components. The execution framework 430 provides a consistent connection for all message transfer for the various applications. The execution framework 430 supplies additional services, such as error reporting, for the connection. An application 440 is insulated from the physical properties of the specific distributed platform on which the application is deployed. Thus, the application components and set of message events remain constant while the distributed platform can be scaled and modified.

Figure 5:
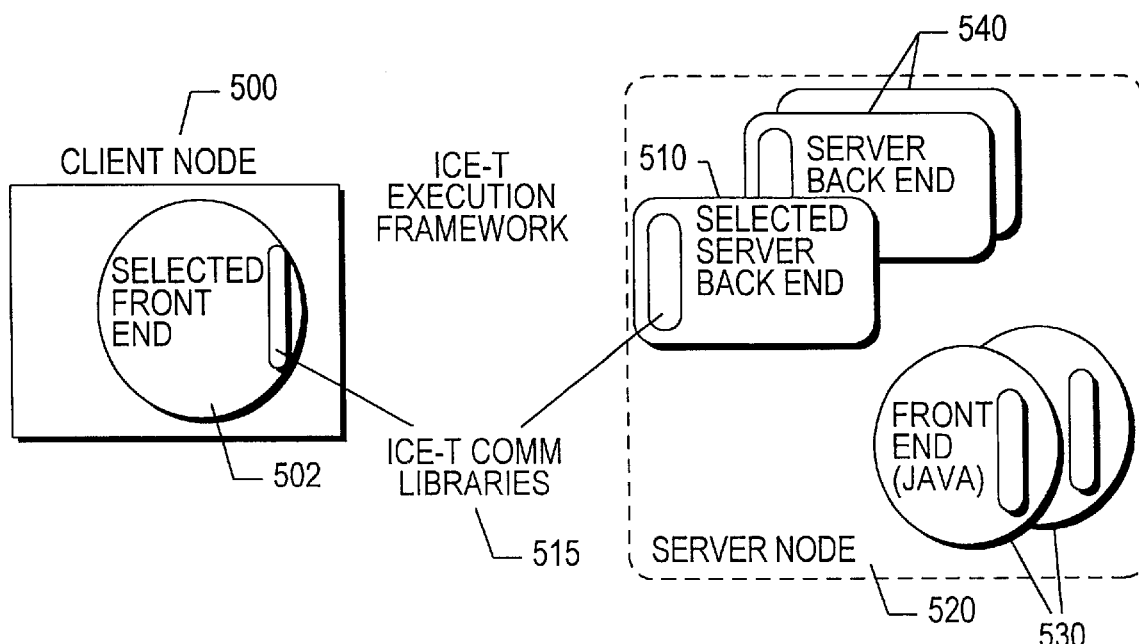
FIG. 5 illustrates how a preferred embodiment leverages Java to facilitate the establishment and implementation of sever-centric policies.

Since applications 440 are systems containing well defined components as is shown in FIGS. 4 and 5, it is possible to install sets of front ends 530 and back ends 540 plus the definitions of how to associate them into applications 440. The server, therefore, holds all the resources while the client 500 can only request access to the resources. The server 520 is extended to allow it to control access to its resources by enforcing well defined policies.

FIG. 5 illustrates how a preferred embodiment leverages Java to facilitate the establishment and implementation of server-centric policies. The client and server nodes communicate utilizing the web technologies in an Internet, Intranet or other network environment. The client node 500 contacts the server node 520 via HTTP with a request to execute an application. After authenticating the client 500, the server node 520 selects front 502 and back end 510 components based on the application definition list maintained at the server node 520. The server starts its back end process 510 and sends the front end program 502 to the client node via the Web technologies in an Internet, Intranet or other network environment. The client 500 executes the selected front end 502 locally at the client node 500. The front end (client) programs open a TCP/IP connection back to the server to initiate message passing in order to run the applications. The front end program 502 is implemented entirely in Java which facilitates instances of client/server applications which can run concurrently on a set of multi-platform clients. The server 520 is able to send a front end program 502 to any client node 500 which has the Java runtime installed on the computer. Server policies will not involve the clients. The policies will focus on the server's control of its local resources.

FIG. 5 also illustrates the loose coupling between the front end 502 and the back end 510 application components. Each program includes a local communication library 515. The front end library is implemented in Java, the back end library is implemented in C++ with a C API. The programs each utilize their local communication library API to send and receive messages. Thus, the programs do not communicate directly with each other.

Presentation Engine

There are two phases for each application execution. In the first phase, application startup, the client node requests access to the server node's resources and the server acts on this request. The nodes are associated via the Internet or other communication network, and thus do not have a permanent relationship within the enterprise. In the second phase, application execution, the client has received a front end Java program called a Presentation Engine (PE) to facilitate presentation services. The front end and back end are communicating via the execution framework over TCP/IP.

Figure 6:
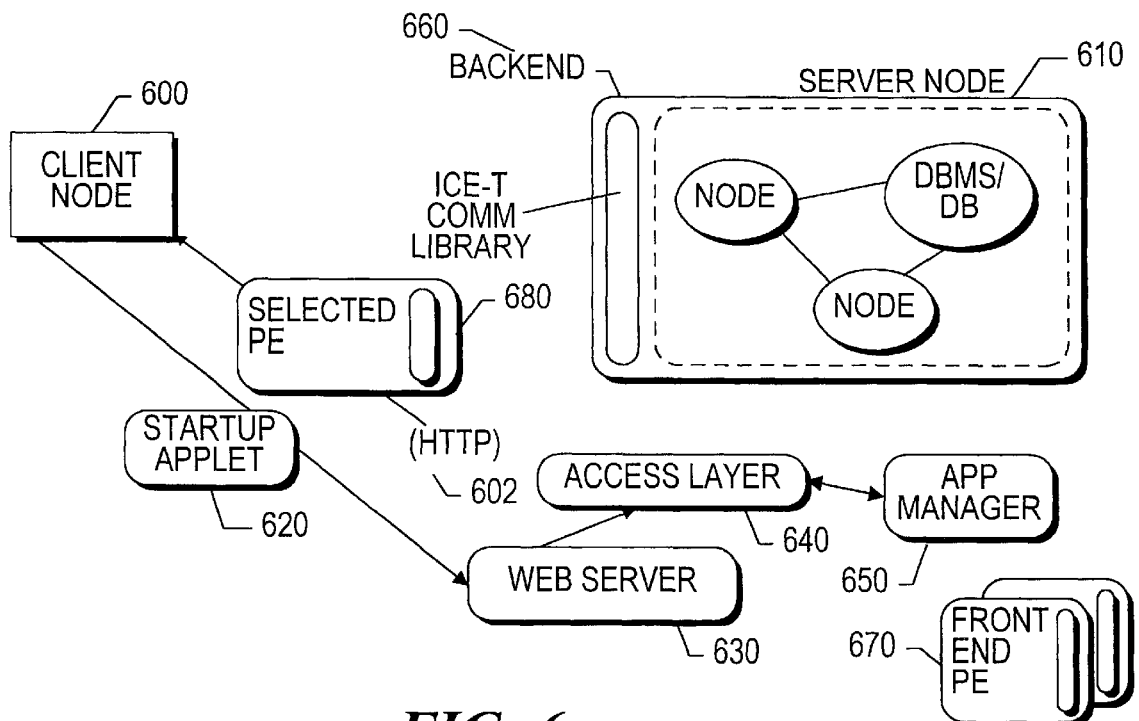
FIG. 6 illustrates the processing associated with application startup in accordance with a preferred embodiment.

FIG. 6 illustrates the processing associated with application startup in accordance with a preferred embodiment. When an application is started, the client node executes a startup applet 620 which first collects information about the client 600 user and contacts the server node 610 via http 602.

The server node 610 has been extended to include a web server 630 for processing requests via HTTP over the Web technologies in an Internet, Intranet or other network environment. The access layer 640 is called via a cgi-bin interface from the web server 630. The access layer 640 provides a framework so that the information about the client user, for example userid and password, can be used to call server-resident authentication services. Should authentication be successful, the access layer 640 uses the application name, which is also supplied by the startup applet, and invokes the app manager 650. The app manager 650 handles the application definitions installed on the server node 610. The app manager 650 selects the application back end 660 and initiates the processing. A listener socket is opened on the server node, and the port number is returned to the app manager 650. The ap manager 650 also selects the application Front End (FE) 670, stored on the server as a set of Java bytecodes, and creates a PE 670 instance which includes the listener socket port number. Application startup ends when the PE 670 instance is downloaded to the client node for execution.

Application Execution

When application execution is initiated, the client node begins to interpret the PE 700 (FIG. 7) it has received from the server node 710. The PE 700 is a framework (which includes an User Interface (UI) which can include a graphical UI (GUI)) and an instance of a communication library 720 implemented in Java. Once it starts up, the PE 700 opens a socket connection to the server node 710 utilizing the server port number it was supplied when the server app manager 650 started the back end process 730. The back end process 730 on the server node 710 may be a distributed system which encapsulates an interface to a Data Base Management System (DBMS) 712. The front end 700 focuses solely on presentation services and its own web access capabilities. The execution framework 724 specifically links the front end component 700 to the back end component 730 using event-driven message passing 735. This design preserves modularity between the front end 700 and the back end 730 of an application.

During application execution, the server node 710 communication library 720 manages the connection to facilitate policies that maximize access to its resources. For example, a server can be configured for a maximum time to await a transaction response. A timer runs, if it exceeds the maximum time before new client messages are received the server will terminate the client connection and recycle the port. The execution framework 724 supplies runtime error reporting services and application execution data which are accessible to system administrators via Web technologies in an Internet, Intranet or other network environment access. When application execution terminates, the relationship between the client node 700 and the server node 710 also terminates. Application startup must occur each time application execution is desired.

A client's presentation engine can be stored on the client node and started dynamically if the presentation engine is cached on the client. The reason for storing the presentation engine in cache is to support mobile (nomadic) computing, performance and to reduce network traffic. This technique would require versioning to assure that the presentation engine is synched with the latest, most current release on the server.

Application Development

Figure 7:
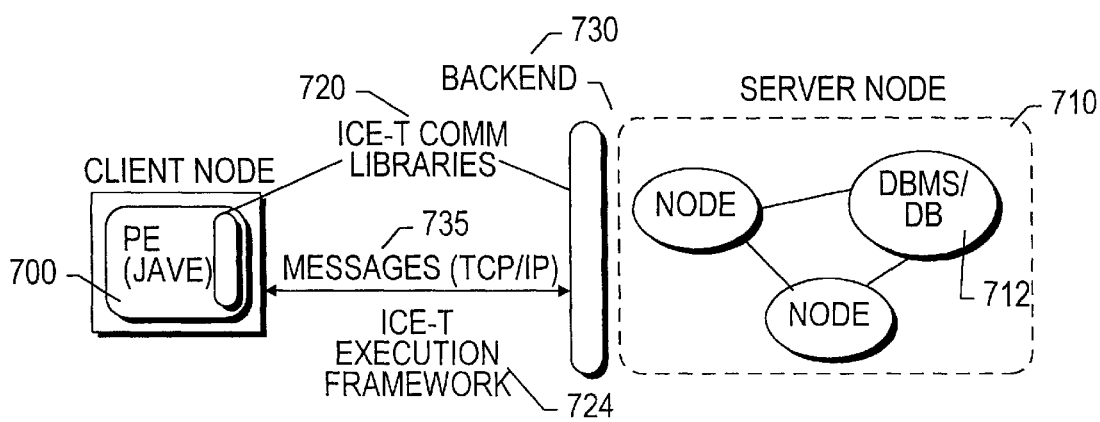
FIG. 7 illustrates the three fundamental components of an application in accordance with a preferred embodiment.
Figure 8:
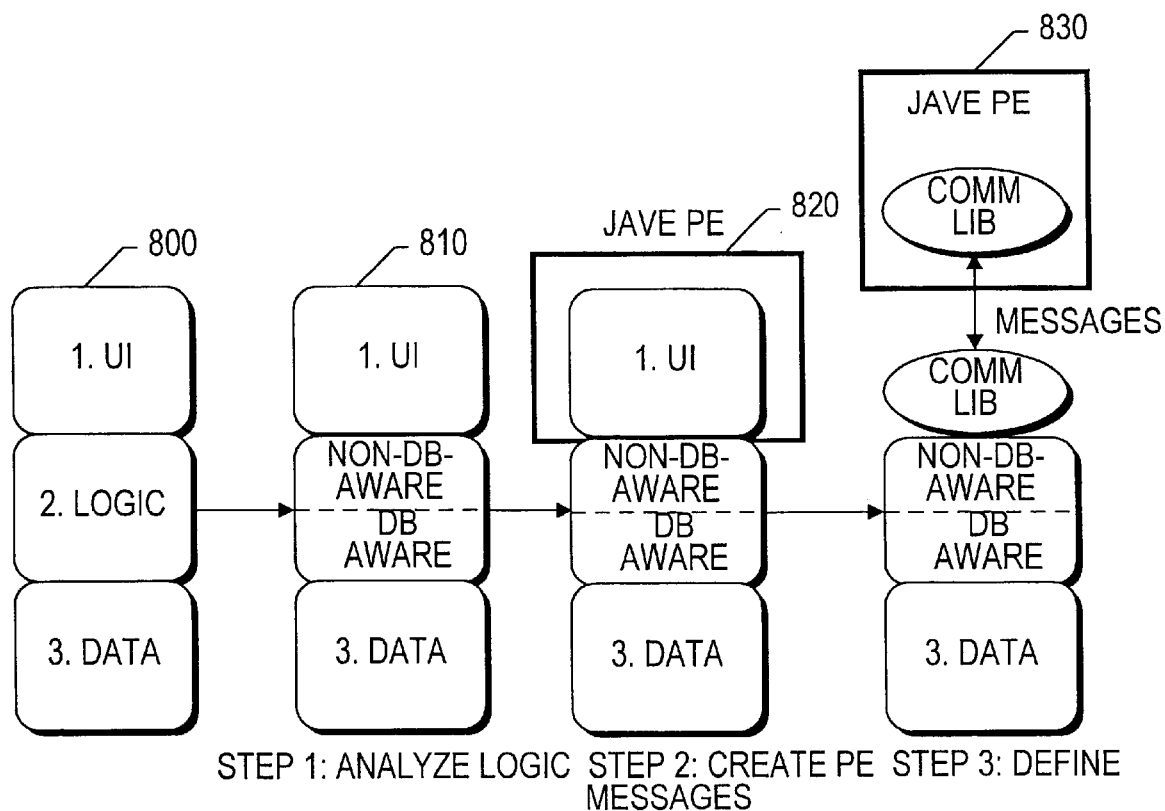
FIG. 8 illustrates the migration of an existing client-server application to one supported by a preferred embodiment.

The application development process in accordance with a preferred embodiment is a system integration task rather than a third generation language programming task. FIG. 7 illustrates the three fundamental components of an application in accordance with a preferred embodiment. The front end, client side 700, the back end 730 server side 710, and the execution framework 724 which facilitates the connection between the front end and the back end. The application development process consists of a plurality of steps. The first step defines the responsibilities of the front and back end components. A preferred embodiment is designed to facilitate migration of existing client/server applications to function utilizing the Web technologies in an Internet, Intranet or other network environment for communication services. This migration does not require redesigning existing application logic. The process entails the implementation of a new PE front end implemented in the Java language which exchanges message events with the remaining server back end code. FIG. 8 illustrates the migration of an existing client-server application to one supported by a preferred embodiment.

The new Java PE front end 820 is added to the existing application code and will contain the Presentation Layer (UI tier) 800 and some amount of non-database aware logic responsible for manipulating variables. All logic which is aware of the database and its data remains in the back end component. The PE 820 is not limited to logic from the existing application. It is a program implemented in Java, and thus can take direct advantage of additional Internet related services within the enterprise intranet. The complexity of the PE is determined by the developer's choice.

The second step in migrating existing applications to utilize a preferred embodiment is to define the message events exchanged between the PE and the back end. The PE and the back end are loosely coupled and exchange data events. Each event has a unique name and data associated with the event. Message event data items are declared by type, all primitives plus one composite type. Message data types directly map to primitive types in both Java and C. The communication libraries have APIs which can be used by developers to define message events.

The third step is to set up the back end to handle message events. The server resident back end component must handle message events. This processing is enabled by linking in an instance of the communication library with existing server code. The communication library has a C API, so the server code can be implemented in any language which can call C. The existing server code utilizes the communication library API to send and receive messages. The communication library calls handler functions in the server code when message events come in from the front end. The developer will create these handler functions and register them, one handler function per defined message event, using APIs in the communication library.

Once compiled and linked, the back end is a single process which is started by the app manager during application initiation. The interface between the server communication library and the server code is multi-threaded.

The fourth step is to develop a Presentation Engine front end. Java is utilized for this task. Templates and tools are provided to facilitate this task. The detailed tasks associated with facilitating these tasks are described below.

The final step in migrating an existing client server application to a preferred embodiment is to install application components on the server node. Both the front end (client) and back-end components are installed on the server node. A Java startup applet enables clients to access the application on the server. A set of tools for application installation and configuration are provided as applications on server nodes in accordance with a preferred embodiment. A Java startup applet template is also provided to facilitate development of the application's startup applet.

Presentation Engine Development

Presentation engine development is the step of developing a new application front-end in Java. To simplify this task and provide application performance and robustness guarantees, all application front ends are instances of a single class of programs. A basic presentation engine framework implemented in Java is provided as an example in accordance with a preferred embodiment. Developing a specific application presentation engine means extending and customizing the basic presentation engine framework template. A Presentation Engine (PE) is itself a system with two components: (1) a UI implemented in Java, and (2) the PE framework. Developing a PE is a system integration task with the following two steps.

(1) Develop a UI which is implemented with Java

Figure 9:
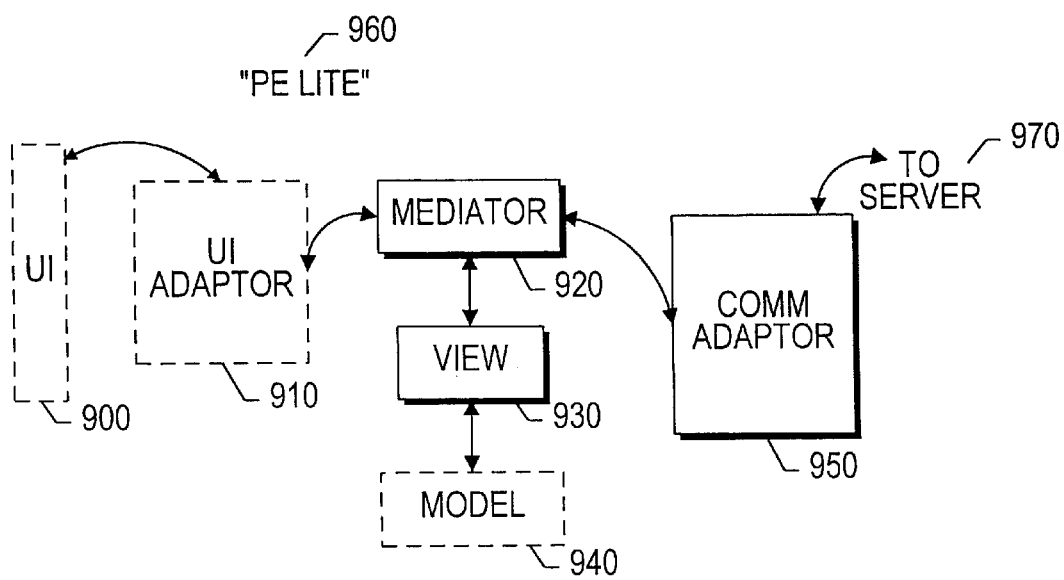
FIG. 9 is a block diagram illustrating a PE 960 in accordance with a preferred embodiment.

FIG. 9 is a block diagram illustrating a PE 960 in accordance with a preferred embodiment. The UI 900 component is developed according to a developer's particular requirements. Since the front end processing utilizes the Java language, the UI also takes advantage of Java's rich functionality. The UI 900 is connected to the PE 960 framework via an interface to the UI Adaptor 910 component. The interface is a general message-passing interface that facilitates the attachment of any Java implemented UI 900 with the PE 960 framework to exchange data events. An API is provided to the PE 960 framework so that a developer can link the UI 900 to the UI Adaptor 910.

(2) Extend the PE Framework Template (960)

FIG. 9 illustrates how the PE Framework 960 architecture is arranged to facilitate two kinds of external events in accordance with a preferred embodiment. The two kinds of external events are UI events and Message events from the Execution Framework. The framework includes a Java implemented communication library component, the Comm Adaptor 950. The PE framework 960 interfaces to the UI 900 via the UI Adaptor 910 and interfaces to the server TCP/IP connection via the Comm Adaptor 950. The mediator 920 component handles all external events moving into and out of the PE framework 960.

The UI 900, UI Adaptor 910 and the Model 940 are directly extended by the developer supplying application specific information. The communication library and mediator components are not extended by developers. The PE framework 960 has a model 940 -view 930 -controller architecture. A developer may extend the Model 940 component in order to implement local logic and maintain PE-local state. The view component 930 maps between the Model 940 data representation and the message data representations.

It is possible to create a PE framework without extending the Model 940 component of the PE Framework 960. This model is referred to as a "PE-lite" option and consists of the comm adaptor 950, mediator 920, UI Adaptor 910 and the UI 900. To utilize this option, a developer assembles the components from a UI 900 and a PE framework instance 960. The PE framework 960 makes use of the Mediator 920 to directly map between UI external events and Comm external events.

The execution framework 960 is a communication abstraction that utilizes TCP/IP as a communication backbone, and is analogous to a bus in a computer system. Each component in accordance with a preferred embodiment plugs into the execution framework much as various function cards plug into the bus of a computer system. There is no notion of local versus remote in the components which is unlike a typical distributed computing environment.

In this architecture, there is no distributed domain. Everything is local and the way that a component connects up with this framework is by making local calls to a communication layer which is the framework. It's all embodied in the communication library components. So, the messages that are exchanged between programs are data. Rather than function calls, they are actually data containers. All that can happen in the exchange is that data are packed up and sent as an event, or data are packed up here and sent over there as an event.

Inside of the client and server programs, there are handlers for the data in the message events. So, any front end and any back end has local handlers for a common set of message events. They can be plugged together by the framework to create an application. So, what we call these is, "loosely coupled", which means that there are no dependencies between the programs and they do not communicate directly. This preserves modularity in the application. A program may send data events, and the program also is enabled to handle data events which interrupt its processing.

The framework currently is layered over TCP/IP for a communication vehicle, but other networking protocols can be utilized. The programs always interact with the ICE-T Comm Layer. There is a firewall between the actual, physical distributed platform, underneath and the application above because the application components are interfacing with the abstraction. Thus, applications are independent from the details of the physical structure of the distributed enterprise. The enterprise may be scaled, and/or modified without requiring re-design of the applications.

Example In Accordance With A Preferred Embodiment

Figure 10:
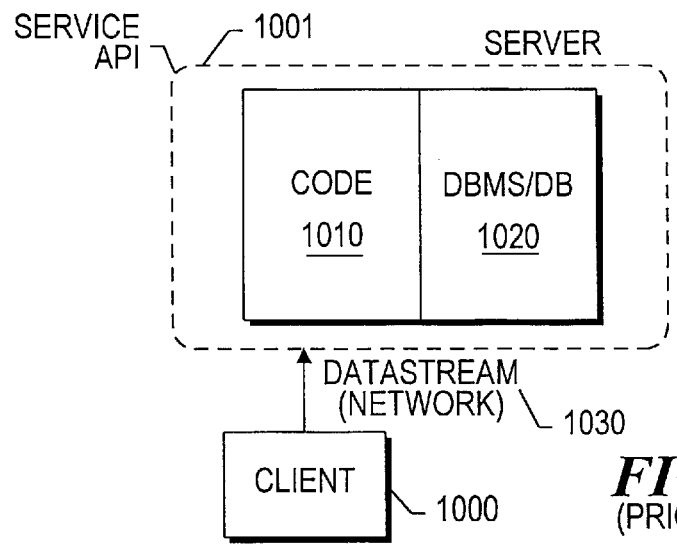
FIG. 10 is a block diagram of a prior art client server architecture in accordance with a preferred embodiment.

FIG. 10 is a block diagram of a prior art client server architecture. In the prior art a client computer 1000 would access a network 1030 via a predefined data protocol (datastream) and interact with a predefined server 1001 containing code 1010 and data in the form of a DataBase Management System (DBMS) 1020.

Figure 11:
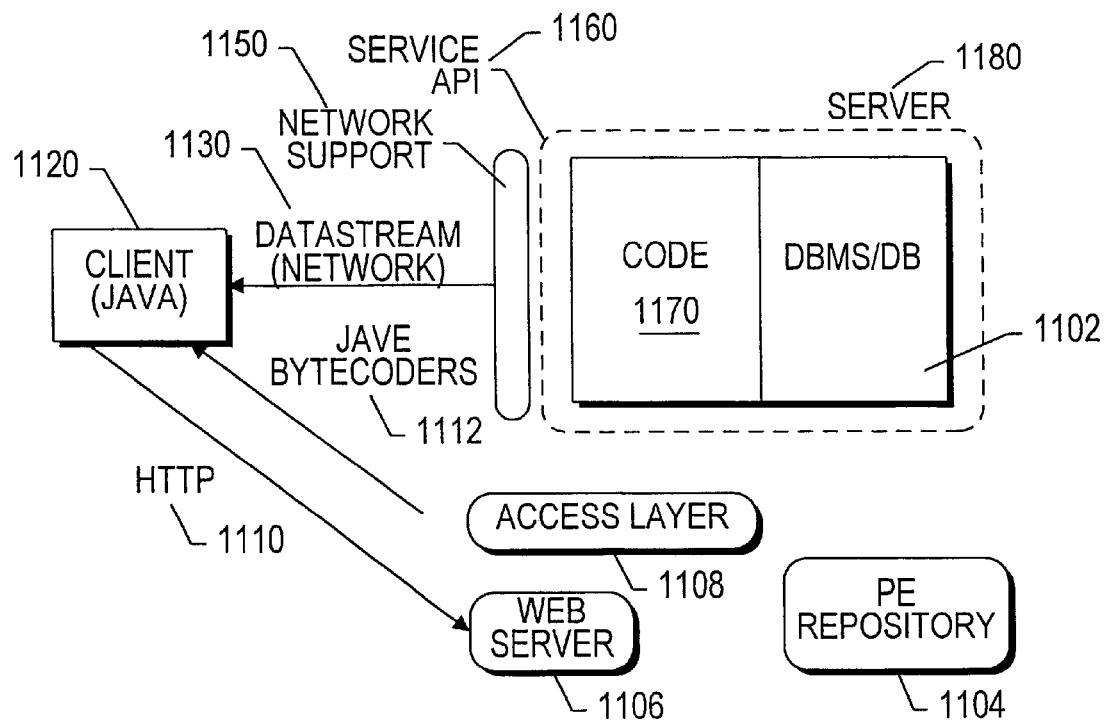
FIG. 11 illustrates an application in accordance with an alternate embodiment.

An application in accordance with an alternate embodiment is shown in FIG. 11. The encapsulated DBMS 1102 is conserved, as is the enormous investment in code 1170. However, the server 1180 includes a service API 1160 for communicating to the network support 1150 which is responsible for turning the web node into a loosely coupled client 1120 utilizing a small amount of Java code and conforming to a predefined datastream that is sent by the server 1180 to the client 1120. A web server 1106 is utilized to facilitate access to and transmission of messages over the web from the server 1180 via the access module 1108 and the PE framework 1104 as discussed earlier and reiterated below.

Figure 12:
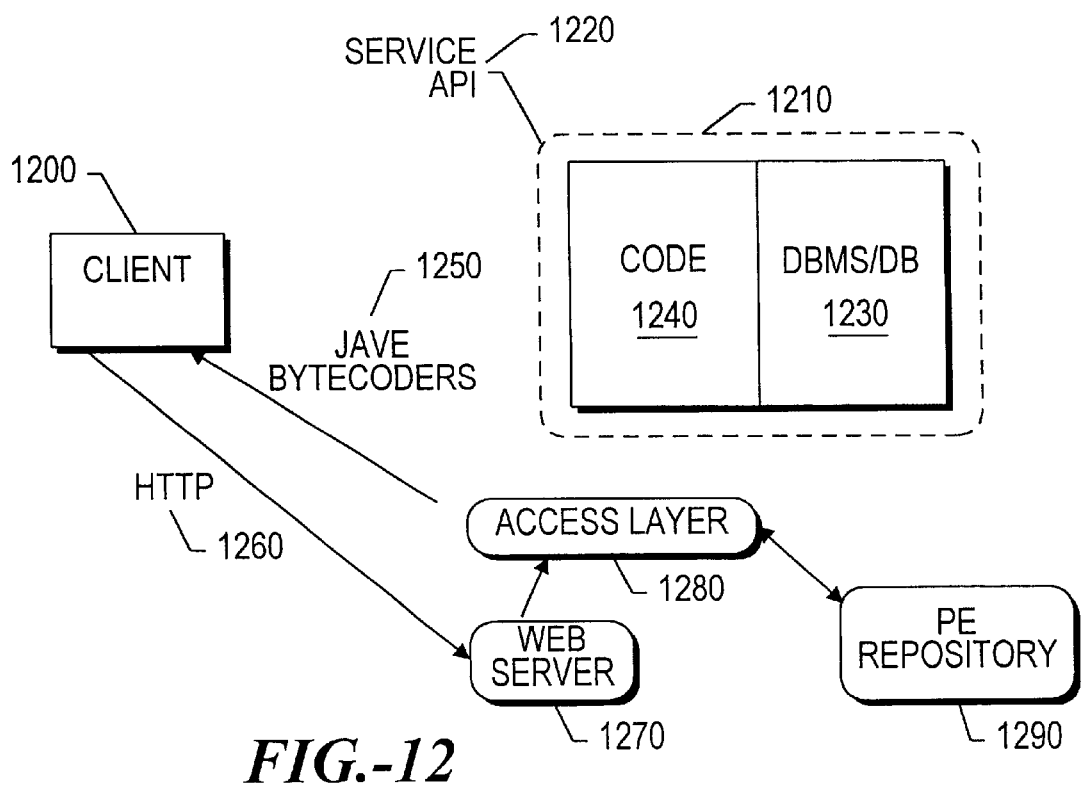
FIG. 12 illustrates a server 1210 establishing contact with a client 1200 in accordance with an alternate embodiment.

FIG. 12 illustrates a server 1210 establishing contact with a client 1200 in accordance with an alternate embodiment. The code 1240 and DBMS 1230 are as described in FIGS. 10 and 11. However, web contact is established between the nodes by authenticating a user utilizing the Access Layer 1280 to establish client 1200—server 1210 communication. Then, the Java bytecodes 1250 are extracted from the PE Repository 1290 and downloaded to the client 1200 using the Access Layer 1280 and the Web Server 1270.

Figure 13:
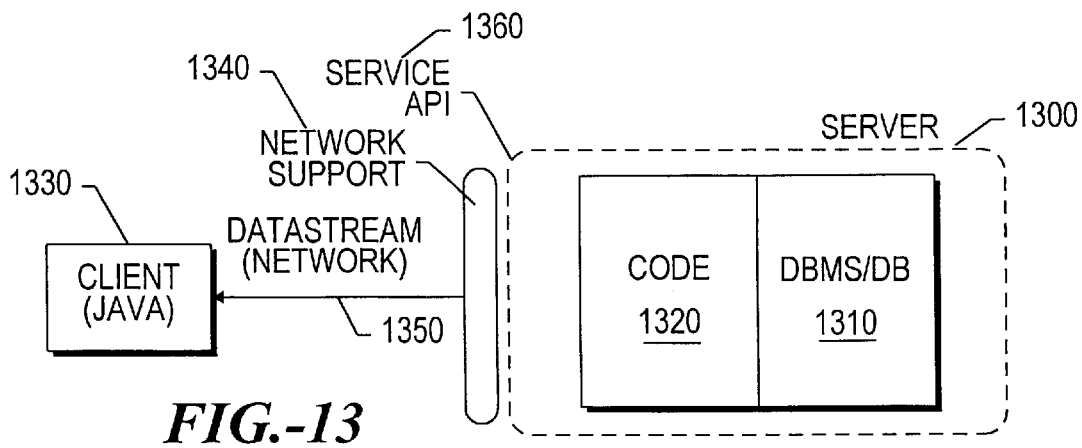
FIG. 13 illustrates a loosely coupled client—server application in accordance with an alternate embodiment.

FIG. 13 illustrates a loosely coupled client—server application in accordance with an alternate embodiment. The Server 1300 communicates via a service API 1360 and Network Support 1340 to a Client 1330 utilizing a predefined data stream 1350 and application code 1320 and a DBMS 1310. The "loosely" coupled nature of the application architecture is enabled through message communication in an asynchronous manner letting the Client 1330 and the Server 1300 maintain state independence and connect via a low bandwidth network 1350. The applications require no function call level API's.

Some of the basic architectural design decisions that form the foundation of a preferred embodiment include the Server 1300 controlling both the Client 1330 and Server 1300 states. The Java language is utilized to communicate via the Web technologies in an Internet, Intranet or other network environment to distribute Client 1330 state information to the Client node. The Server 1300 presents an encapsulated DBMS interface to the network. The Server 1300 node is extended by a framework to support the establishment of a Client 1330—Server 1300 relationship for web nodes.

The Client 1330—Server 1300 relationship for web nodes is established utilizing a secure http process which authenticates the user at the requesting node. Then, the Client 1330 node is established by selecting an appropriate Client 1330 state from stored states at the Server, and the Java client state is downloaded over the network to the particular Client 1330 node. Next, the Client 1330—Server 1300 network communication session is commenced by starting the server process and establishing a socket connection to the Client 1330 node. Once the session is established, then the network must be managed by maintaining event-driven message passing with the PE communication library.

Figure 14:
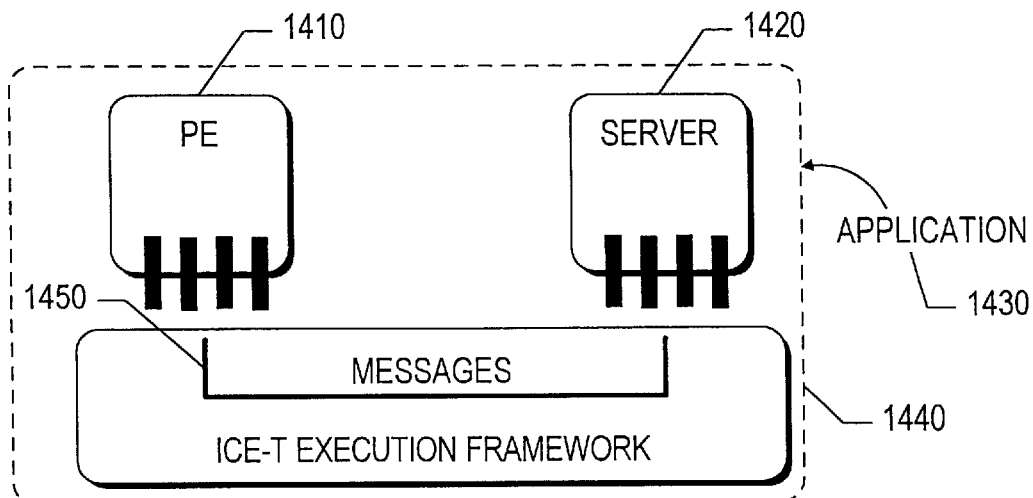
FIG. 14 illustrates the system integration task necessary to develop an application 1430 in accordance with a preferred embodiment.

FIG. 14 illustrates the system integration task necessary to develop an application 1430 in accordance with a preferred embodiment. First, the developer defines the message events 1450 that must be exchanged between components. The client program 1410 and server program 1420 are defined as applications 1430 on the Server Node 1420. The back end must be enabled to send and receive messages. The front end (PE) must be developed, then the components are installed in the server node 1420. The goal is to support modular application development and require minimal additional knowledge burden (e.g. sophistication in Java or OOP) from developers.

Figure 15:
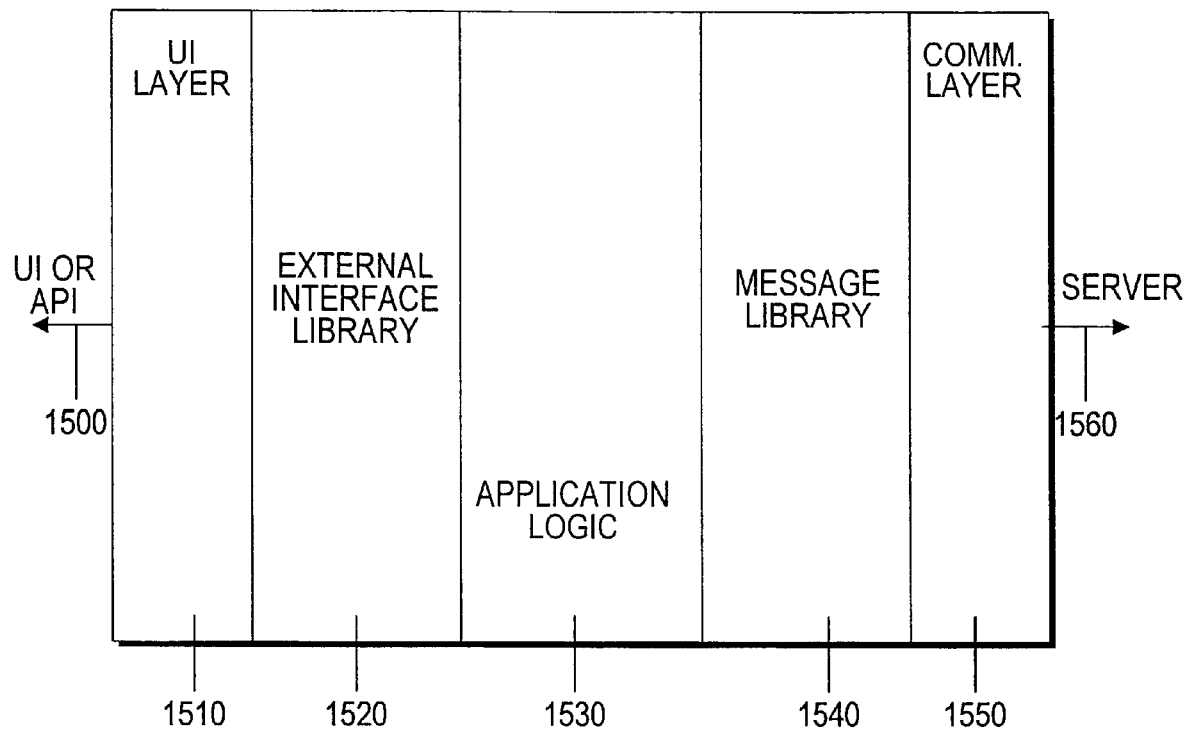
FIG. 15 is a block diagram illustrating the modular design of a client application in accordance with a preferred embodiment.

FIG. 15 is a block diagram illustrating the modular design of a client application (PE) in accordance with a preferred embodiment. The application logic 1530 is written entirely in Java to maximize access to Internet facilities. The application logic runs as a Java program or an applet. An External Interface Library 1520 contains various callable functions for interfacing to the UI or API 1500 through the UI layer 1510. A Message Library 1540 provides messages for use in communicating information through the communication layer 1550 to the Server 1560. The architecture is a client loosely coupled with the server 1560. Data exchange is via event-driven message passing. A flexible UI 1510 and communication layer 1550 facilitates message passing APIs interfacing to a Server or UI designs. Developers are not required to understand network communication or system programming in order to design and implement applications. The client program can be designed to support efficient presentation services. The DBMS interface is encapsulated in the back end (server). Thus, there are no distributed transactions which must be handled in the web connection between client and server.

Figure 16:
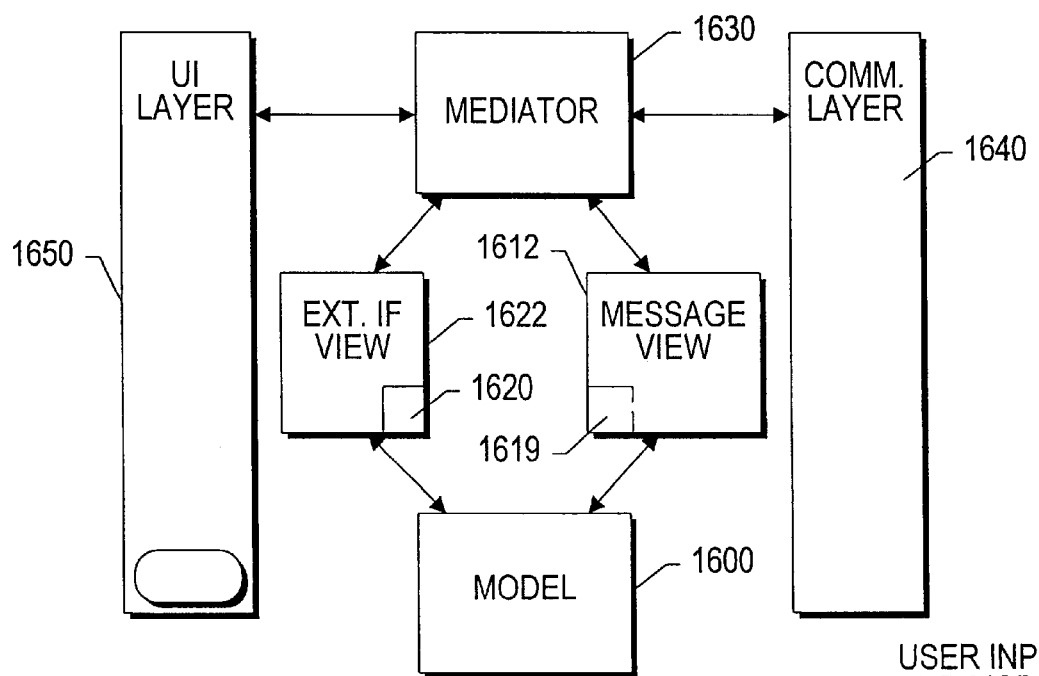
FIG. 16 is a block diagram of a framework in accordance with an alternate embodiment.

FIG. 16 is a block diagram of a framework in accordance with an alternate embodiment. Model data 1600 is provided in the form of predefined classes that can be accessed and modified by a user to add additional data or logic to meet the requirements of a particular application and specify appropriate maps for views or UI components. All of the class templates necessary to be extended into a fully functional model are provided. The Model data 1600 is utilized on the external IF View 1622 and additional model data 1620 may be added as necessary to expand the view. Similarly, the message view 1612 can be expanded by adding additional model data 1610 to the message view 1612. A mediator 1630 is responsible for routing messages and granting control to the Communication Adaptor 1640 or the UI Adaptor 1650.

Figure 17:
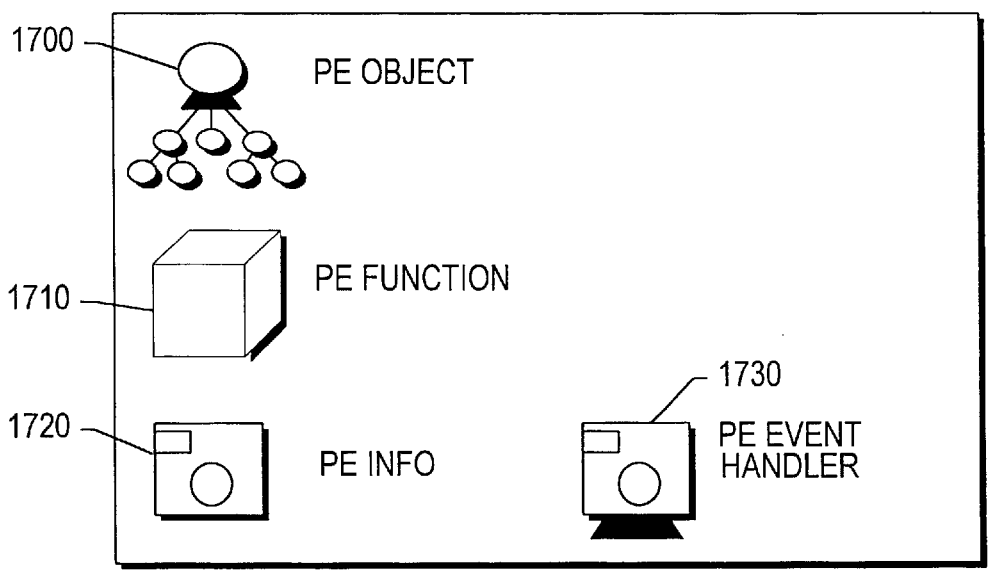
FIG. 17 illustrates the basic building blocks in accordance with an alternate embodiment.

FIG. 17 illustrates the basic building blocks in accordance with an alternate embodiment. A PE object 1700 is an object containing methods (logic) and data (public and private information) that is utilized to facilitate a reusable, extensible function. A PE function 1710 utilizes PE objects 1700 to implement callbacks, observers, event handlers and maps in accordance with a preferred embodiment. PE Info 1720 is a basic unit of data moved between functional components, and a PE Event Handler 1730 is used by views to handle incoming messages and UI events in accordance with a preferred embodiment.

Figure 18:
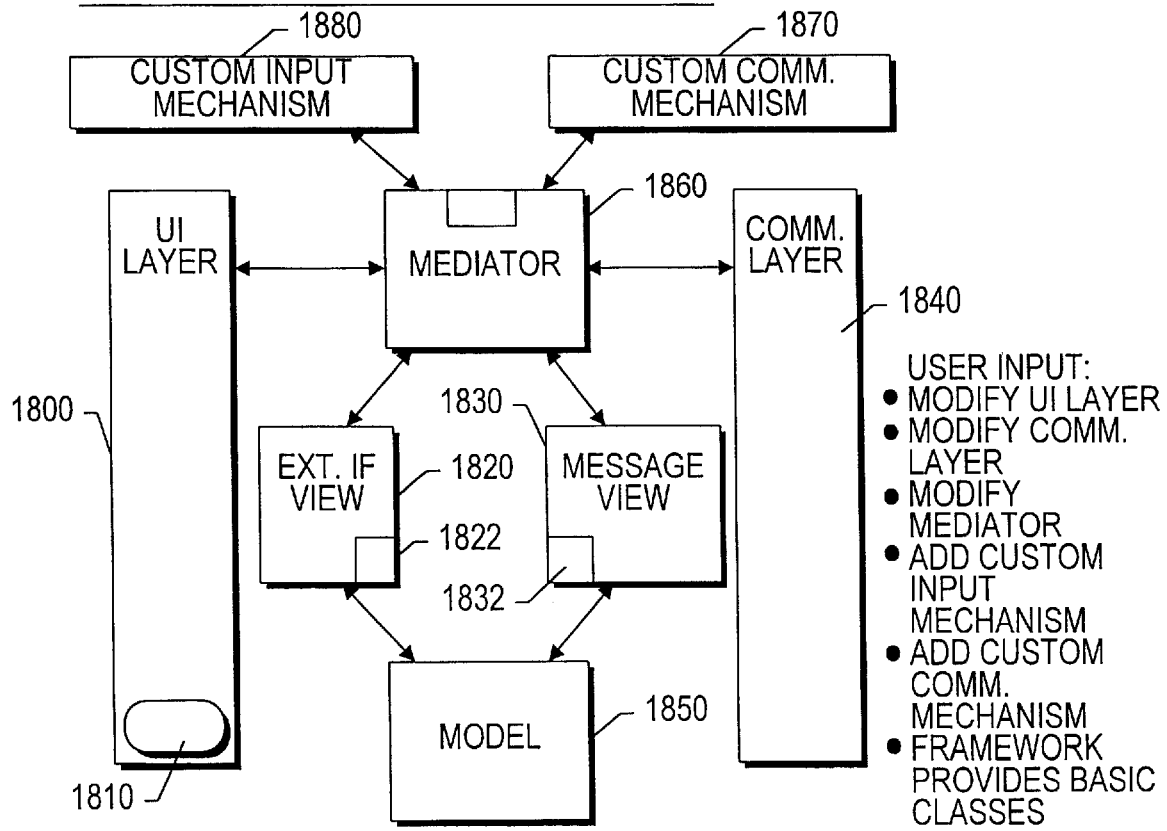
FIG. 18 is a block diagram highlighting the steps utilized to extend the framework in accordance with a preferred embodiment.

FIG. 18 is a block diagram highlighting the steps utilized to extend the (PE) framework in accordance with a preferred embodiment. A user must modify the UI Adaptor 1800 as shown at 1810. All of the base processing necessary to facilitate the application is incorporated into the basic framework which provides all of the basic classes for instantiating objects necessary to perform user's requirements.

Figure 19:
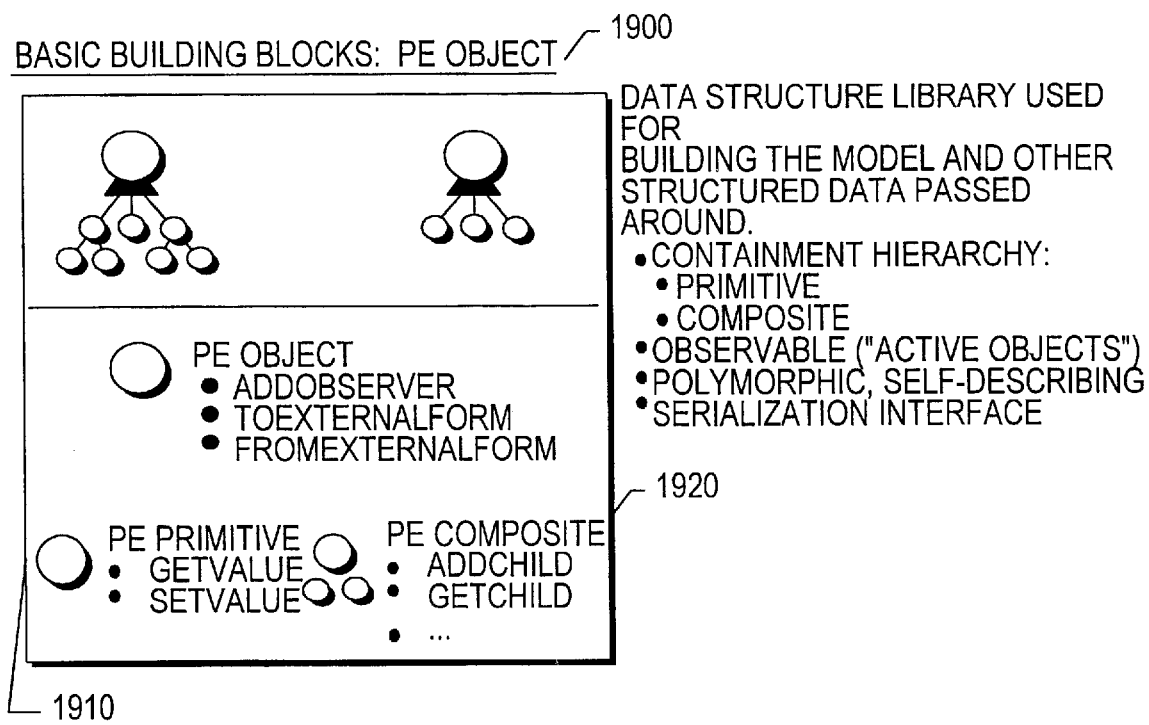
FIG. 19 is an illustration of a PE Object in accordance with a preferred embodiment.

FIG. 19 is an illustration of a PE Object 1900 in accordance with a preferred embodiment. The PE object is a data structure library that is used for building the model and other structured data passed around in messages. There is an associated containment hierarchy with primitive 1910 and composite 1920 objects instantiated from the base PE Object 1900. An object-oriented architecture facilitates polymorphic, encapsulated objects that are fully self-describing and fully enabling for a serialization interface.

Figure 20:
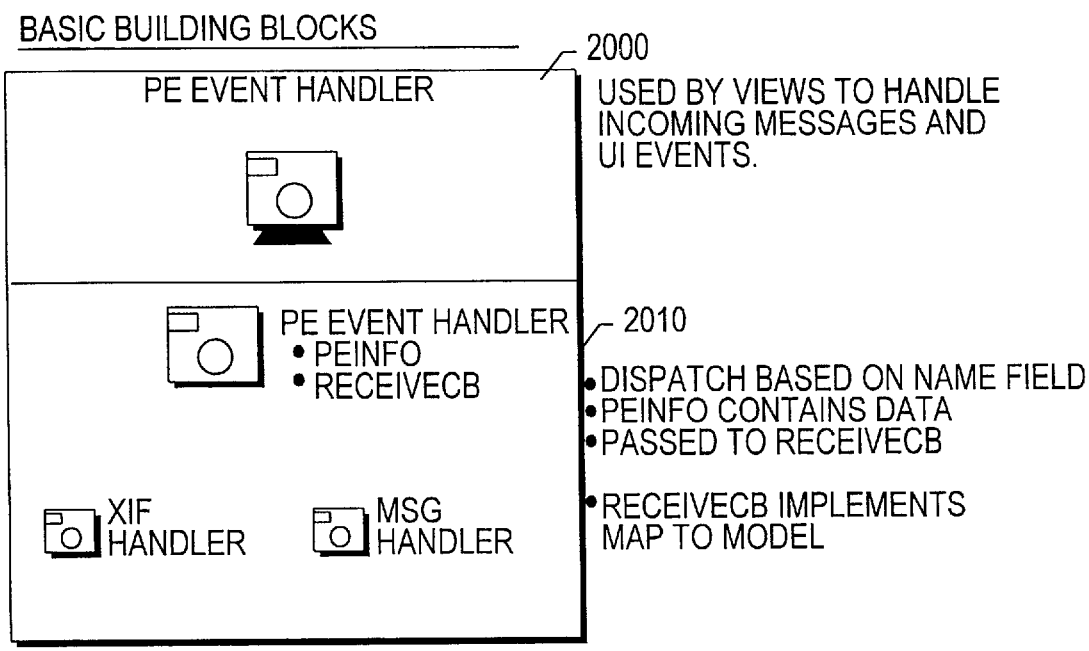
FIG. 20 is an illustration of a PE Event Handler 2000 used by Views to handle incoming messages and UI events in accordance with a preferred embodiment.
Figure 21:
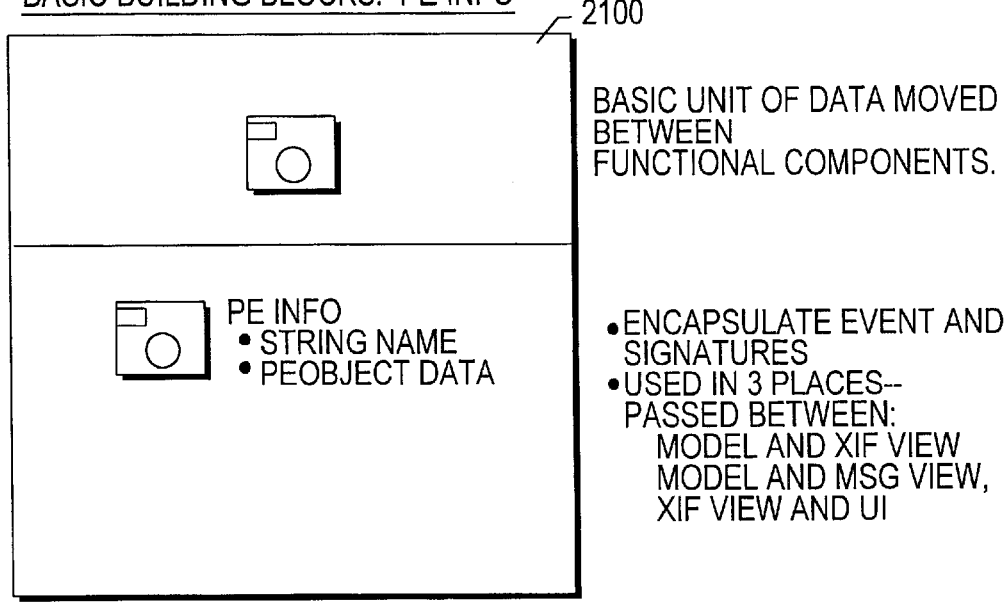
FIG. 21 illustrates a PEInfo object 2100 data in accordance with a preferred embodiment.

FIG. 20 is an illustration of a PE Event Handler 2000 used by Views to handle incoming messages and UI events in accordance with a preferred embodiment. The PE Event Handler 2000 dispatches tasks based on a name field and data defined in objects PEInfo 2010 data which is passed utilizing a message to implement a map to the model. FIG. 21 illustrates a PEInfo object 2100 data in accordance with a preferred embodiment. The data encapsulates event and message signatures and is used in three places for passing between model and XIF View, Model and Msg View and XIF View and the UI.

Figure 22:
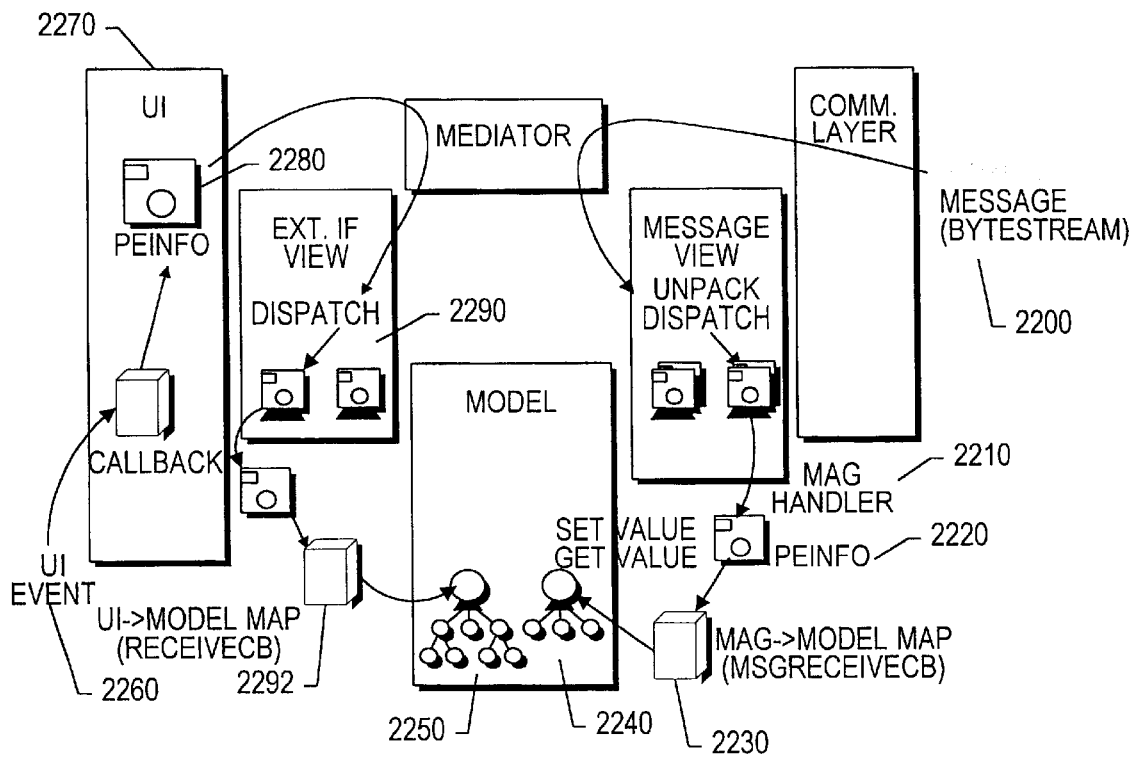
FIG. 22 illustrates incoming message flow to a model in accordance with a preferred embodiment.

FIG. 22 illustrates incoming message flow to a model in accordance with a preferred embodiment. A message flows into a communication layer in bytestream format 2200 and passed via a mediator to a message view 2210 to unpack and dispatch the message utilizing a MsgHandler PE Event Handler to transfer the PEInfo 2220 data. The PEInfo 2220 is used to encapsulate the event and message signatures and transform the message into a model map 2230 which is thereafter utilized for setValue and getValue processing 2240. When a UI Event, such as a key press or other activity occurs at 2260, a callback PE Function 2270 utilizes PEInfo 2280 to pass event and data information to the external view dispatcher 2290 for transformation into information that the Model PEObject 2250 can utilize for further message processing.

Figure 23:
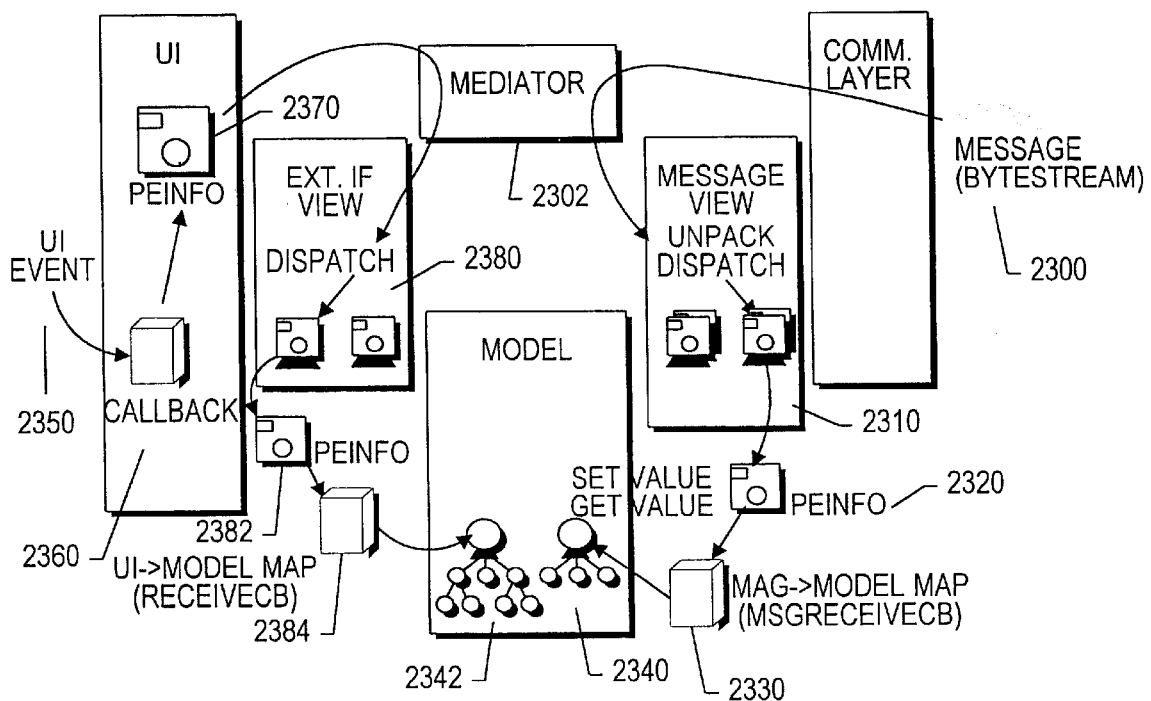
FIG. 23 illustrates incoming messages mapping a UI to a Model in accordance with a preferred embodiment.
Figure 24:
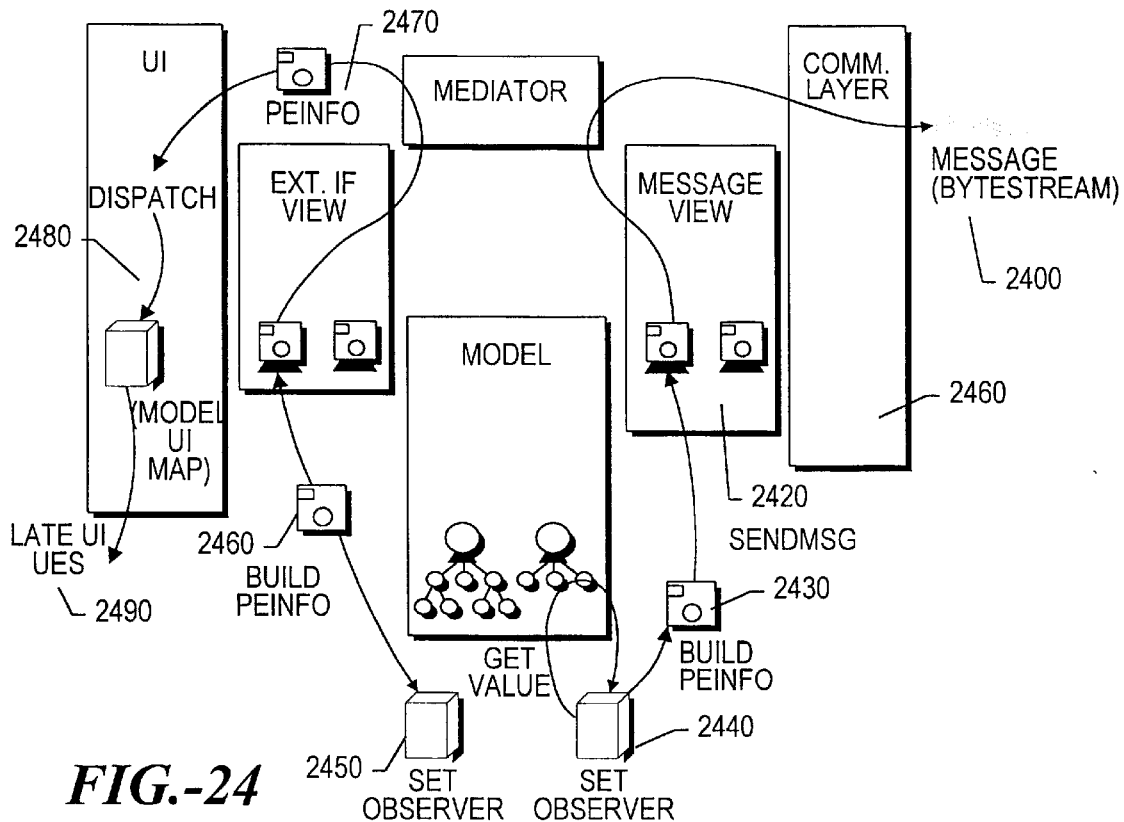
FIG. 24 illustrates outgoing messages mapping a model to messages in accordance with a preferred embodiment.
Figure 25:
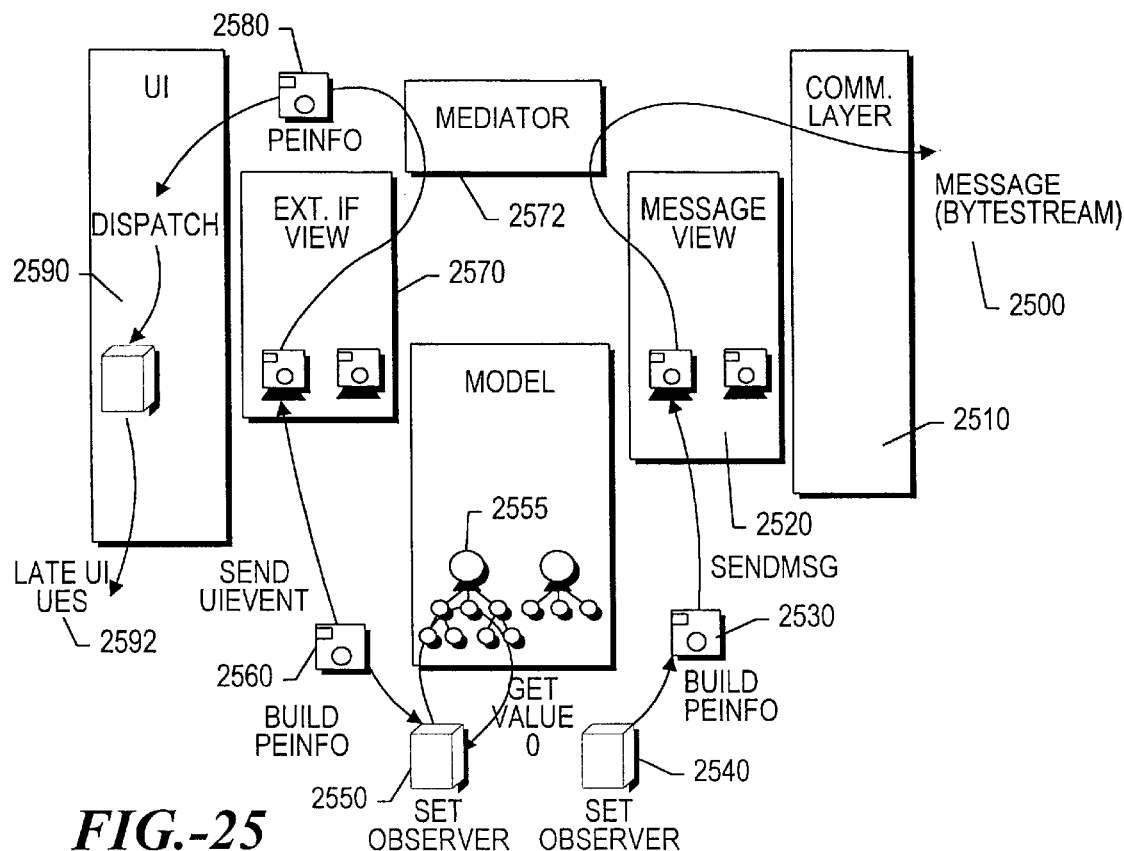
FIG. 25 illustrates outgoing messages mapping a model to a UI in accordance with a preferred embodiment.

FIG. 23 illustrates incoming messages mapping a UI to a Model in accordance with a preferred embodiment in a manner very similar to FIG. 22. FIG. 24 illustrates outgoing messages mapping a model to messages in accordance with a preferred embodiment in a manner similar to FIG. 22 and FIG. 23. FIG. 25 illustrates outgoing messages mapping a model to a UI in accordance with a preferred embodiment in a manner similar to the foregoing Figures. To further clarify processing in accordance with a preferred embodiment, the detailed installation and logic specification for an application in accordance with a preferred embodiment is presented below.

Enterprise computing environments usually consist of many kinds of nodes interconnected by a network. In a typical environment, a server node in the network holds data and programs that interact with the database, and a client node contains a program or programs for accessing the information on the server. The complexity of these environments makes it difficult to create, configure, deploy, and administer software applications. The advent of Web technologies (browsers, the Java language, HTTP) has enabled enterprises to create and use internal Webs to help solve some of these problems.

Java enables the Web as a client-server application platform and distribution channel. The "Interprise" Computing Environment Toolkit (ICE-T) enables building, extending and deploying client-server applications for the Web. ("Interprise" combines the internet and the enterprise.)

The ICE-T application provides:

- A toolkit for creating client programs that can be downloaded on the Web
- Interfaces for enabling a server program to work with a client as a single application
- The tools to connect both client program and server programs to a framework for executing them
- Tools for installing, deploying, and administering applications

ICE-T Applications

An application consists of a server program component (implemented in any language that can call C) and a client program component (implemented in Java). The client component consists of a GUI and a Presentation Engine (PE). To complete the application system, ICE-T provides a Communication Layer that enables the exchange of messages between the client and server components, an Exception Layer for error reporting from ICE-T components, and an Access Layer for managing how applications are deployed. The task of the ICE-T application developer is to assemble the components into an application system.

ICE-T provides Java client access to server applications. New applications or existing ones extended utilizing a preferred embodiment. Among existing applications, those that are partitioned so that server programs (business logic) and databases are on the server, and user interfaces are on the client (three-tier client-server applications) are especially suited for migration to ICE-T front ends.

ICE-T is especially suited for enterprise applications that require:

Access to department or corporate data without changes to databases or the programs that access them.

For enterprises already using an enterprise web technologies in an Internet, Intranet or other network environment, ICE-T applications can provide quick access to existing data from anywhere in the organization or the field where there is an internet connection.

Client platform independence.

ICE-T Presentation Engines can run anywhere the Java Virtual Machine is present.

Rapid development.

Clients are developed in Java using a null application template that contains the necessary Java classes and methods for integration with a GUI and a Communication Library.

Easy deployment.

ICE-T provides scripts and tools for installing and deploying applications, include a generalized startup applet for providing application launch from a Web browser or applet viewer.

Centralized authentication of users.

A customizable Access Layer, installed on the server, enables centralized control of access to client programs.

Easy maintenance.

For most enterprises, maintaining existing applications is a tremendous resource burden. ICE-T provides the means to make new application front-ends (clients), or migrate existing ones, without changing the architecture or programs of the back-end (server), or requiring a steep learning curve.

Wide use throughout the enterprise, from the desktop or the laptop. A familiar and pervasive interface.

End-users can name ICE-T applications as applets in a Web browser.

ICE-T Application Development and Deployment

The primary development task in an ICE-T application is to create an application front end, a Java Presentation Engine, from the provided template. The Presentation Engine (PE) template includes methods to send messages and their data through a client Communication Library. Developers modify the template to specify the messages and data required for their application. The Communication Library handles the passing of messages and data across the network. The Presentation Engine Toolkit supports these tasks. The Toolkit is a full set of Java components some of which you must modify or extend.

An additional development task is to modify the server program to specify which function to call in response to inbound messages and make calls to a server Communication Library to send results to the client. All of the components in an ICE-T application system reside on the server. To deploy an application, you install its components and additional ICE-T files and programs that manage applications on the server. ICE-T also provides a template for creating a startup applet that enables users to start applications from a browser. Chapter 3, "Configuring and Deploying ICE-T Applications" describes these tasks and tools.

Event-Driven Message Passing in ICE-T Applications

The components of ICE-T applications create, send, and receive messages in response to external events. An event is a way of communicating that something has happened, such as input from the user (a mouse click) or a change in the system environment (a server shutdown).

The ICE-T Communication Layer enables asynchronous event-driven message passing between client and server program components on TCP/IP. In ICE-T, the messages themselves are events, and each program component includes local handlers for message events.

Client and server program components must each be set up to create, send, and receive messages. Part of the Presentation Engine's functionality is to determine the recipients and deliver the messages to them. For example, the user interface sends a message to the Presentation Engine when a user clicks a button. The Presentation Engine receives the message and then either sends it to the data model or the server program, which then performs an operation and replies with the result.

The server program must also be able to receive messages and must register functions to handle them.

The recipients of messages do not need to know much about each other, they just need to specify what messages they want to receive. This information is registered using the createMessageHandlers ( ) method in the client program and the createMessageHandlers ( ) function in the server program.

Presentation Engines should include handlers for two kinds of application events:

Events from the user interface
Events coming in to the Presentation Engine from the user interface result in messages to the server or the Presentation Engine's data model.

Events from the server
Events coming in to the Presentation Engine from the server result in displaying data in the user interface or putting data in the Presentation Engine's data model.

Server programs should include handlers for messages from the client. Typically, the handler would call application logic and send the resulting message and it's data back to the client through the server Communication Library.

ICE-T Application Execution

ICE-T applications are designed to work within existing client-server environments. They differ from familiar client-server applications in some key ways.

Typically client programs are developed, maintained, and distributed periodically, taking long cycles of development time, and requiring time to deploy to client nodes. Users who are not on a node on the distribution route may miss software updates. Development can consume resources because of the difficulty of the language or tools used.

Compiled ICE-T Presentation Engines are installed on the server and downloaded on request through HTTP servers. A pair of Communication Libraries behave as a framework for executing the application. This communication layer handles the marshaling and unmarshalling of the message data transferred between client and server. Both client and server should be prepared to handle shutdown events. ICE-T provides default shutdown handlers for this purpose, and developers can add their own.

p How ICE-T Applications Work

Before developing an ICE-T application, you might find it useful to see how ICE-T applications work, from both an end-user's perspective and inside ICE-T.

The User View

ICE-T applications can use a Java-enabled Web browser for client access to application execution. Although developers may choose to have applications launched outside a browser, a Web page presents a familiar and easy to use interface for launching applications.

The user begins by opening a Web page and clicking on the URL for the application she wants to run. The URL is the address for a Web page that includes an ICE-T application startup applet. The Web page with the startup applet is loaded into the browser. The applet collects access information from the user. The applet contains the URL of the server holding the application components and the application name. This information is processed on the server. If the user name, password, and chosen application are authorized, the server downloads a Presentation Engine to the user's node.

The Presentation Engine presents the user with an interface for interacting with the server program and data. It also determines where to pass messages for handling, either to the server program or to its own data model. One example of a client program is one that communicates with a server program that searches a database, for example an employee database. Such a client program might have these user interface elements:

A text field where users enter a first or last name that they wish to find in the employee names database Buttons for clearing the fields (Clear), exiting the application (Quit), and launching the search (Search)

A scrolling window for viewing the results of the query

The user enters a first or last name and presses Return or clicks a Search button. The client program sends the query to the server, where the server program searches the employee database for a matching name. If a match is found, the server returns the results to the client. The results are displayed in a window on the client.

The ICE-T View

Figure 26:
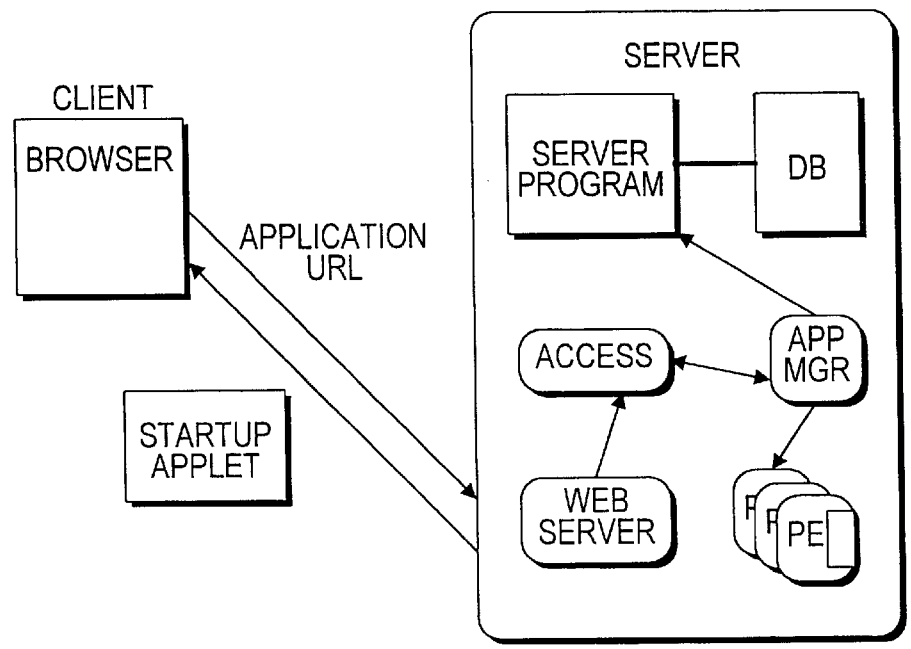
FIG. 26 illustrates the steps associated with launching an application URL in accordance with a preferred embodiment.

When a user launches an ICE-T application, the client node establishes a Web connection with the server node using HTTP. The server manages this Web connection. ICE-T applications can be launched from a browser, an applet viewer, or as standalone applications. FIG. 26 illustrates the steps associated with launching an application URL in accordance with a preferred embodiment. On the server side, the ICE-T Access Layer (a cgi-bin executable) authenticates the user data. If the authentication succeeds, the Access Layer contacts the ICE-T Application Manager and the Application Manager starts the server program and initiates a network session.

The Application Manager downloads an HTML page with a startup applet for the application. When the user runs the startup applet, the Application Manager selects a compiled Presentation Engine and downloads an HTML page containing the applet tag for it to the client using HTTP. The compiled Presentation Engine includes a GUI and an instance of the client Communication Library and is ready for execution in a Java-enabled browser or anywhere the Java Virtual Machine is installed.

The client node then executes the Presentation Engine locally. The Presentation Engine makes a TCP/IP connection to the server where the server program is running, and the client and server programs cooperate to execute the application.

When a user interface event occurs—for example, when the user enters a first name in the text field and clicks a Search button—the user interface passes a message to the Presentation Engine. The Presentation Engine either sends the message to its data model for processing by the client, or passes the message to the server for processing by the server program. The Presentation Engine determines where on the client a message is handled based on how you have registered message handlers. When the server program sends a message with data to the client, the Presentation Engine displays the result.

The exchange of messages between client and server is handled through the ICE-T Communication Libraries in the ICE-T Communication Layer. When the client program terminates, the Application Manager closes the socket connection to the client and terminates any server processes it started.

ICE-T Task Summary—Building Program Components

ICE-T's modular architecture makes it easy to distribute development tasks to multiple developers. Alternatively, a single developer can complete ICE-T development tasks in stages. Developing a client program requires making a Java Presentation Engine, connecting it to a user interface and to the ICE-T Communication Layer so that it can communicate with a server program The server program could be an existing program or a new one. It must be written in a language that can call C so that it can work with the ICE-T Communication Layer. You don't need to develop new server programs for ICE-T applications, but you must enable the server program to handle messages from the client.

ICE-T Application Building Blocks

An ICE-T application consists of a client program and a server program communicating through a Communication Layer. The client program consists of:

A GUI built with Java

A Java Presentation Engine built using a template
- These components, and related classes used by the Presentation Engine, combine to behave as a single client under the control of the Presentation Engine. The Presentation Engine may be presented as an applet launched from an applet viewer or a Web browser, or as a standalone application.
- The server program, new or existing, is developed however the developer chooses. It must be in a language that calls C and it must include functions for handling messages from the client. A template with these functions is provided, as is a main routine that makes calls to the provided server Communication Library.

ICE-T provides these templates, tools, and libraries for developing applications:

pe_template.java
  A template for a working Presentation Engine.
ICE-T packages (supplementary to the standard Java packages)
server-template.c and server_template.cc
  Server program templates (one each for C and C++) that define and enable message passing to and from the client. The templates can be used with existing programs or used as a starting point for developing server programs. These templates are analogous to the pe_template used for the client.
ICE-T message data types that work the same on both client and server.
  ICE-T also provides a framework that the developer does not modify and in which ICE-T applications can execute. This framework includes:
Communication Layer
  Supports network communication between client and server programs. The server Communication Library presents a C API to the server program, which is linked to this library. The client Communication Library is implemented in Java.

ICE-T Exception Layer
  Provides exception reporting from the ICE-T application (client and server) in addition to standard system error reporting.

The Presentation Engine

Every Presentation Engine extends (inherits from) a Java class named PresentationEngine. All of the objects that the client program needs are either in the Presentation Engine class or called by it. ICE-T provides a class that extends java, and calls the methods that you need to create a working Presentation Engine.

The filename for the Presentation Engine template is pe_template.java. You can find it in the ICE-T application installation directory under Templates/C or Templates/C++. The file is placed in each of the Template subdirectories for convenience. The pe_template is the same in both files.

FIG. 27 describes the forms of a Presentation Engine, as an abstract Java class, a template for development, and an executable component in an application in accordance with a preferred embodiment.

To create a working Presentation Engine, you copy the pe_template file and make these changes:
  Supply your own Presentation Engine name.
  Create user interface components or map the ones from a Java GUI builder.
  Create a data model (if your application requires client-side processing).
  Define messages and their handlers.
  Register message handlers.
These steps are described in this chapter.

Presentation Engine Implementation Options

Developers can create Presentation Engines that simply send messages from the user interface to the server and display the data that the server returns on the client. This option for Presentation Engine implementation is called a "PELite." An alternative implementation of Presentation Engine handles some local data storage in what is called the Presentation Engine's data model. For the latter, developers are required to implement a createModel( ) method, described in this chapter. Both options are supported by the pe_template.

ICE-T Classes and Packages The documentation for the ICE-T Presentation Engine API is presented in HTML form, like the Java API documentation, and is accessible from the following URL:

file:///<ICE-T Installation Directory>/doc/api where <ICE-T Installation Directory> is the name of the directory on your system where you have installed ICE-T. The C and C++ header files used by the server program are in the ICE-T installation directory under Server.

ICE-T Message Data Types

ICE-T message data types:
  Can be used to construct the data model in the Presentation Engine
  Are available for use in the server program for use in application logic
  Have analogs on both the client (Java) and server (C)
  Use basically the same APIs on both the client and server Can contain only other ICE-T data types Are used in messages from client to server, and server to client, where they will appear as a local data structure of their analogous type.

The table appearing below describes the primitive ICE-T message data types and their analogous types on client and server. The prefixes Pe and Srv are provided for your convenience in naming things. They are handled as the same type by ICE-T.

| ICE-T Message Types (Primitive) | | |
| --- | --- | --- |
| Data Type | Client {PE} | Server (C) |
| Petbar, SrvChar | char (Unicode) 16 bits] | char (C) 8 bits |
| PeString, SrvString | string | char* |
| PeBoolean, SrvBoolean | Boolean 16 bits | int 1 byte |
| PeInteger, SrvInteger | int 32 bits | int 32 bits |
| PeLong, SrvLong | long 64 bits | long 64 bits |
| PeFloat, StyFloat | float 32 bits | float 32 bits |
| PeDouble, SrvDouble | double 64 bits | double 64 bits |

1. ICE-T transmits only the ASCII (8 bits).

ICE-T supports a composite data type based on the Java vector class (java. util.Vector). It differs from the Java vector type in that it provides an implementation that works on both sides of the ICE-T application (Java clients and C or C++ server programs), and it only takes ICE-T primitive data types.

| Table ICE-T Vector Type | |
| --- | --- |
| Data Type | Description |
| PeVector, StyVector | A collection that implements a variable-length array. Add elements sequentially with the add Element ( ) method. Access an element by its index. |

Working with the ICE-T Directory Structure

Before developing applications, copy the provided templates and Makefiles to an application development directory. There are two subdirectories of templates.

<ICE-T Installation Directory>/Templates/C

Contains Example. mk, pe_template. java, and server_template.c.

<ICE-T Installation Directory>/Templates/Cplusplus

Contains Example .mk, pe_template. java, and server_template.cc.

For example, create an application directory for an application named myAppName in which the server program is written in C++, and copy the templates to it:

% mkdir myAppNams
% clo <ICE-T Installation Directory>/Templates/C++/*
   <ICE-T Installation Directory>/Applications/myAppName/.

The ICE-T installation scripts and MakeHierarchy depend on the newly created application directory being two levels below the ICE-T installation directory. If you choose not to follow the directory setup suggested by the example, you will have to supply options or arguments indicating where the ICE-T installation directory is in relationship to the directory you have created.

Designing the Client Program

Here are some design decisions to make before you develop the client program for an ICE-T application.

Using a graphical user interface (GUI) toolkit, specify and design the user interface.

Determine the events the client and server components of the application should handle. Name each of these events and associate data with it. In this step you answer the question of what messages will be passed between the Presentation Engine and the user interface and between the Presentation Engine and server.

Decide what application logic to put in the client program, if any.

Decide what, if any, data processing you want the client program to handle. This affects whether you create event handling for data updates in the Presentation Engine or just use the Presentation Engine as a mediator between the user interface and the server data (a "PE Lite").

Specify how the user interface should be updated when the Presentation Engine receives messages and data from the server.

Specify how the Presentation Engine receives and decodes data from the server and whether it stores the data for later retrieval or displays the data directly.

If you choose to store data in the Presentation Engine, specify how it is to be stored and updated and what other components in the application depend on that data.

Developing the User Interface

You can create the user interface for the ICE-T application at the same time as, or before, you create the Presentation Engine. Even though they can be separate, the Presentation Engine and user interface work together, so the interactions between them should be planned.

Creating a Presentation Engine

Create a Presentation Engine involves the following basic steps that are described in detail throughout this section:

1. If you have not done so already, copy one of the Templates subdirectories to the Applications directory.

The ICE-T installation directory includes a communication directory for developers to use. To create applications, make a subdirectory under applications for each ICE-T application you develop.

2. Modify and rename the pe_plate file to suit the application. Use the same name for the class and the file.

3. Create a Presentation Engine class.

Create your own Presentation Engine definition using pe_template.java.

4. Integrate the Presentation Engine with the user interface (GUI).

Create a separate user interface class using your chosen Java tool. Integrate the GUI with the Presentation Engine by implementing the createUI ( ) method that is found in pe_template.java.

"Working with the ICE-T Directory Structure" describes how to implement createUI( ).

5. Determine and define the message events to be passed between the Presentation Engine and server program and the Presentation Engine and user interface.

Name each of these events and associate data with it. Specify the type of data that will be passed in response to each message event.

a. Add Handlers for Events on GUI Components

Implement the operations you want the application to perform in response to user interface events.

b. Write the Code for Handling Incoming Message Events in the Presentation Engine Define handlers in the Presentation Engine for incoming messages from the GUI. Define handlers in the Presentation Engine for incoming messages from the server.

Developers can choose to write a separate class, or classes, in separate files to handle events. This means that a named handler can be modified without modifying the Presentation Engine framework itself.

6. Register which handlers will be sent which messages when events occur (map messages to handlers).

Specify what handler should receive each message.

"Registering Handlers" describes this step.

7. Build the Presentation Engine.

ICE-T provides a makefile to build both server and client programs.

These activities are analogous to the tasks for modifying server programs to work with clients. In both client and server program cases, ICE-T provides templates with methods (Presentation Engine) and functions (server) for registering handlers. Developers provide only the application-specific messages and data.

Creating a Presentation Engine Class

Copy one of the Templates subdirectories to the Applications subdirectory. There are two subdirectories, one for C and one for C++. For example, create a directory for an application named myAppName. If the server program for myAppname is to be written in C, copy all of the files from the Templates/C directory:

% inkair myAppName
% cp <ICE-T Installation Directory>/Templates/C/*
<ICE-T Installation Directory>/Applications/myAppName/.

For each Presentation Engine you create, modify pe_template.java to declare a class that extends the abstract Java class PresentationEngine:

public class myPresentationEngine extends PresentationEngine
{// methods for your application
}

Note—Be sure to give the class and the file the same name. For example, if the Presentation Engine class is named myPresentationEnqine, the file should be named myPresentationEnqine.java.

pe_template.java contains the class and method declarations that you implement to provide the functionality you want.

The methods must include:
createuI ( )
createModel ( )
createMessageHandlers ( )
initializeApplication ( )

Implementing createModel ( ) and initializeApplication ( ) is optional.

You do not have to use initializeApplication ( ) unless your client program requires local initialization before communication is started.

Importing Packages

The pe_template imports the appropriate packages, including these ICE-T packages and standard Java packages:

sunsoft.ice.pe
sunsoft.ice pe
java.net
java.io
java.applet
java.util
java.awt

The Java language package (java.lang) is implicitly used and does not have to be explicitly imported.

To include the required packages, a Presentation Engine class must have these import statements. Don't delete them from the pe_template.

import sunsoft. ice.pe.;
import java.net.*;
import java.io. ;
import java .applet.*;
import java.util. *;
import java.awt.*;

Integrating the User Interface with the Presentation Engine

ICE-T applications must make user interface elements from the application GUI available as components that the Presentation Engine can access. The Presentation Engine reads and handles data from events in the user interface and updates the user interface with data returned from the server.

Creating a GUI that is separate from the Presentation Engine, offers developers more flexibility because updates to the GUI do not require major changes to the Presentation Engine. Use the createUI ( ) method to make the GUI components available to the Presentation Engine.

To implement the createuI ( ) method with application-specific operations, write a body for the method in which you:

Declare variables for the user interface elements
Create a frame to hold the GUI applet (optional)
instantiate and initialize the GUI applet
Get the user interface components
Provide initial values for fields in the GUI (optional)
Add the GUI elements to a Container object (provided in the PresentationEngine class)

For example, here is excerpted code from a createUI ( ) method that declares variables for labels and text fields, creates a frame, and adds the user interface elements to a container component defined in the PresentationEngine class.

protected void createUI ( ) {

Label label_1, label_2, label_3;

TextField textField_1, textField_2, textField_3;

// . . . additional variables fr=new Frame ("My Application Title");

fr.add ("Center", ui);

fr.pack ( ); fr.show( );

// . . .

textField_1.setText (" ");
textField_2.setText (" ");

```
//...

uiContainer.addObject ("firstName", textField_1);
    uiContainer.addObject ("lastName", textField_2);

//...

}
```

Creating a Data Model in the Presentation Engine (Optional)

Updates to the client program can be sent to the user interface or to the data model in the Presentation Engine. If your application is designed to hold data in the Presentation Engine, you use the createModel ( ) method to create the data objects (Observables) to hold the data and attach Observer objects to them.

createModel ( ) is optional and is commented out in the pe_template. To use createModel ( ):
- Uncomment the method in the Pe_template
- Create Observable data objects to hold data from the server
- Attach Observers to the data objects, if necessary
- Put the Observable data objects into the data model This example instantiates a PeVector data object named empvector. Using the Observer and Observable methods is described in "Attaching Observers to Data Objects."

```
protected void createModel ( ) {

// create the observable
    PeVector empVector=new PeVector( );

// Attach observer to the observable
    empVector. addObserver (new empObserver (model));
    // put the observables into Model model. addObservable ("empVector", empvector);

}
```

Attaching Observers to Data Objects

Developers have the option of defining any data objects in the model as a simple PeObject (a data item that is sent in messages) or as a PeObservable, a data item with a method associated with it. A PeObservable is a data object with an associated PeObserver function that is called when the data is updated. If a data object changes state, and you want the application to notify any program components that depend on that data, you define each data object as a PeObservable and you attach a PeObserver to it.

ICE-T provides the peObservable and PeObserver classes. Developers call the methods in these classes to add observable data objects to the model and add heir observers to an observer list.

Handling Events

ICE-T client programs receive messages in response to external events. Client program developers need to specify what messages they want the Presentation Engine to receive and register this information using the createMessageHandlers ( ) method. Server program developers have the analogous task of defining message handlers and registering their handlers.

ICE-T provides a layer of abstraction to handle interactions between the GUI and the Presentation Engine. This layer is called the UI Adaptor and it is a set of Java classes that developers use as given. The Presentation Engine makes calls to the UI Adaptor to register messages. The Pe_template includes the necessary methods; developers provide the message bodies as described in the procedures in this chapter.

Presentation Engines handle two kinds of application events:
- Events from the user interface
  - Events coming in to the Presentation Engine from the user interface result in messages to the server or the Presentation Engine's data model.
- Events from the server
  - Events coming into the Presentation Engine from the server result in displaying data in the user interface or putting data in the Presentation Engine's data model.

Handling Events from the User Interface

Applications handle user interface events, such as button clicks and text entry. Java provides an action ( ) method for associating actions with events, such as those on user interface components.

```
public boolean action(Event evt, Object arg) {

//...

}
```

Typical behavior for an action ( ) method is to get the data from the user interface event and send a message to the component of an application that is designated to handle it. In an ICE-T application, those messages are sent to the Presentation Engine using the sendMessage ( ) method.

Here is an example of an action ( ) method when in a GUI. It handles an event in which the user clicks a "Search" button after entering a text string

```
public boolean action(Event evt, Object arg) {

//...

if (arg. equals ("Search"))
    {
    System.out.println("Search event is detected"); PeString firstName
    =new PeString (entry_1.getText ( )( );

PeMessage msg=new PeMessage ("Search");

msg. addDataElement (firstName);

PeDebug.println("====>msg is: "+msg);

// send this event to the UI adaptor pc.sendMessage (msg);

}
    return true;
}
```

The action ( ) method sends the message defined in:
PeMessage msg=new PeMessage("Search");

The PeMessage class encapsulates the message name and the data. The data in this message, added by the addDataElement ( ) method, is a first name. The sendMessage ( ) method sends the message and its data to the Presentation Engine through the PeUIAdaptor, a class that ICE-T provides for handling communication between the user interface and the Presentation Engine. Developers do not need to modify PeUIAdaptor, but do call methods in it as directed by the pe_template.

Handling Events from the Server

Events from the server program that generate messages for the client can be handled by:

Updates to the user interface

Updates to the Presentation Engine data model

Write a handler for each event from the server. Include it in the same file as the Presentation Engine, or a separate class file. If you use a separate file for the handler, remember to define it with public access.

Creating Handlers for Updates to the User Interface

To create a handler that updates the user interface, use the template to define a class that extends PeUIHandler. PeUIHandler is an abstract class for a handler of messages that are sent to the user interface.

The constructor method in PeUIHandler provides access to the uiContainer for updating the user interface and for sending messages using the uiAdaptor.

This example from the pe_template shows the definition for a class named SampleUIHandler. The constructor method passes adaptor and uiContainer as arguments to give your execute method access to them.

Use this definition as is, but supply the name of the class and add the body of the execute method:

```
class SampleUIHandler extends PeUIHandler { public SampleUIHandler(PeUIAdaptor adaptor, PeUI
    uiContainer) {
    super (adaptor, uiContainer);
  } public boolean execute (Object caller, PeMessage
    message) {

//decode the record sent by the server

//update the ui return true;

}
```

To enable the Presentation Engine to know what messages to send to SampleUIHandler, register the name of the handler and the data it handles. This step is described in "Registering Handlers for Updates to the User Interface".

Creating Handlers for Updates to the Model

Messages from the server can be handled with code that updates the GUI (as in the example above), or code that stores the data in the Presentation Engine. If you used the createModel ( ) method, you have to create handlers for the events that affect the model.

To create a handler that updates the model, use the template to define a class that:

Extends PeModelHandler.

PeModelHandler is an abstract class for a handler of messages that are sent to the data model you defined with createModel ( ).

Uses the constructor of peModelHandler as is, except to use the new class name in place of PeModelHandler.

public PeModelHandler(PeModel model) { }

This constructor passes the model class as an argument so that your Presentation Engine has access to the model class for updates.

This example from the pe_template shows the definition for a class named SampleModelHandler. Use this definition as is, but supply the name of the class and add the body of the execute method:

```
class SampleModelHandler extends PeModelHandler { public SampleModelHandler (PeModel model) {
    super (model);
  } public boolean execute (Object caller, PeMessage
    message) {
  //Application code that decodes the record sent by the
    server //Application code that updates the model return true;

}
}
```

Registering Handlers

Register what component handles what messages in the Presentation Engine by filling in the createMessageHandler ( ) method.

createMessageHandler ( ) is defined in the pe_template to register handlers with either the user interface or the model. Use this method as defined, changing the arguments for adding handlers to supply the names of the messages and handlers you defined.

Registering Handlers for Updates to the User Interface

This code snippet from the Pe_template illustrates how to register the handler defined in the example in "Creating Handlers for Updates to the User Interface".

Note that you just use the code in the example as is. You don't need to specify anything other than the names of the messages and the objects that handle them. For each handler you register, add a call to the uiAdaptor. addHandler ( ) method. Change the arguments to the uiAdaptor.addHandler ( ) method to specify the names of the messages and handlers you defined. In this example, the name of the message is "sample_ui_message" and the name of its handler is SampleUIHandler ( ):

```
protected void createMessageHandlers ( ) throws
DuplicateHandlerException {
  uiAdaptor.addHandler ("sample_ui_message", new
    SampleUIHandler (uiAdaptor, uiContainer));
  // . . .
``` uiAdaptor and uiContainer are defined by the PresentationEngine class. Your handler needs to pass them as arguments so that its execute method has access to the user interface elements (GUI components).

Registering Handlers for Updates to the Model

If the message is to be handled in the Presentation Engine's data model, register the name of the handler in the model. This code is defined for you in the pe_template.

This code snippet illustrates how to register the handler defined in "Creating Handlers for Updates to the Model". Use the code in the example as is. Change the names of the messages and the methods that handle them:

```
protected void createMessageHandlers ( ) throws DuplicateHandlerException
{
    model. addHandler ("sample_model_Message", new
        SampleModelHandler (model));
    // . . .

}
```

Handling Shutdown Events

ICE-T provides default shutdown handlers. The shutdown handlers are defined in the PresentationEngine class, not in pre_template. Developers who do not want to accept the default shutdown handling can write their own shutdown handlers. A new handler takes precedence over the previous handier for the same message name. To add a new handler, developers:

Write the handler

Use the same message name ("ICET_SHUTDOWN")

Use the methods provided for registering handlers in the Presentation Engine and the server program When a shutdown happens, the Communication Library notifies the application by means of the shutdown handlers. Shutdown handlers are identical to other message handlers, but have a preset message name ("ICET_SHUTDOWN"). To register a shutdown handler, the application code makes a call to addMessageHandler ( ) using the preset message name.

Registering Shutdown Handlers in the Presentation Engine

An application can register two shutdown handlers in the Presentation Engine, one with the UI Adaptor and one with the model. Registering shutdown handlers in the Presentation Engine is optional.

To register a shutdown handler on the uiAdaptor, use the following call:

uiAdaptor.addHandler ("ICET_SHUTDOWN", new
    shutdownHandlerUI (uiAdaptor, uiContainer));

To register a shutdown handler on the mode], use the following call:

model.addHandler ("ICET_SHUTDOWN", new shutdownHandlerModel (model));

Registering Shutdown Handlers in the Server Program

Your application can register one shutdown handler with the server program.

To register a shutdown handler in the server program:

SrvComm_addMessageHandler ("ICET_SHUTDOWN",
    <functionPointerToShutdownHandler>);

Provide the name of the function that executes when the shutdown occurs, (<functionPointerToShutdownHandler> in the example above).

Preparing the Server Program for Communication

To prepare the server program to communication with the client program, the developer "plugs in" the server program to ICE-T's Communication Layer. Connecting the server program to the server Communication Library, which is part of the ICE-T Communication Layer, is analogous to connecting the GUI to the Presentation Engine. In both cases, developers enable the exchange of messages, and these messages are handled locally by the components—the server program component and the Presentation Engine component.

The server program component in an ICE-T application must be written in any language that can call the C programming language. ICE-T provides both C and C++ language templates for handling messages and making calls to the server Communication Library. Use the appropriate template to start a new server program in C or C++, or add the template functions to an existing server program.

Note—If you have not done so already, copy one of the Templates subdirectories to the Application subdirectory. There are two subdirectories, one for C and one for C++. Each directory contains a server_template, one for C and the other for C++.

To enable communication between the server program and the client program:

Create message handlers in the server program that are analogous to the message handlers you created in the Presentation Engine. This step is described in "Handling Messages in the Server Program".

Make calls to the ICE-T server Communication Library.

The server program templates provide functions for message handling and communication. Developers just supply the application-specific message names and their handlers. For C server programs use server-template. C. For C++ programs use server_template.cc. The templates are in the ICE-T installation directory under Templates/C and Templates/C++ respectively.

Each server program template calls a default main routine. The default main ( ) routines are provided for convenience. If you choose to write your own main ( ) routine, look at default_main.c or default_main.cc for guidance and follow the steps in "Modifying the Default main Routine (Optional) ".

FIG. 28 describes the functions developers must fill in using the server program template. All three return integer values of 1 (TRUE) or 0 (FALSE). A return value of 1 (TRUE) indicates that the application startup can proceed. A return value of 0 (FALSE) indicates a problem that results in stopping the application. The remaining functions in the server program templates can be used as provided.

FIG. 29 illustrates Server Properties in accordance with a preferred embodiment.

Handling Messages in the Server Program

In developing a Presentation Engine, a key task is writing the code that handles messages. The same task is performed for the server program. It consists of similar steps:

Write the code that handles incoming events (typically requests for data)
Register the event handlers
To handle messages in the server program:
1. Write a function to handle each incoming message.
Each function you write takes one argument, a SrvMessage( ) function, and has a void return type.
The function should extract the data from the message, and then call application logic to process it or send a message back to the client.
For example, here is a handler function in C that responds to a message with the data: employee name (empName) and employee number (empNumber):
void handleEmployeeRecord (SrvMessage *message) {

SrvData *empName;
SrvData *empNumber;
char *name;
int num;

/*
*disassemble incoming data
*/
empName= SrvMessage__getDataElement (message, 0);
empNumber=SrvMessage__getDataElement (message, 1);
name=SrvString__getValue (empName);
num =SrvInteger__getValue(empNumber);

/*
Now process the data . . .
*/ lookupEmployee (name, number);

Here is the handler function in C++:
void handleEmployeeRecord (SrvMessage *message) {
/*
* disassemble incoming data
*/
SrvData *empName= message.>getDataElement (0);
SrvData *empNumber=message >getDataElement (1);

char *name=empName>getValue ( );
int num =empNumber->getValue( );

/*
* Now process the data . . .
*/ lookupEmployee (name, number);
2. Resister the message handlers.
  Fill in the createMessageHandler ( ) function in the server-template to register the handlers with the server Communication Library.
  Note that you just use the code in the example as is. You don't need to specify anything other than the names of the messages and the functions that handle them. For each handler you register, add a SrvComm__addMessageHandler ( ) call. The arguments to the functions in this example are the application-specific names of the messages and handlers you defined in Step 1.

int createMessageHandlers ( ) {
SrvComm__addMessageHandler ("Double", handleDouble);
SrvComm__addMessageHandler ("firstNameEntered", handleSearchMessage);
// . . .
return 1;
}

Modifying the Default Main Routine (Optional)

Once the server component of the application includes definitions for how it handles messages and registers those handlers, it can call the server Communication Library. Those calls are defined in the default main routines provided by ICE-T: default_main. c and default_main. cc.
  default_main. c and default_main. cc are in the ICE-T installation directory under Server/Main.
  This section describes the order and usage of the calls to the server Communication Library.
  If you create your own main or modify the default, follow the instructions in this section for including the calls that enable the server program to work with the 'ICE-T Communication Layer.
  To connect the server program to the Communication Library:
1 Include the ICE-T header files.
  The default_main files include the header files already:
  #include "SrvData.h"
  #include "SrvComm.h"
  #include "SrvMessage.h"
2. Call create__SrvComm ("tcp") to create the Communication Library's data structures.
  char *protocol="tcp";
  create__SrvComm(protocol);
3. Call setSrvCommProperties ( ). (Optional) Set server properties. The setSrvCommproperties ( ) function is typically implemented in a separate file that is linked to the server program as part of the build process.
4. Call createMessageHandlers ( ).
  See "Handling Messages in the Server Program" for information about how to use createMessageHandlers ( ).
5. Call SrvComm__createSocket ( ) to create the listener socket and output the port number.
Note—Do not write anything to stdout before you make the SrvComm__createSocket ( ) call.
6. Initialize the application.
7. Call SrvComm__acceptClientConnection ( ) to accept the connection from the client. Note that the order of Step 7 and Step 8 may be interchanged.
8. Finally, call SrvComm-start ( ) to start the Communication Library's loops. This routine does not return until everything is finished.

Building ICE-T Applications

Building an ICE-T application consists of modifying a make file for the client and server programs, and then using it to make both programs. ICE-T provides a makefile (Example.mk) for both the Presentation Engine and the server programs. Example.mk is in the ICE-T installation directory under Templates/C or Templates/C++. These files are copied to the/Applications directory.
To use the makefile, modify it to specify the:
Compiler location
Libraries location
ICE-T installation directory (optional)
Client and server source file locations and names
1. Open Example.mk in an editor and follow the instructions in the file.

2. Supply the locations of the compiler, libraries. If you have moved the ICE-T installation directory, supply its new location. There is no need to change the location of the ICE-T installation directory. If you choose to move it, supply the name of the location in the TCET-INSTALL-DIR macro.

The macros for which you provide values are shown below as indicated in the code:

```
##############################
Environment    Configuration
##############################

# Change the following lines to indicate the location of
    your compiler.

COMPILER_BIN=
COMPILER_LIB=

# Change the following line to indicate the location of the
    ICET installation
# directory (either absolute or relative to the current
    directory).
# The default value ( . . . / . . . ) allows you to build an
    example in-situ in the
# installation hierarchy.

ICET-INSTALL-DIR= . . . / . . .
```

3. Change the macros for the Presentation Engine source files.

This example specifies the Java files for the Presentation Engine template (pe_template.java) and a user interface file named myGui.java. The macros for which you provide values are shown here in bold type. Change the names of the files to those used in your application:

```
##################################################
PE                         ###
(Configurable Macros)             ###
##################################################

# Change the following macro to add your java files

PE_SOURCE5. java=\
    myGui.java \
    pe_template.java \
    #end

# Change the following macro to indicate which of the
    java classes # is the top level class (i.e. the subclass of
    presentationEngine).
# Note: specify this class without any extension, e.g.:
# PE_MAIN_CLASS=myPresentationEngine

PE_MAIN_CLASS=pe_template
```

Example.mk specifies files for the server program template (server_template). The macros for which you provide values are shown here in bold type. There is a macro for C source files and one for C++ source files. Change the names of the files to those used by the server program in your application:

```
##################################################
Server                       ###
(Configurable Macros)             ###
##################################################
```

```

# change the following macro to add .cc (C Plus Plus) files

SERVER_SOURCES.cc=\
    #end

# change the following macro to add .c (C) files

SERVER_SOURCES.c=\
    default_main.c \
    server_template. c \
    #end

# change the following macro to indicate the name of the
# server executable
SERVER = ServerTemplate
```

Build the client program with the following command:
% make-f Example.mk pe
Build the server program:
% make-f Example.mk server
Both pe and server are defined for you in the Makefile.

Testing ICE-T Applications

You can test the Presentation Engine alone or with the server program. You have to build the programs before you test them.

Run the Presentation Engine class by itself using the java command.
For example:
% Java myPresentationEngine To test the Presentation Engine with the server program:
1. After you have made the server program, run it to get the port id.

This example shows the result of running a server program named myServer:
% myServer
// ICE LOG messages deleted from this example.
37526 129.146.79.147
ICE: :ApplicationServer: port=37526 ServerIP= 129.146.79.147
2. Supply the server machine IP and the port id as arguments to the java command.
For example, using the machine and port id from Step 1:
% java myPresentationEngine 129.146.79.147 37526
3. To test the Presentation Engine in debug mode, use the—debug option to the java command.
The—debug option should be the first argument after the class name:
% java myPresentationEngine—debug 129. 146.79. 147 37526

Configuring and Deploying ICE-T Applications

In addition to tools for developing a Presentation Engine, ICE-T provides these components to support application deployment, execution, and administration:

Installation scripts
    The following installation scripts are in the ICE-T installation directory under/bin:
        ice-httpd-setup
        Sets up the directories you need on the server.
        ice-install-access
    Installs the Access Layer on the server.
    ice-app-install
    Installs each compiled Presentation Engine and server program on the server.
    Access Layer
        Acts as gatekeeper for HTTP communication between the client and server nodes. The Access Layer is a cgi-bin executable that identifies and authenticate users. You can modify the e files used by the Access Layer and then use the supplied makefile (Access.mk) to build a customized Access program for use with ICE-T server applications.
    Application startup applet template (Java)
        A template for making Java applets that launch ICE-T applications. The template is in the ICE-T installation directory under StartApplet.
    Web server (user must install)
        Supports HTTP connections; enables Web access and the use of a browser front end for executing an ICE-T application.
Note—Sun internal users can install the Web server from /home/internet/CERN/httpd/. The directory contains a README file with installation instructions.
    Deploying and maintaining ICE-T applications involves these steps:
        1. Using a stamp applet and HTML pages to launch ICE-T applications
        2. Setting up the Web server
        3. Customizing (optional) and installing the Access Layer
        4. Running installation scripts for Presentation Engines and server programs
        5. Configuring application management files

Using Startup Applets and HTML Files

Compiled Presentation Engines can run as applets in a Java-enabled browser. To enable users to launch ICE-T applications from a browser use the named ICE-T templates to:
    Create a startup applet for each application. Use the startAppletDevIR. java template.
        "Using the Startup Applet" describes this step.
    Create a top-level HTML file with links to each application. This file serves as a "splash page" identifying the applications available and including links to an HTML file for each application. Use splashTemplate.html.
        "Creating a Top-Level HTML File" describes this step.
    Create an HTML file for each application. Use appTemplate.html.
        "Creating Individual Application HTML Files" describes how.

Using the Startup Applet

A startup applet provides a way to launch an ICE-T application from a Web page. The startup applet:
    Starts the HTTP access to the server
    Authenticates the user
    Starts the server program
    Downloads the Presentation Engine as an applet to the Web page or opens the applet in a separate user interface window (developer's choice)

You can use the startAppletDevIR.java template to launch the applications you build, or create your own applet. The template is completely generalized so that it can be used for any of your applications. You supply the application name in a separate parameter to the applet tag. (See "Creating Individual Application HTML Files".)

A complete code listing for startAppletDevIR. java is in Appendix B.

By default, the startup applet opens the Presentation Engine in the same window. To have the Presentation Engine appear in a new browser window, open startAp~letDevIR. java and follow the instruction in the file:

```
AppletContext cont = app.qetAppletContext( );
  if (cont != null) {
    System.err.println ("Showing document: ["+newURL+"]");
    cont.showDocument (newURL);
    /*
     * To show the applet in another window, replace the
     * the line above with the commented line below.
     */
    //cont.showDocument (newURL), "new_window");
```

Creating a Top-Level HTML File

You need a a top-level HTML file, or "splash page," to present the list of available applications with links to the application-level HTML pages for them. When a user chooses a link, the link takes them to an application-level HTML page.

ICE-T provides a default HTML file for the "splash page." The file, called spllashTemplate.html, is in the ICE-T installation directory under StartApplet. You can use the default file or make one of your own.

To create a top-level Web page for listing the links to your application Web pages:
1. Copy splashTemplate.html to another file. For example:
    % cp splashTemplate.html myAppSplashPage.html
2. Open the file in an editor.
3. Provide a title for the page and any text you want to include about the application(s) listed there.
4. Supply the name and the URL of the application-level HTML page for each listed application.
    For example, if you used appTememplate.html to create an HTML file for an application named MyApplicationl:

```
<html>
●
●
●
<a href="MyApplicationl.html">
MyApplicationl
</a>
●
●
●
</html>
```

5. Copy the file to the appropriate location on your Web server.
    The result is a Web page with a link to the named application:
MyApplicationl
    When a user chooses this link, the browser loads an application-level HTML page with the startup applet for the application.

Creating Individual Application HTML Files

Think of the application-level HTML file as the Presentation Engine startup page. This page contains the startup applet that results in the Presentation Engine being downloaded.

When the user launches the stamp applet, the startup applet takes the name of the application from the applet parameter, the user name, and the password and sends these using HTTP to the Access Layer on the server.

To create an application-level Web page:
1. Copy alDIDTemlDlate.html to another file. For example:
% cp appTemplate.html myAppPage.html 2. Open the file in an editor.
3. Include instructions to the user on how to launch the application.
    (Optional)
    startAppletDevIR.java defines a Send button and a class (sendBtn) that handles the user's input. appTemplate.html includes default instructions for using Send. If you want to change the user's interaction with the stamp applet, you would need to change the sendBtn class and the instructions in appTemplate. html.
4. Specify the name of the startup applet.
    If you have copied startAiDiDletDevIR. java, given it another name, and compiled it, supply that name to the applet tag:
<applet code="startAppletDevIR.class" width=400 heicJht=400>
5. Provide the application name as a parameter to the applet tag. For example:
<param name=AppName value = "MyApplicationl">
6. Provide the name of the access program to use for this application.
    The default value is "Access." You may have customized the default access file and given it another name. If so, provide the name as a value to the Access parameter.
<param name=Access value="Access">
    Be sure that the file you create from appleTemplate.html contains the end applet tag </applet>.
    Here are the tags for a minimal HTIVIL file using startAlppletDevIR, an application named "MyApplicationl", and the default access program name:
<html>
<blockquote>
Please provide Username and Password and press the "Send" button to launch the application.
</blockquote>
<hr>
<applet code="startAppletDevIR.class" width=400 height=400>
<param name=AppName value="MyApplicationl">
<param name=Access value="Access">
</applet>
</html>

When the user launches the startup applet and sends the user data and the application name to the server, ICE-T's Access Layer:
    Authenticates the user name and password
    Downloads the Presentation Engine as an applet in a Web page As part of the process of determining access and downloading Presentation Engines, the Access Layer relies on an application configuration file to provide information about the location and names of program components. ICE-T's Access Layer installation script generates the application configuration file automatically. That configuration is the basis for generating an HTML wrapper file in which to download the Presentation Engine. You can accept the defaults and let your application use the generated HTML wrapper, or you can customize the application configuration file so that it generates a customized HTML file to hold the Presentation Engine. See "Configuring Applications" for more information.

Setting up the Web Server

Note—Complete the following Web server setup before installing the ICE-T application, that is, before running ice-app-install.

This step establishes a Web server file structure for the ICE-T files that manage access to and delivery of client applications. To establish this file structure, run the script provided in the ICE-T installation directory under /bin/ice-httpd-setup.

Before you run this server setup script, you should establish links to the cgi-b in directory and the httpd-docs directory.

Create a symbolic link to the cgi-bin and htttlDd-docs directories using the UNIX ln command.
    Become superuser
    Make the links:
% in-s <absolute path to cgi-bin>/cgi-bin
% in-s <absolute path to httpd-docs>/WWW-docs
    If you cannot create these links, provide the absolute path names to cgi-bin and httpd-docs as arguments to the ice-httpd-setup script. If you have not created the links, you will need to change the Access Layer's default access properties file to specify the cgi-bin and httpd-docs locations. (See "Customizing the Access Layer"). If you have created the links, run ice-httpd-setup without arguments.

From the ICE-T installation directory, run ice-httpd-setup.ice-httpd-setup takes these arguments:
    -cqi -bin—takes the location of the c~i-bin directory.
    The default is/cgi -bin.
    -httpd-docs—takes the location of the httpd/docs directory.
    The default is/www -docs.
Note—Run ice-htttpd-setup once for each machine that is an ICE-T Web server.
    For example:
% cd <ICE-T installation directory>
% /bin/ice-httpd-setup
ice-httpd-setup establishes a Web server file structure for the files that manage access to and delivery of requested client applications.
    ice-httpd-setup performs these tasks:
    Creates an ICE directory under the -cgi-bin directory
    Creates a link to cgi -bin/ICE from the httpd-docs directory
    Creates an application startup directory under the ICE directory
    Creates an ICEAppRepository directory
    ice-httpd-setup takes additional optional arguments. Run the setup file with the -help quailifer to get a list of the arguments and their defaults:
% cd <ICE-T installation directory>
% /bin/ice-httpd- setup -help

Customizing the Access Layer

This step is optional. The Access Layer uses authentication and access properties files to manage access to ICE-T applications. Developers can use the files provided by ICE-T or modify them to specify their own access requirements or to create a number of access subsystems for use with different applications.

The Access Layer uses:

default_authentication. cc
   default_authentication. cc contains a single default authentication function that checks the application name, user name, and password. By default, all users are authenticated. Modify the tile to specify how to authenticate users.

default_access properties.cc
   default_access_properties contains several functions for controlling access log tile properties, as well as functions for specifying the Access directory, and password scrambling keys.

With the exception of the cqi_bin_location property, (See table below) no modification is necessary for these tiles, but you may choose to change the defaults for authentication and access properties. The files are in the Access subdirectory in the ICE-T installation directory.

The table appearing below describes properties that can be modified in default_access_properties.cc:

3. Edit Access.mk to replace the default file names with the files you edited. Access.mk is in the Access directory. The user-modifiable section is marked.

To substitute the new file name for default_authentication.cc, change the second line:

AUTHENTICATION_SOURCES.cc=\ default_authentication.cc \

To substitute the new file name for default_access_properties.cc, change the second line:

ACCESS_PROPERTIES_SOURCES.cc=\ default_access_properties.cc \

4. Run Access.mk.

% make -f Access.mk

5. After you configure the Access Layer, run ice- install -access.

By default, Access .ink creates a an executable named CustomAccess. If you have changed the default name of the access program, use the—source option to ice-install-access and specify the name you have given the access program. For example:

% ice-install-access -source myAccess

Table Default Access Properties

| Property | Default | Description |
|---|---|---|
| cgi_bin_location | /cgi -bin | If you have not created a link to cgi-bin (as described in "Setting up the Web Server", provide a cgi -bin location here. |
| log_destination | logfile | The return value determines where log entries are written. Accepted values: console, logfile. If you choose to write the log to a file, set the file location and name using the logfile property. |
| logging_level | all | Determines to what level the Access Layer logs access attempts. Accepted value: none, all, starts, errors, debug. |
| logfile | <cgi_bin_location>/ICE/Access logs/ Access - pid.log | |
| scrambler_key | Uses the scrambler key provided by ICE-T. | Return value is used as a key to unscramble the user name and password sent when the user launches an application. If you change the scrambler key, change the scrambler key in the startup applet also. |
| sessionEnvironment | | Sets up the calling environment for the server program. You can make calls to putenv () to set environment variables whose values can be accessed with getenv () from the server program. |

To implement the authenticate ( ) function in default_uthentication.cc:

1. copy the file from the ICE-T installation's Access directory.
2. Follow the instructions in the file to implement the authenticate ( ) function.
3. In Access.mk, replace this file name with yours.

To change the defaults in default_access._properties.cc:

1. Copy the file from the ICE-T installation's Access directory and give it a name that suits the application.
2. Modify the file to supply application-specific values.

Installing the Access Program

The ICE-T Access Program installation script:

Installs the Access program on the server in the cgi -bin directory that you specify Installs the startup applets in the/www-docs/ICE/start directory.

To install the Access program, run ice- install -access from the ICE-T installation directory:

% cd <ICE-T installation directory>

%/bin/ice- install-access ice-install-access takes four optional arguments:
  -cgi-bin <cgi-bin location>
  The defau/t is/cgi -bin.
  -source <Access executable name>
  The name of the Access program that you are copying from. The default is Access.
  -dest <Access executable name>
  The name of the Access program that you are copying to. The default is Access. Change the destination if you want to use different access programs for different applications.
  -help
  Displays the arguments and their defaults.

Installing the ICE-T Application

ICE-T provides a script for installing applications.
ice-app- install performs these tasks:
Installs the client and server executable files for the application
Creates an application directory
Installs the server libraries
Installs the Java packages used by the Java Presentation Engine class
Creates an application configuration file (appConfigFile), or installs a specified one
If you already have an appconfigFile to which you have made changes, you can avoid having the application installation overwrite it. Use the—appConfigFile <file>option.
Copies the aIDlDConf igFile to the application directory
Installing the ICE-TApplication with ice-app-install
Note—Run ice-app-install for each application you want to install.
From the ICE-T installation directory, run ice-app-install with the required arguments:
  -appName—the name of the application
  -peClass—the name of the Presentation Engine class
  -peSource—the location of the Presentation Engine you want to install
  -serverName—the name of the server program
  -serverSource—the location of the server program you want to install
    If peSource and serverSource are the same directory, you only need to specify one of them.
ice- app -install takes additional optional arguments: ice-app- install is in the /bin directory of the ICE-T application installation directory. You can run the file with the -help option to get a list of the arguments and their defaults:
% cd <ICE-T installation directory>
%/bin/ice- app- install -help

Installing the ICE-T Application with the Provided Makefile

An alternative to running ice- app- install, is to use the Example.mk Makefile to install the completed application. ExamiDle. mk has defined a target for installing the application on your Web server. If you have set up the Web server, creating the symbolic links as described in "Setting up the Web Server" then you can use ExamiDle .mk with the following argument:

% make -f Example.mk app-install

If you did not create a symbolic link to the cgi-bin directory as described in "Setting up the Web Server", specify the cgi-bin location in the Example.mk file (use the CGI_BIN_LOCATION macro and then run make on the aIDiD—install target:
% make -f Example.ink app-install

Configuring Applications

The ICE-T application installation script (ice-app- install) generates a default application configuration file (appConfigFile). When a user starts an application by launching a startup applet, the Access Layer uses the Application Manager to look up values for server and client program locations and names in appConfigFile. Using the configuration file, the Application Manager generates an HTML wrapper for presenting Presentation Engines as applets in a Web browser execution environment. (See "Using Startup Applets and HTML Files" for more information about how to use startup applets for ICE-T applications.)

To complete the last step in deploying an application to a Web Browser you use one of two ways to supply application-specific values in the HTML wrapper:
  Run ice- app- install with the required arguments as described in "Installing the ICE-T Application" and let it create the default aiDiDConfigFile.
  Or, create your own application configuration file by modifying the automatically generated appConfigFile.
By default, ice- app-install creates the application file in the /cgi- bin/ICE/ICEAppRepository directory and names it <appName>.appconf.
To customize the appConfigFile generated by ice-app-install:
1. Open the generated configuration file (<appName>.appconf) in an editor.
2. Supply the names for each application in the appropriate tags in each appConfigFile.
  You are required to supply application information in these tags:
  <peClass>—the name of the Presentation Engine class
  <serverName>—the name of the server program
  <PresentationEngine>—specifies where the Presentation Engine appears on the Web page.
    The Application Manager replaces the <Presentation Engine> tag with a Java <applet> tag that specifies the named Presentation Engine (peClass).
3. Supply messages to return to the browser if user authentication or application stamp fails.
  The template contains tags for authentication failure and application startup failure messages.
The appConfigFile contains optional tags for you to specify a Web page title, headings, and text, just as you would for any Web page.

The Application Manager also uses a properties file to set what applications are returned to the client. By default, the Application Manager returns the application name passed to it by the Access Layer. You can specify another application to return by modifying default_appmgr_properties. cc.default_appmgr_properties.cc is described in "Customizing the Access Layer".

Presentation Engine Template

ICE-T provides a null application that you can use as a template for Presentation Engines. You can find the file for the template in the ICE-T application installation directory under /Templates/pe_template.java.
Code Example A-1 pe_template.java Listing
```
import sunsoft.ice.pe.*;
import java.net.*;
import java.io.*;
```

```java
import java.applet.*;
import java.util.*;
import java.awt.*;

/*
 * This is a sample template of the ICE-T Presentation
   Engine—it needs to
 * be filled with the actual ui, names of messages and
   handlers to create
 * a working PE.
 */
// Extend the PresentationEngine class
public class pe_template extends PresentationEngine {
// Constructor
public pe_template( ) {
    // This is required. It sets up the internal PE components
    super( );
}

Code Example A-1 pe_template.java Listing (Continued)
/**
 * This is called when the current applet terminates.
 * It needs to be customized for handling the termination
 * of the current applet.
 */
public void terminate (String reason) {
    super. PEterminate(reason);
}

* This can be used to do any local initializations that may be
  required in
* the PE. It is called before all the connections are setup with
  the server
* so no messages should be sent from this function.
*/
protected void initializeApplication ( ) { }

/**
 * createUI creates the UI components of the applet.
 * It uses the "ui" object of "gui" class which is generated
 * by the SpecJava gui builder.
 */

* Specify the UI of the application in this function.
*/
protected void createUI( ) {

// create local awt components to map the ones generated
    // by specJava. For example:
}

/*
 * createModel Creates the data items in the Model. Some
   data items
 * can be observable. These items which have an associated
   observer
 * function that gets called when the observable is updated.
 */

// This function is optional. It is only needed if the
// application wants to do some client-side application logic
// Uncomment the lines below if you plan to do client side
   processing
// in the Model.

Code Example A-1 pe_template.java Listing (Continued)
protected void createModel( ) {

// create the observable object e.g. PeHashtable,
       PeVector, PeString . . . )

// Attach observer to the observable.

// put the observables into Model
}

/**
 * provide the mapping of Message names to handlers for the
   inbound
 * Messages to the PE from the UI or Comm adaptors.
 * The Handlers for the UI and Model messages should
 * be provided in this function.
 */

// This function is required. It keeps the mapping of UI
   events
// registered with the uiAdaptor and the model events
   registered
// with the model
protected void createMessageHandlers( ) throws Duplicate-
    HandlerException {

// UI maps
uiAdaptor.addHandler ("sample_ui_message",
    new SampleUIHandler (uiAdaptor, uiContainer));
// . . .

// Model Maps
model.addHandler ("sample_model_message",
    new SampleModelHandler(model));
// . . .

}

/*
 * main is used when running as a standalone java
   application,
 * (i.e. not in a browser environment), and is intended to do
 * all the things that the browser would do for the applet.

Code Example A-1 pe_template.java Listing (Continued)

*
*/ public static void main(String args[ ]) { pe_template pe = new pe_template( );
pe.isApplet=false;
pe. getCommandLineArgs (args);
pe.init( ); pe. start ( );
}

}

/ / / / / / / / / / / / / / / / / / / / / / / / UI Message Handlers
/ / / / / / / / / / / / / / / / / / / / / / / / / / / / / / class SampleUIHandler extends PeUIHandler { public SampleUIHandler(PeUIAdaptor adaptor, PeUI
    uiContainer) {
```

```java
super (adaptor, uiContainer);
}
public boolean execute (Object caller, PeMessage message)
{

// decode the record send by the server
// update the ui
return true;
}

}

////////////////////////// Model Message Handlers
//////////////////////////////// class SampleModelHandler extends PeModelHandler { public SampleModelHandler (PeModel model) {
super (model);
}
public boolean execute (Object caller, PeMessage message)
    {

Code ExampleA-1 pe_template.java Listing (Continued)

// decode the record send by the server
//update the model
return true;
}
}

//////////////////////////////// Model Observers
/////////////////////////////////
class SampleObserver extends PeObserver { public SampleObserver ( PeModel model) {
super (model);
} public void update (Observable o, Object arg) {
}
}
```

Startup Applet Template startAfaIaletDevIR.java is a Java applet that launches ICE-T applications. The file is generalized to run any ICE-T application. You don't need to change it unless you want to change the user's interaction with the applet. The applet currently asks for username and password and provides a Send button to launch (start up) the application. The file is in the ICE-T installation directory under/ StartApplet. For instructions on how to use this file, see "Using Startup Applets and HTML Files".
Code Example B-1 startAppletDevIR.java Listing

```java
/**
* This is a sample applet that can be used for gathering
   specific
* user information before displaying the ICE-T application.
   It can
* be customized as needed. It is loaded into the browser
   using the
* index.html file provided.
*/ import java.net.*;
import java.io. *;
import java .applet. *;
import java.util. *;
import java. awt. *;
import sunsoft. ice.ui. *;

public class startAppletDevIR extends Applet {

Code ExampleB-1 startAppletDevIR.java Listing
(Continued)
public startAppletDevIR ( ) {
} public void init ( ) { setLayout (new ColumnLayout ( ));
Panel fnamep = new Panel ( );
fnamep.setLayout (new FlowLayout (FlowLayout. LEFT));
fnamep.add (new Label ("Username:"));
TextField fnameText= new TextField("",20);
fnamep.add(fnameText);
add(fnamep);

Panel passwdp = new Panel ( );
passwdp.setLayout (new FlowLayout (FlowLayout.LEFT));
passwdp.add (new Label("Password: "));
TextField passwdText= new TextField("",20);
passwdText.setEchoCharacter(',');
passwdp.add (passwdText);
add(passwdp);

Panel btnp = new Panel ( );
btnp.setLayout (new FlowLayout ( );
AButton cbtn = new Abutton ("Send");

cbtn.setAction (new sendBtn ( ));
cbtn.addClientData ("applet",this);
cbtn.addClientData ("username",fnameText);
cbtn.addClientData ("password",passwdText);
btnp.add (cbtn);
add(btnp);

show ( );
} public String getAppName( ) {
appname = getParameter ("AppName");
return appname;
} public String getAccessName ( ) {
String acc = getParameter ("Access");

Code ExampleB-1 startAppletDevIR.java Listing
(Continued)

if (acc == null 11 acc.equals("")) acc="Access";
return acc;
} public String getAppHost ( ) {
System.err.println ("Applet: "+isApplet);
if (isApplet) {
URL docBase=getDocumentBase ( );
System.err.println("Document base: "+docBase);

apphost=docBase.getHost ( );
if (apphost==null) apphost="";
int port= docBase.getPort ( );
```

```
if (port != -1) apphost = apphost + ":"+port;
System. err.println("Server is: {"+apphost+"}");
} else {
apphost="";
}
return apphost;
} public static void main (String agrs[ ]) {
Frame f = new Frame ("ICE-T startup applet");

startAppletDevIR tap = new startAppletDevIR ( );
tap.isApplet=false;
tap.init ( ); f.add ("Center", tap);
f.resize (500,400);
f.show ( );
tap.start ( );
} public boolean isApplet=true;
private String appname = new String("");
private String apphost = new String("");
}

/*
* sendBtn handles the "Send" button activation. The execute
* member of this class is called when the "Send" button is
* pressed. It collects all the relevant user information and Code ExampleB-1 startAppletDevIR.java Listing
(Continued)

* sends it to the Server via HTTP. This is done by executing
* the Access function in the server's cgi-bin.
* [Note: the username and password is scrambled so it will
    not
* be displayed in the URL field of the browser.]
*/
class sendBtn extends Activity {
public boolean execute (Object caller, Event event) {
AButton btn= (AButton) caller;
startAppletDevIR app = (startAppletDevIR)
    (btn.getClientData ("applet"));
TextField name = (TextField) (btn.getClientData
    ("username"));
TextField passwd = (TextField) (btn.getClientData
    ("password"));
String serverName = app.getAppHost ( );

URL newURL = null;
String usemame = name.getText ( );
String userpasswd= passwd.getText ( );
String appname = app.getAppName ( );
String accessName=app.getAccessName ( );
AccessScrambler scrambler=new AccessScrambler ( );
System.err.println ("Scrambling ("+usemame+", "+
/ /userpasswd+", "+
appname+")");
String scrambled=scrambler.scrambleUser (username,
    userpasswd, appname);
System.err.println(" scrambled ==> ["+scrambled+"]");

String url ="http:/ /" + servername +
"/cgi-bin/"+accessName + "?" + appname +
"+" + scrambled;
```

```
System.err.println (url);

try {
newURL = new URL(url);
}
catch (Exception e) {
System.err.println ("Exception Getting newURL from
    ("+url+"): "+e);
}

AppletContext cont = app.getAppletContext( );
if (cont != null) {

Code ExampleB-1 startAppletDevIR.java Listing
(Continued)

/*
* The call to ShowDocument makes the httpd request to the
    Access
* cgi-bin executable.
*
* Call showDocument with one argument (the URL) to show
    the
* PE in a single window; call with two arguments (the URL,
    "new_window")
* to show the PE in a new browser window.
* * We're currently defaulting the call to bring up a new
    browser
* window because of the way browsers handle backing out
    of html
* pages with java applets—if you go too far back, then the
    applet
* is destroyed. We put the PE in a new window to minimize
    the chance
* of going too far back simply because you want your
    browser back,
* but don't intend to kill your PE.
*
*/
System. err.println ("Showing document in new window:
    ["+newURL+"] in
window: ("+appname+")");
cont.showDocument (newURL, appname);
/ / cont.showDocument (newURL);
/ / System.err.println ("Showing document: ["+newURL+"]
    ");
}
return true;
}
}
```

Server Program Templates

This appendix contains code listings for the following templates:
server_template.c
default_main.c
server_template.cc
default_main.cc Chapter 2, "Building Program Components describes the location and use of these templates. See "Handling Messages in the Server Program" and "Modifying the Default main Routine (Optional)" for more information.

C++ Files

ICE-T provides a server program template and a default main routine for application developers using C++ to develop server programs.

C++ Server Program Template
Code Example C-1 server_template.cc Listing

```
/*
* server_template.cc
*
* This is a template of a ICE-T server-application in C++
*/
#include <stdio.h>
#include <string.h>
include <sys/types.h>
// these are required to get the server side ICE-T components
#include "SrvData.hh"
#include "SrvComm.h"
#include "SrvMessage.hh"

#define false 0
#define true 1
/*********************************
 The Message Handler functions *
*********************************/

/* This is the Message handler function that gets called when
   a specified
 * message is received from the client. It has only one
   argument
 * (msg) that contains the message name and message data.
 */
void handleMessage (SrvMessage *msg){
/*
 * disassemble incoming data
 */
```

Code Example C-1 server_template.cc Listing (Continued)

```
/*
SrvData *data;
data=message->getDataElement (0);
*/

/*
 * The application "Logic" */
 */

/*
 * Assemble outgoing data
 */

// send a reply if necessary. <replyData> can be of the types
// provided in SrvData.hh
/*
SrvMessage    *reply=new    SrvMessage
   ("replyMessageName");
reply->adclDataElement (<replyMessageData>);
SrvComm_sendMessage (reply);
*/
}

//This is an example of a shutdown handler on the server void shutdownHandler (SrvMessage *shutdownMsg) {
char *shutdownType= ((SrvString *) shutdownMsg-
   >getDataElement (0)) -
   >getValue ( );
char *reasonString= ((SrvString *) shutdownMsg-
   >getDataElement (1))->getValue
( );

if (!strcmp (shutdownType,"ICET_CLIENT_
   SHUTDOWN")) {
fprintf (stderr,"shutdownHandler: Detected CLIENT SHUT-
   DOWN event.
Reason=%s\n", reasonString);
} else if (!strcmp (shutdownType,"ICET_CLIENT_
   DISCONNECT")) {
fprintf (stderr,"shutdownHandler: Detected CLIENT DIS-
   CONNECT event.
Reason=%s\n", reasonString);
} else if (!strcmp(shutdownType,"ICET_SERVER_
   SHUTDOWN")) {
fprintf (stderr,"shutdownHandler: Detected SERVER
   SHUTDOWN event.
Reason=%s\n", reasonString);
} else if (!strcmp (shutdownType,"ICET_INTERNAL_
   SHUTDOWN")) {
```

Code Example C-1 server_template.cc Listing (Continued)

```
fprintf (stderr,"shutdownHandler: Detected INTERNAL
   SHUTDOWN event.
Reason=%s\n", reasonString);
} else {
fprintf (stderr,"Shutdown Handler: unknown msg type (%s).
   Reason = %s\n",
shutdownType, reasonString);
}
}
```

/*************************************************
*****************
*
* Functions required by default-main, that set the
* SrvComm library properties (setSrvCommProperties) and
*      initialize      the      applicationService
   (InitializeApplicationService)
*
*************************************************
*****************/

```
int setSrvCommProperties ( ) {
/* The server timeout is how long the server waits between
   receiving
 * messages from the PE before it initiates the timout
   shutdown procedure.
 */
SrvComm_setServeTimeout (300); /* in seconds */

/* The accept timeout is how long the server will wait to
   accept a connection
 * from the client before it shuts down.
 */
SrVComm_setAcceptTimeout (400); /* in seconds */ return 1;
} int createMessageHandlers ( ) {
SrvComm_addMessageHandler
   ("SampleIncomingMessage", handleMessage);
SrvComm_addMessageHandler ("ICET_SHUTDOWN",
   shutdownHandler);

return 1; // (return 0; if there is a problem here)
} int initializeApplication ( ) { return 1; // (return 0; if there is a problem initializing the
   application)
}
```

Default main for C++

Code Example C-2 default_main.cc Listing

```
/**************************************************
                   ******************
 * default_main.cc
 * This file implements the default main ( ) used
 * by an ICE-T server executable.
 *
 * The structure of this main is that it calls
 * all the functions necessary to run
 * the ICE-T SrvCom library, and provides several
 * places for the application writer to include
 * application-specific code. These functions
 * are implemented by the application-writer,
 * and are usually implemented in a separate file, that gets
 * linked in as part of the build process.
 *
 * These functions all return int values, which are used to
    determine if
 * the startup of the application should continue or should be
    aborted.
 * In this way the application code has a hook for indicating
    when something
 * goes wrong (can't connect to database, or something), and
    passing this
 * information on to the application so startup doesn't
    continue.
 * Return 1 (TRUE) to indicate that everything is OK, or
    return 0 (FALSE)
 * to indicate a fatal problem that should result in aborting the
    application startup.
 *
 * int setSrvComProperties ( )
 * Fill in this function to set properties on the SrvComm
    library.
 * This function is called after the SrvCom library is created,
    but before it accepts
 * a connection from the client.
 *
 * int createMessagHandlers ( )
 * Fill in this function to register the message handlers.
 * This function is called immediately after setSrvCom-
    mProperties ( ).
 *
 * int initializeApplication ( )
 * Fill in this function to start up the application-specific
    code.
 * It is called after the connection is accepted from the client,
 * and before the message reader and handler loops are
    started.
 *
 * Code Example C-2 default_main.cc Listing (Continued)
 *
 * NOTES:
 * This main ( ) routine is provided for your convenience,
 * but you are not required to use it. You are
 * free to write your own main ( ) routine, provided
 * you follow the requirements for ordering the
 * calls to the SrvComm library:
 * 1. First call create-SrvComm("tcp"); to create
 * the Comm library's data structures.
 * 2. Set the properties on the Comm library and
 * register message handlers and other handlers.
 * 3. Call SrvComm_createSocket ( ) to create the
 * listener socket and output the port number
 * (Note: do NOT write anything to stdout before
 * making this call).
 * 4. Initialize the application.
 * 5. Call SrvComm_acceptClientConnection ( ) to
 * accept the connectio fromthe client.
 * (Note: steps 4 and 5 may be interchanged)
 * 6. Finally call SrvComm_start ( ) to start the
 * Comm library's loops. This routine does not
 * return until everything is finished.
 *
 **************************************************
   *******************/ include <stdio.h>
include <stdlib.h>
#include <string.h>
include <sys/types.h>
include "SrvComm.h"
extern int setSrvCommProperties ( );
extern int createMessageHandlers ( );
extern int initializeApplication ( );
```

```
/**************************************************
 *              The default Main                   *
 *                                                 *
 *     ICE-T provides a default main () routine    *
 *     for ICE-T server applications.              *
 *                                                 *
 **************************************************/
```

Code Example C-2 default_main.cc Listing (Continued)

```
int
main(
intargc,
char**argv,
char**envp
)
{ char *protocol ="tcp";

create_SrvComm(protocol);

/*
 * Call user-defined function to set the properties on the
    Comm Library.
 * Then call user-defined function to create the Message
    handlers
 * and add them to the Comm library.
 *
 * The setSrvCommProperties function is where Comm
    Library properties
 * are set. All properties have reasonable defaults, so none of
    them are
 * required to be set.
 *
 * The createMessageHandlers function is where the message
    handlers are
 * added, and other handlers (shutdown handler, default
    message handler,
 * etc) are registered.
 *
 * Requirements on these two functions:
 * 1. These functions may NOT write anything to stdout,
    since the Access
```

```
* layer expects the first thing on stdout to be the port number
   that
* the server will be listening for a client connection on.
*
*/
if (!setSrvCommProperties ( ) ) {
exit (0);
} if (!createMessageHandlers ( ) ) {
exit(0);
}

/*
* Create the socket that the client will connect to.
* This routine also is responsible for generating (and print-
  ing to Code Example C-2 default_main.cc Listing (Continued)
* stdout) the port number so the Access layer can generate
  the
* html code that passes the port number to the client applet
* (presentation engine).
,

* (NOTE: Do not write anything to stdout before this routine
  is called.
* Writing to stderr is OK, however.)
*/
if (SrvComm_createSocket ( ) !=SRVCOMM_STATUS-
  OK ){
exit(0);
} fprintf (stderr,"ICE::ApplicationServer: port=%d
ServerIP=%s\n",SrvComm_getPort ( ), SrvComm_
   getIPAddress ( ));
fprintf (stderr,"\n\n\n\n");
fflush(stderr);

/*
* call user-defined function to initialize the application
*
* Requirements on this function:
* 1. This function initializes any data structures in the
   application
* that need to be initialized before message incoming
   messages
* from the client get handled.
* 2. This function must return. This means that if the
   application has
* its own notifier loop that, say, listens to messages from a
   database,
* then that notifier loop must be called in a new thread.
* /
if (!initializeApplication ( )) }
exit(0);
}

/*
* Accept a connection from the client.
* (blocks until a connect attempt is made, or until the
* acceptTimeout expires).
*/
if (SrvComm_acceptClientConnection ( ) !=SRVCOMM_
   STATUS_OK) }
```

```
exit (0);
}

/*
* Finally, we start up the server loops.
* This function does not return until everything is finished.

Code Example C-2 default_main. cc Listing (Continued)

*/
SrvComm_start ( );
}

/**
* This function is called when the server times out.
* It returns TRUE or FALSE (int 1 or 0), TRUE indicating
   that the
* timeout-shutdown should proceed, FALSE indicating that
   no, don't
* shutdown on this timeout (the timeout timer gets reset).
*
*/
*/ #ifdef__cplusplus
extern "C" {
#endif
int handleServerTimeout ( ) {
return 1;
}
#ifdef__cplusplus
}
#endif
```

C Server Program Template

Code Example C-3 Server-temp Late. c Listing

```
/**
*server-template. c
*
*ICE-T server template.
*
*/
#include <stdio.h>
#include <string.h>
include <sys/types.h> include "SrvData.h"
include "SrvComm.h"
#include "SrvMessage.h"
#define false 0
#define true 1
/* This is the Message handler function that gets called when
 a specified * message is received from the client. It has only
 one argument * (msg) that contains the message name and
 message data.
*/
void handleMessage(SrvMessage *message) {
/*
*disassemble incoming data
*/
/*
SrvData *data; data=SrvMessage-getDataElement
   (message, 0);
*/
CodeExample C-3 server-template.c Listing (Continued)
* The application "Logic",/
Assemble outgoing data,/
--see SrvData.h for how to create data types. --SrvData ,
   replyData; replyData=
```

```
create-SrvVector( );
SrvVector-addElement(replyData, create-SrvString
    ("Something")); ,/
/
Create the SrvMessage struct ,/
/reply=create-SrvMessage("replyMessage");
SrvMessage-addDataElement(replyData);,/
/*
*Send message ,/
/*SrvComm-sendMessage(reply); ,/
/*This is an example of a shutdown handler on the server */
void shutdownHandler(SrvMessage ,shutdownMsg) {
SrvData,shutdownTypeSStr= SrvMessage-getDataElement
    (shutdownMsg, 0);
SrvData *reasonSStr= SrvMessage-getDataElement
    (shutdownMsg,1); char
*reasonString=SrvString-getValue(reasonSStr);
Code Example C-3 server-template. c Listing (Continued)
char     *shutdownType=SrvString-getValue
    (shutdownTypeSStr);
if (:strcmp(shutdownType,"ICET-CLIENT-
    SHUTDOWN")) {
fprintf(stderr,"shutdownHandler: Detected CLIENT SHUT-
    DOWN event.
Reason=%s\n", reasonString);
} else if (:strcmp(shutdownType,"ICET-CLIENT-
    DISCONNECT")) {
fprintf(stderr,"shutdownHandler: Detected CLIENT DIS-
    CONNECT event.
Reason=%s\n", reasonString);
} else if (!strcmp(shutdownType,"ICET-SERVER-
    SHUTDOWN")) {
fprintf(stderr,"shutdownHandler: Detected SERVER SHUT-
    DOWN event.
Reason=%s\n", reasonString);
} else if (:strcmp(shutdownType,"ICET-INTERNAL-
    SHUTDOWN")) {
fprintf(stderr,"shutdownHandler: Detected INTERNAL
    SHUTDOWN event.
Reason=%s\n", reasonString);
} else {
fprintf(stderr,"Shutdown Handler: unknown msg type (%s).
    Reason=%s\n",
shutdownType, reasonString);
}
}

/**************************************************
*                                                  *
*  Functions required by default-main, that set the *
*  SrvComm library properties (setSrvCommProperties) and *
*  initialize the applicationService (initializeApplicationService) *
*                                                  *
**************************************************/ int setSrvCommProperties( ) {
/*The server timeout is how long the server waits between
    receiving
*messages from the PE before it initiates the timeout shut-
    down procedure.
*/SrvComm-setServerTimeout(300);/, in seconds */
/*The accept timeout is how long the server will wait to
    accept a connection *
from the client before it shuts down.
*/SrvComm-setAcceptTimeout(400); /* in seconds */
return 1;
} int createMessageHandlers ( )
{           SrvComm-addMessageHandler
    ("SampleIncomingMesssage", handleMessage);
SrvComm-addMessageHandler("ICET-SHUTDOWN",
    shutdownHandler);
return 1;
}
int initializeApplication ( ) {
return 1; }
```

Default mainfbr C

Code Example C-4 default-main.c Listing
```
*************************************************
*************
default-main.c
This file implements the default main( ) used by an ICE-T
server executable.
The structure of this main is that it calls
all the required functions necessary to run
the ICE-T SrvComm library, and provides several places for
the application writer to include application-specific code.
These functions are required to be implemented by the
application-writer, and are usually implemented in a sepa-
rate file, that gets linked in as part of the build process.
These functions all return int values, which are used to
determine if the startup of the application should continue or
should be aborted.
In this way the application code has a hook for indicating
when something goes wrong (can't connect to database, or
something), and passing this information on to the applica-
tion so startup doesn't continue.
Return 1 (TRUE) to indicate that everything is OK, or
return 0 (FALSE)
to indicate a fatal problem that should result in aborting the
application startup.
int setSrvCommProperties( )
    Fill in this function to set properties on the SrvComm
library. This function is called after the SrvComm library is
created, but before it accepts a connection from the client.
int createMessageHandlers( )
    Fill in this function to register the message handlers.
    This function is called immediately after
setSrvCommProperties( ).
int initializeApplication( )
    Fill in this function to start up the application-specific
code. It is called after the connection is accepted from the
client, and before the message reader and handler loops are
started.
NOTES:
    This main( ) routine is provided for your convenience,
CodeExample C-4 default-main.c Listing (Continued)
but you are not required to use it. You are free to write your
own main routine, provided you follow the requirements for
ordering the calls to the SrvComm library:
1. First call create-SrvComm("tcp"); to create the Comm
    library's data structures.
2. Set the properties on the Comm library and register
    message handlers and other handlers.
3. Call SrvComm-createSocket( ) to create the listener
    socket and output the port number (Note: do NOT write
    anything to stdout before * making this call).
4. Initialize the application.
5. Call SrvComm-acceptClientConnection( ) to accept the
    connection fromthe client. (Note: steps 4 and 5 may be
    interchanged)
6. Finally call SrvComm-start( ) to start the Comm library's
    loops. This routine does not return until everything is
    finished.
```

```
/************************************************
***********
#include <stdio.h>
include <stdlib.h>
#include <string.h>
include <sys/types.h> include "SrvComm.h"

extern int setSrvCommProperties( );
extern int createMessageHandlers( );
extern int initializeApplication( );

/************************************************
*                                                *
*           The default Main                     *
*                                                *
*   ICE-T provides a default main () routine     *
*   for ICE-T server applications.               *
*                                                *
*************************************************/ int main( intargc,
char**argv,
char**envp
)

{ char ,protocol="tcp";
create-SrvComm(protocol);

/*

*Call user-defined function to set the properties on the
Comm Library. * Then call user-defined function to create
the Message handlers * and add them to the Comm library.
    The setSrvCommProperties function is where Comm
Library properties are set. All properties have reasonable
defaults, so none of them are required to be set.
    The createMessageHandlers function is where the mes-
sage handlers are added, and other handlers (shutdown
handler, default message handler, etc) are registered.
*Requirements on these two functions:
* 1. These functions may NOT write anything to stdout,
    since the Access, layer expects the first thing on stdout to
    be the port number that * the server will be listening for
    a client connection on.
*

*/if (:setSrvCommProperties( )) { exit(O);

} if (!createMessageHandlers() ) { exit(0);

}

/*

* Create the socket that the client will connect to.

*This routine also is responsible for generating (and printing
    to
*stdout) the port number so the Access layer can generate
    the
*html code that passes the port number to the client applet CodeExample C-4 default-main.c LLstmg (Continued)
*(presentation engine).
*

*(NOTE: Do not write anything to stdout before this routine
    is called.
*Writing to stderr is OK, however.)

if (SrvComm-createSocket( ) !=SRVCOMM-STATUS-OK)
    {exit(O);

fprintf(stderr,"ICE::ApplicationServer: port=%d
ServerIP=%s\n",SrvComm-getPort( ), SrvComm-
    getIPAddress( ));
fprintf(stderr, "\n\n\n\n");
fflush(stderr);

/*

* call user-defined function to initialize the application

*
*Requirements on this function:
* 1. This function initializes any data structures in the
    application
* that need to be initialized before messages incoming
    messages
* from the client get handled.
* 2. This function must return. This means that if the
    application has its own notifier loop that, say, listens to
    messages from a database, then that notifier loop must be
    called in a new thread.
*/ if (!initializeApplication( )) {
exit (O);
}

/,

* Accept a connection from the client.
*(blocks until a connect attempt is made, or until the
*acceptTimeout expires).

*/if (SrvComm-acceptClientConnection( ) !=SRVCOMM-
    STATUS-OK) {exit(O);

/*
*Finally, we start up the server loops.
*This function does not return until everything is finished.
SrvComm-start( );
}

/**
This function is called when the server times out.
It returns TRUE or FALSE (int 1 or 0), TRUE indicating that
    the timeout-shutdown should proceed, FALSE indicating
    that no, don't shutdown on this timeout (the timeout timer
    gets reset).
```

```
*/ ifdef --cplusplus
extern "C"

#endif
int handleServerTimeout( ) {
return 1;

} ifdef --cplusplus}
endif
```

ICE-T Exceptions Catalog D

ICE-T client program exceptions are caught by the modules in the Presentation Engine. The IcetExcelDtionHandler generates exception messages. It issues warnings and errors by printing messages to the Java console in a Netscape Navigator environment, or to the terminal where Java was started (in the case of the Java development kit).

Server (Communication Library) exceptions are caught by the modules in the Communication Layer. The serverExceptionHandler generates messages. It issues warnings and errors by printing messages to the application logfile if the application is launched from a browser or to stdout if the application is run standAlone.

Here is a sample message:
ICET WARNING: handled in PresentationEngine.init Attempt to register duplicate handlers.

FIG. 30 is a table of client and server side exceptions in accordance with a preferred embodiment.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A server for a distributed system, comprising:
    (a) a plurality of client computers;
    (b) a plurality of server computers;
    (c) a network connecting the plurality of client computers to the plurality of server computers, wherein the network operates according to the TCP/IP protocol;
    (d) an execution framework code segment configured to couple the plurality of server computers and the plurality of client computers via the network, comprising:
        (1) a session manager in a server computer for responding to a client computer contacting the server computer by selecting a particular client code segment from a plurality of client computer code segments resident on the server computer, each one of the plurality of client computer code segments containing Java code and being associated with a single application program initiated on the client computer, and transmitting the particular client code segment over the network to the client computer contacting the server to initiate coupling;
        (2) the session manager in the server computer selecting a particular server computer code segment from a plurality of server computer code segments resident on the server, each one of the plurality of server computer code segments being associated with the single application program initiated on the client computer, and executing the server computer code segment resident on the server in response to initiation of coupling via the network with the client computer utilizing the transmitted client code segment for communicating via a particular communication protocol thereby enabling execution of the single application program in a distributed manner between the client computer and the server computer wherein a single copy of the single application program is distributed between the client computer and server computer; and
    (e) a plurality of definitions that define the plurality of client computer code segments and each of the plurality of definitions defining how to associate the plurality of client computer code segments and the plurality of server computer code segments into applications in response to a request by the client computer wherein the plurality of client computer code segments and the plurality of server computer code segments contain only executable computer programming instructions.

2. The server for a distributed system as recited in claim 1, including a template for a client program that includes a client communication library.

3. The server for a distributed systems as recited in claim 1, including a template for a client program that includes an user-extensible model.

4. The server for a distributed system as recited in claim 1, including a template for a client program that includes an user-extensible user interface adaptor.

5. The server for a distributed system as recited in claim 1, including application program interfaces that defines message events from a network graphical user interface to the execution framework.

6. The server for a distributed system as recited in claim 1, including application program interfaces that register graphical user interface message handlers.

7. The server for a distributed system as recited in claim 1, including application program interfaces that register execution framework adaptor handlers.

8. The server for a distributed system as recited in claim 1, including application program interfaces that define message events to the communication layer.

9. A method for distributing computing between a server computer system and a client computer system coupled by a network operating according to the TCP/IP protocol, comprising the steps of:
    (a) responding to a request from a client computer system to a server computer system;
    (b) downloading an execution framework code segment configured to couple the plurality of server computers and the plurality of client computers via the network, comprising:
        (1) a session manager in a server computer for responding to the client computer contacting the server computer by selecting a particular client code segment from a plurality of client computer code segments resident on the server computer, each one of the plurality of client computer code segments containing Java code and being associated with a single application program initiated on the client computer, and transmitting the particular client code segment over the network to the client computer contacting the server to initiate coupling;
        (2) the session manager in the sever computer selecting a particular server computer code segment from a plurality of server computer code segments resident on the server, each one of the plurality of server computer code segments being associated with the single application program initiated on the client computer, and executing the server computer code segment resident on the server in response to initiation of coupling via the network with the client computer utilizing the transmitted client code segment for communicating via the TCP/IP protocol thereby enabling execution of the single application program in a distributed manner between the client computer and the server computer wherein a single copy of the single application program is distributed between the client computer and server computer; and (c) a plurality of definitions that define the plurality of client computer code segments and each of the plurality of definitions defining how to associate the plurality of client computer code segments and the plurality of server computer code segments into applications in response to a request by the client computer wherein the plurality of client computer code segments and the plurality of server computer code segments contain only executable computer programming instructions.

10. A method for distributing computing between one or more server computer systems and one or more client computer systems coupled by a network, comprising the steps of:

(a) responding to a request from a client computer system to a server computer system;

(b) downloading an execution framework code segment configured to couple the server computer and the client computer via the network, comprising:

(1) a plurality of client computer code segments capable of instantiating one or more instances of the client computer code for concurrent execution on the one or more client computers and for transmission over the network to a client computer to initiate coupling;

(2) a plurality of server computer code segments resident on the server which execute on the server in response to initiation of coupling via the network with a particular client computer utilizing the transmitted client computer code segment for communicating via a particular communication protocol;

(c) receiving a plurality of messages at the mediator state machine of each client computer code segment and determining which message should be handled by which part of the execution framework, and forwarding the message for further processing to the execution framework;

(d) receiving messages at the execution framework and dispatching messages and initiating events in response to characteristics of the messages transferred by the mediator state machine; and (e) handling concurrent requests for service at the execution framework from the one or more client computers.

11. The method for distributing computing between a server computer system and a client computer system coupled by a network as recited in claim 10, including facilitating migration of computer applications utilizing a template for a client program that includes a client communication library.

12. The method for distributing computing between a server computer system and a client computer system coupled by a network as recited in claim 11, wherein the template for a client program includes an user-extensible model.

13. The method for distributing computing between a server computer system and a client computer system coupled by a network as recited in claim 10, wherein the template for a client program includes an user-extensible user interface adaptor.

14. The method for distributing computing between a server computer system and a client computer system coupled by a network as recited in claim 10, including the step of defining message events from a network graphical user interface to the execution framework.

15. The method for distributing computing between a server computer system and a client computer system coupled by a network as recited in claim 10, including the step of registering execution framework adaptor handlers.

16. The method for distributing computing between a server computer system and a client computer system coupled by a network as recited in claim 10, including the step of sending message events from the back endn code, and registering at least one handler for at least one message event.

17. A computer program embodied on a computer-readable medium for enabling a distributed computer system, comprising an execution framework code segment configured to couple the server computer and the client computer via a network operating according to the TCP/IP protocol, comprising downloading an execution framework code segment configured to couple the plurality of server computers and the plurality of client computers via the network, including:

(a) a code segment for enabling a session manager in a server computer for responding to a client computer contacting the server computer by selecting a particular client code segment from a plurality for client computer code segments resident on the server computer, each one of the plurality of client computer code segments containing Java code and being associated with a single application program initiated on the client computer, and transmitting the particular client code segment over the network to the client computer containing the server to initiate coupling;

(b) the code segment in the session manager in the server computer selecting a particular server computer code segment from a plurality of server computer code segments resident on the server, each one of the plurality of server computer code segments being associated with the single application program initiated on the client computer, and executing the server computer code segment resident on the server in response to initiation of coupling via the network with the client computer utilizing the transmitted client code segment for communicating via the TCP/IP protocol thereby enabling execution of the single application program in a distributed manner between the client computer and the server computer wherein a single copy of the single application program is distributed between the client computer and server computer; and (c) a plurality of definitions that define the plurality of client computer code segments and each of the plurality of definitions defining how to associate the plurality of client computer code segments and the plurality of server computer code segments into applications in response to a request by the client computer wherein the plurality of client computer code segments and the plurality of server computer code segments contain only executable computer programming instructions.

18. A computer program embodied on a computer-readable medium for enabling a distributed computer system made up of one or more client computers and one or more server computers coupled by a network, comprising:

(a) a code segment for responding to a request from a client computer to a server computer; and (b) an execution framework code segment configured to couple the server computer and the client computer via the network, comprising:

(1) a plurality of client computer code segments capable of instantiating one or more instances of the client computer code for concurrent execution on the one or more client computers and for transmission over the network to a client computer to initiate coupling;

(2) a plurality of server computer code segments resident on the server which execute on the server in response to initiation of coupling via the network with a particular client computer utilizing the transmitted client computer code segment for communicating via a particular communication protocol;

(c) each client computer code segment including a mediator state machine which receives a plurality of messages, determines which message should be handled by which part of the execution framework, and forwards the message for further processing to the execution framework;

(d) the execution framework further comprising means for dispatching messages and initiating events in response to characteristics of the message transferred by the mediator state machine; and (e) the execution framework further comprising a code segment that concurrently handles requests for service from the one or more client computers.

19. The computer program embodied on a computer-readable medium for enabling a distributed computer system as recited in claim 18, including a template for a client computer code segment that includes a client communication library.

\* \* \* \* \*